United States Patent
Kodama et al.

(10) Patent No.: US 10,360,646 B2
(45) Date of Patent: *Jul. 23, 2019

(54) MINE MANAGEMENT SYSTEM

(71) Applicants: Komatsu Ltd., Tokyo (JP); The University of Tokyo, Tokyo (JP)

(72) Inventors: Yuichi Kodama, Hiratsuka (JP); Masaaki Uetake, Kawasaki (JP); Kazunari Kawai, Kawasaki (JP); Shinichi Terada, Kawasaki (JP); Rui Fukui, Tokyo (JP)

(73) Assignees: Komatsu Ltd., Tokyo (JP); The University of Tokyo, Tokyo (JP)

( * ) Notice: Subject to any disclaimer, the term of this patent is extended or adjusted under 35 U.S.C. 154(b) by 511 days.

This patent is subject to a terminal disclaimer.

(21) Appl. No.: 15/025,318

(22) PCT Filed: Sep. 30, 2014

(86) PCT No.: PCT/JP2014/076190
§ 371 (c)(1),
(2) Date: Mar. 28, 2016

(87) PCT Pub. No.: WO2015/046599
PCT Pub. Date: Apr. 2, 2015

(65) Prior Publication Data
US 2016/0232622 A1    Aug. 11, 2016

(30) Foreign Application Priority Data
Sep. 30, 2013   (JP) ................................ 2013-205974

(51) Int. Cl.
*E21C 41/16* (2006.01)
*E21F 13/00* (2006.01)
(Continued)

(52) U.S. Cl.
CPC ............. *G06Q 50/02* (2013.01); *E21C 41/16* (2013.01); *E21F 13/00* (2013.01); *E21F 13/025* (2013.01);
(Continued)

(58) Field of Classification Search
USPC ....................................................... 705/7.25
See application file for complete search history.

(56) References Cited

U.S. PATENT DOCUMENTS 4,512,610 A * 4/1985 Gilbert .................... E21C 41/24
299/11
5,393,937 A * 2/1995 Etherington .......... E21F 13/025
177/141
(Continued)

OTHER PUBLICATIONS

Saayman, P 2005, Optimization of an autonomous vehicle dispatch system in an underground mine, MEng dissertation, University of Pretoria, Pretoria, viewed Jun. 27, 2018 (Year: 2005).*
(Continued)

*Primary Examiner* — Eric W Stamber
*Assistant Examiner* — Hector Leal
(74) *Attorney, Agent, or Firm* — Locke Lord LLP

(57) ABSTRACT

A mine management system to mine ore in a mine including a mining area, and a second mine shaft connecting the mining area and a first mine shaft, the mine management system includes: a transporting machine loading the ore mined in the mining area and transporting the ore to a soil discharge area while traveling in the first mine shaft; a loading machine staying in the second mine shaft while a space for the transporting machine to travel therein is left inside the first mine shaft, excavating the ore in the mining area, conveying the mined ore from the mining area in an opposite direction, and loading the ore on the transporting machine; and a management device determining the mining area toward which the transporting machine is directed so
(Continued)

that an operability of the loading machine becomes maximal or an operability of the transporting machine becomes maximal.

18 Claims, 20 Drawing Sheets

(51) Int. Cl.
    *E21F 13/02*     (2006.01)
    *E21F 13/06*     (2006.01)
    *E21F 17/18*     (2006.01)
    *G06Q 10/04*     (2012.01)
    *G06Q 10/06*     (2012.01)
    *G06Q 50/02*     (2012.01)

(52) U.S. Cl.
    CPC ............ *E21F 13/063* (2013.01); *E21F 17/18* (2013.01); *G06Q 10/04* (2013.01); *G06Q 10/063* (2013.01); *G06Q 10/06313* (2013.01)

(56) References Cited

U.S. PATENT DOCUMENTS

| | | | |
|---|---|---|---|
| 7,899,599 B2 | 3/2011 | Makela et al. | |
| 2007/0046094 A1 | 3/2007 | Gross et al. | |
| 2007/0170771 A1* | 7/2007 | Cavinder | E21C 41/16 299/19 |
| 2009/0327011 A1* | 12/2009 | Petroff | G06Q 10/02 705/5 |
| 2013/0119745 A1* | 5/2013 | Zimmerman | E21F 13/00 299/18 |

OTHER PUBLICATIONS

International Search Report dated Jan. 20, 2015, issued for PCT/JP2014/076190.

* cited by examiner

MINE MANAGEMENT SYSTEM

CROSS REFERENCE TO RELATED APPLICATIONS

This application is related to two co-pending applications: "MINE MANAGEMENT SYSTEM" filed even date herewith in the names of Yuichi KODAMA; Masaaki UETAKE; Kazunari KAWAI; Shinichi TERADA and Rui FUKUI as a national phase entry of PCT/JP2014/076192 filed Sep. 30, 2014; and "MINE MANAGEMENT SYSTEM" filed even date herewith in the name of Yuichi KODAMA; Masaaki UETAKE; Kazunari KAWAI; Shinichi TERADA and Rui FUKUI as a national phase entry of PCT/JP2014/076207 filed Sep. 30, 2014; which applications are assigned to the assignee of the present application and all three incorporated by reference herein.

FIELD

The present invention relates to a mine management system used for a mining work inside an underground mine.

BACKGROUND

As a mining method used in a mine, there are known an opencast mining method of mining ore from a ground surface and an underground mining method of mining ore from an underground place. Since an environmental burden needs to be reduced and an ore existing part is located at a deep position, the underground mining method has been more frequently used in recent years. For example, according to a working machine disclosed in Patent Literature 1, a vehicle excavating ore by a bucket enters a mine shaft so as to excavate the ore and moves in the mine shaft while holding the excavated ore by the bucket.

CITATION LIST

Patent Literature

Patent Literature 1: U.S. Pat. No. 7,899,599

SUMMARY

Technical Problem

Generally, there is a demand to improve the productivity in the mine. The same also applies to the underground mining work. In the technique disclosed in Patent Literature 1, since the vehicle excavating the ore transports the ore while holding the ore, the productivity cannot be sufficiently improved.

An object of the invention is to suppress degradation in productivity in an underground mining work.

Solution to Problem

According to the present invention, a mine management system used to mine ore from a vein in a mine including a mining area provided inside an ore body, a first mine shaft provided inside the ore body, and a second mine shaft connecting the mining area and the first mine shaft to each other, the mine management system comprises: a transporting machine which loads the ore mined in the mining area and transports the ore to a soil discharge area while traveling in the first mine shaft; a loading machine which stays in the second mine shaft while a space used for the transporting machine to travel therein is left inside the first mine shaft, excavates the ore in the mining area, conveys the mined ore from the mining area in an opposite direction, and loads the ore on the transporting machine; and a management device which determines the mining area toward which the transporting machine is directed so that an operability of the loading machine becomes maximal or an operability of the transporting machine becomes maximal.

In the present invention, it is preferable that when the mining area toward which the transporting machine is directed is determined so that the operability of the loading machine becomes maximal, the management device obtains an empty time in which the loading machine disposed in the mining area does not load the ore on the transporting machine and sets the mining area in which the empty time becomes maximal as the mining area toward which the transporting machine is directed.

In the present invention, it is preferable that the empty time is a value obtained by subtracting a sum of a larger value of a time necessary for loading the ore on the loading machine provided in a candidate mining area at a current time point and an arrival time of another transporting machine directed toward the candidate mining area and a predicted loading time necessary for loading the ore on the other transporting machine from a movement time in which a target transporting machine determining the mining area moves to the candidate mining area.

In the present invention, it is preferable that when the mining area toward which the transporting machine is directed is determined so that the operability of the transporting machine becomes maximal, the management device predicts a loading start time necessary until the ore starts to be loaded on the transporting machine in the mining area toward which the transporting machine is directed after the transporting machine leaves the soil discharge area and sets the mining area in which the loading start time becomes minimal as the mining area toward which the transporting machine is directed.

In the present invention, it is preferable that the loading start time is a larger value among a movement time in which the target transporting machine determining the mining area moves to the candidate mining area and a value obtained by adding a larger value of a time necessary for loading the ore on the loading machine provided in the candidate mining area at a current time point and an arrival time of another transporting machine directed toward the candidate mining area to a predicted loading time necessary for loading the ore on the other transporting machine.

In the present invention, it is preferable that when the loading machine disposed in the candidate mining area is supposed to move, the management device further adds a movement time of the loading machine to the sum of the larger value of the time necessary for loading the ore on the loading machine provided in the candidate mining area at the current time point and the arrival time of the other transporting machine directed toward the candidate mining area and the predicted loading time necessary for loading the ore on the other transporting machine.

In the present invention, it is preferable that the management device determines the mining area toward which the target transporting machine is directed when the target transporting machine leaves the soil discharge area.

In the present invention, it is preferable that the mine includes a plurality of the soil discharge areas, and wherein the management device sets the soil discharge area of which a discharge start time taken until the transporting machine is able to discharge the ore is shortest among the soil discharge areas as the soil discharge area toward which the transporting machine is directed.

In the present invention, it is preferable that the management device obtains a total time for each soil discharge area and sets the soil discharge area of which the total time is shortest as the soil discharge area toward which the transporting machine is directed, the total time being discharge start time corresponding to a total time of a movement time in which the target transporting machine determining the soil discharge area moves to the soil discharge area and a time necessary for discharging the ore by the other transporting machine supposed to discharge the ore in the soil discharge area after a time in which the target transporting machine arrives at the soil discharge area.

In the present invention, it is preferable that when the soil discharge areas are provided in the traveling direction of the target transporting machine and any one of the soil discharge areas is empty, the management device sets the soil discharge area at the advancing direction side as the soil discharge area toward which the target transporting machine is directed.

In the present invention, it is preferable that the management device determines the soil discharge area toward which the target transporting machine is directed when the ore is completely loaded on the target transporting machine.

In the present invention, it is preferable that the mine includes a plurality of the first mine shafts, and wherein one loading machine is disposed in each of the first mine shafts to the maximum.

In the present invention, it is preferable that the mine includes a plurality of the first mine shafts and a third mine shaft connected to the first mine shafts and a circuit is formed by the third mine shaft and the first mine shaft.

In the present invention, it is preferable that the transporting machine travels in the circuit in a same direction.

Advantageous Effects of Invention

According to the invention, it is possible to suppress degradation in productivity in an underground mining work.

DESCRIPTION OF EMBODIMENTS

A mode for carrying out the invention (an embodiment) will be described in detail with reference to the drawings. Hereinafter, a positional relation among components will be described on the assumption that one direction within a predetermined plane is the X-axis direction, a direction orthogonal to the X-axis direction within a predetermined plane is the Y-axis direction, and a direction orthogonal to the X-axis direction and the Y-axis direction is the Z-axis direction. Further, the gravity action direction is set as the downside and the opposite direction to the gravity action direction is set as the upside. The productivity of the mine includes both the mining amount per unit time (t/h) and the cost per unit time ($/h). In the productivity of the mine, both quotients can be used as indexes as illustrated in the equation (1). $/t of the equation (1) is an index indicating productivity, t is a mining amount, h is time, and $ is cost. As the index $/t illustrated in the equation (1) decreases, the productivity of the mine increases.

$$\$/t = (\$/h)/(t/h) \qquad (1)$$

<Outline of Mining Site>

Figure 1:
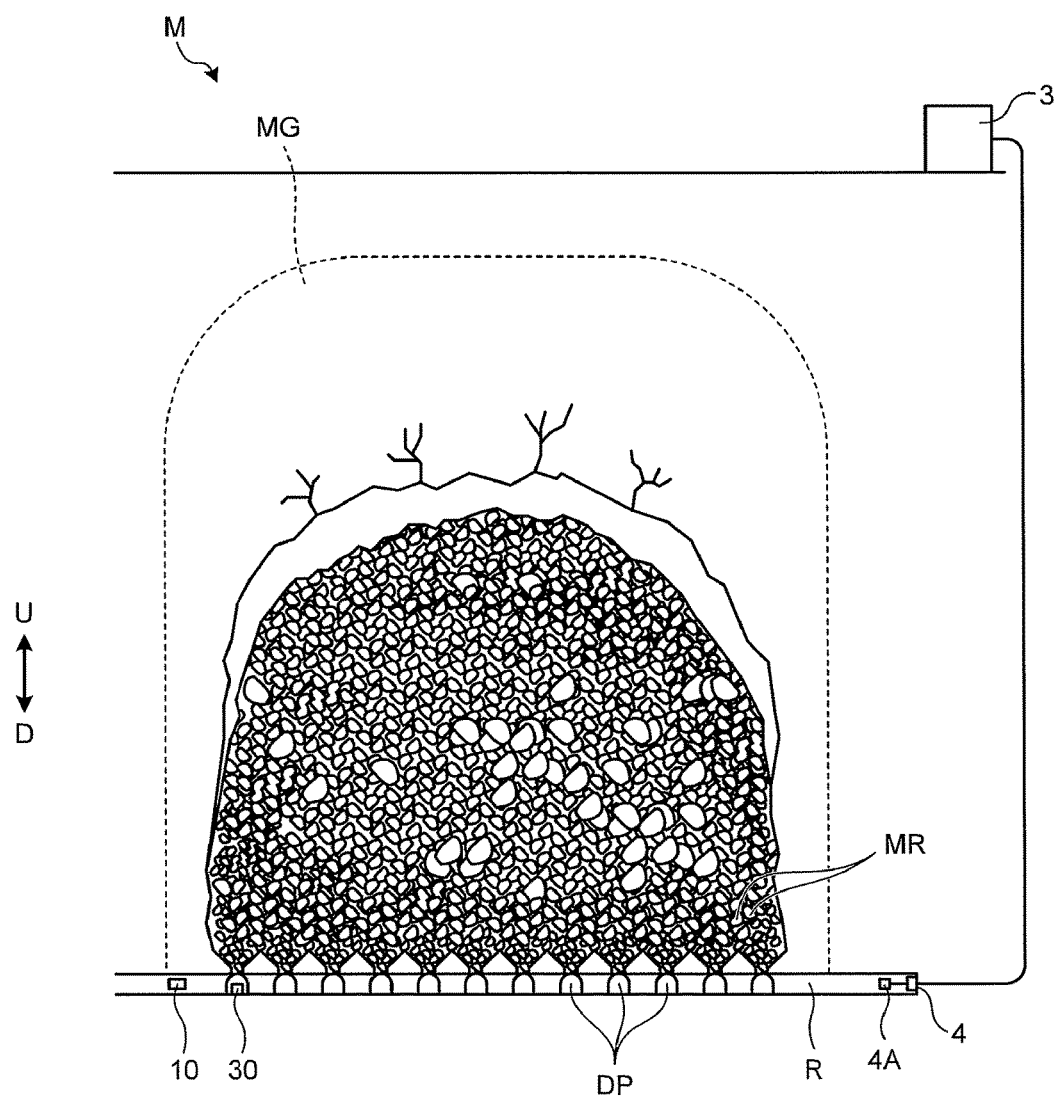
FIG. 1 is a schematic diagram illustrating an example of a site in which a transporting machine and a loading machine according to an embodiment are operated.

FIG. 1 is a schematic diagram illustrating an example of a site in which a transporting machine 10 and a loading machine 30 according to the embodiment are operated. The transporting machine 10 and the loading machine 30 are used for an underground mining method of mining ore from an underground place. The transporting machine 10 is a kind of a working machine which transports a load in a mine shaft R, and the loading machine 30 is a kind of a working machine which loads a load on the transporting machine 10. In the embodiment, ore is mined according to a block caving method.

The block caving method indicates a method in which an ore body (a vein) MG of a mine M is provided with a mining area (hereinafter, appropriately referred to as a draw point) DP for the ore MR and the mine shaft R for conveying mined ore and the upside of the draw point DP is undercut and blasted so as to naturally break and drop the ore MR. Accordingly, the ore MR is mined from the draw point DP. The draw point DP is provided at the inside of the ore body MG or the downside D of the ore body MG. The block caving method is a method that uses a principle in which a weak rock collapses when the downside of the rock bed or the ore body is undercut. When the ore MR is mined from the inside or the downside D of the ore body MG, even the upside is broken and dropped. For this reason, it is possible to efficiently mine the ore MR of the ore body MG when the block caving method is used. In the block caving method, the draw point DP is generally provided at a plurality of positions.

In the embodiment, a management device 3 is disposed on a ground. The management device 3 is provided in a management facility on a ground. In principle, the movement of the management device 3 is not considered. The management device 3 manages a mining site. The management device 3 can communicate with working machines including the transporting machine 10 and the loading machine 30 and used in the underground mine via a communication system including a radio communication device 4 and an antenna 4A. In the embodiment, the transporting machine 10 and the loading machine 30 are unmanned working machines, but may be manned working machines which are operated by an operator.

<Underground Mine MI>

Figure 2:
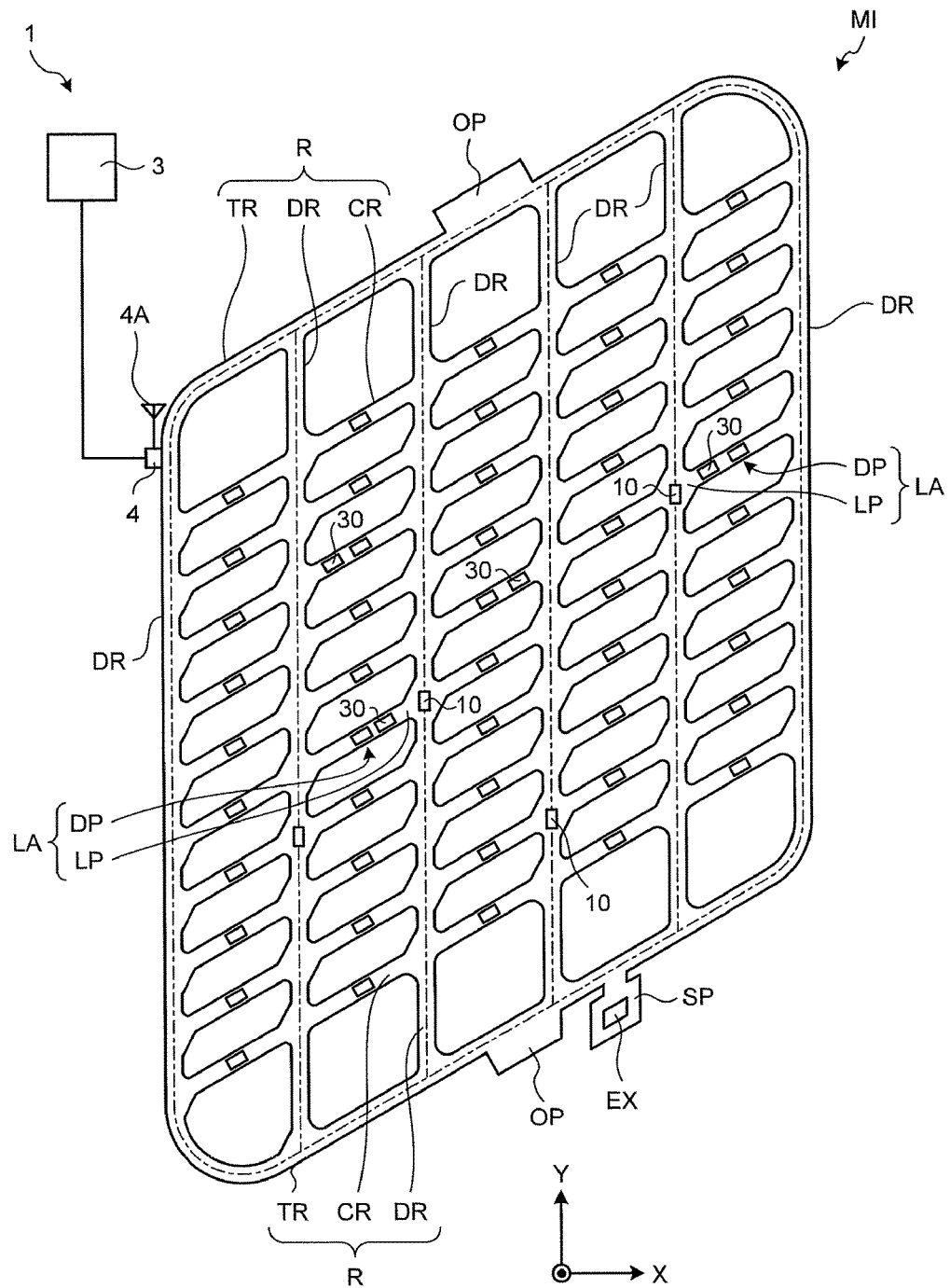
FIG. 2 is a schematic diagram illustrating an example of an underground mine and a mine mining system.
Figure 3:
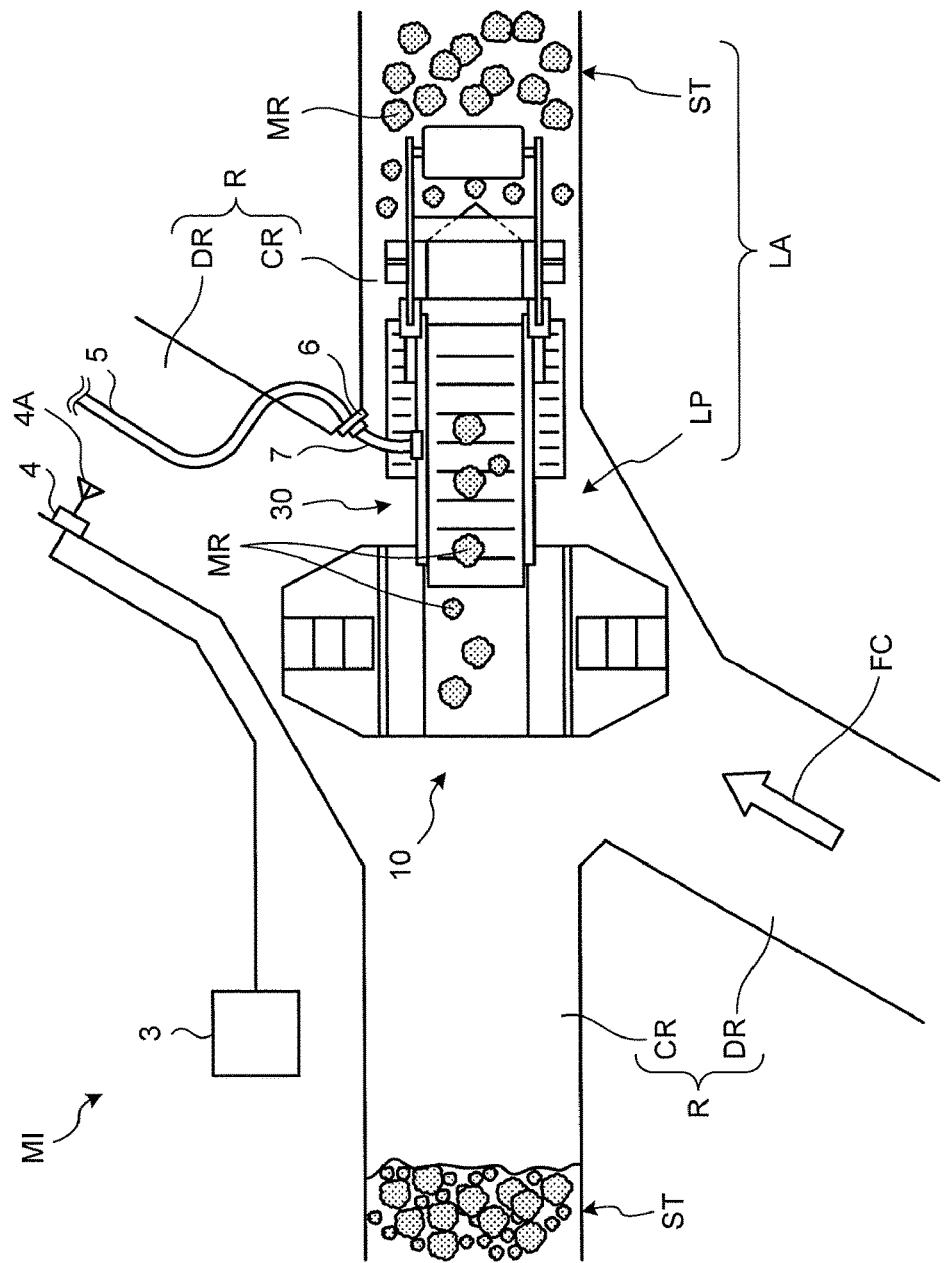
FIG. 3 is a partially enlarged diagram of FIG. 2.

FIG. 2 is a schematic diagram illustrating an example of an underground mine MI and a mine management system. FIG. 3 is a partially enlarged diagram of FIG. 2. As illustrated in these drawings, the mine shaft R provided at the downside D of the vein MG includes a first mine shaft DR and a second mine shaft CR. The mine shaft R is provided at, for example, the inside of the ore body MG or the downside D of the ore body MG. In the embodiment, each of the first mine shaft DR and the second mine shaft CR exists at a plurality of positions in the underground mine MI. The second mine shaft CR connects each draw point DP and each first mine shaft DR to each other. The loading machine 30 can approach the draw point DP through the second mine shaft CR. In the embodiment, the mine shaft R includes a third mine shaft TR. In the embodiment, a plurality of (in this example, two) third mine shafts TR is connected to the first mine shafts DR. Hereinafter, the first mine shaft DR will be appropriately referred to as the drift DR, the second mine shaft CR will be appropriately referred to as the cross cut CR, and the third mine shaft TR will be appropriately referred to as the outer track TR.

As illustrated in FIG. 2, the underground mine MI is provided with two outer tracks TR. Each outer track TR is not divided by the draw point DP unlike the cross cut CR. One outer track TR connects one ends of the drifts DR, and one outer track TR connects the other ends of the drifts DR. Likewise, all drifts DR are connected to two outer tracks TR. In the embodiment, the transporting machine 10 and the loading machine 30 can enter any drift DR from the outer track TR. In the example illustrated in FIG. 3, the transporting machine 10 and the loading machine 30 travel inside the drift DR in a direction indicated by the arrow FC.

As illustrated in FIGS. 2 and 3, a loading position LP where the loading machine 30 loads a load on the transporting machine 10 is set at the cross cut CR or the vicinity thereof. An area including the draw point DP and the loading position LP is referred to as a loading area LA.

As illustrated in FIG. 2, the underground mine MI is provided with a soil discharge area (an ore pass) DP in which the ore MR as the load transported by the transporting machine 10 is discharged. The transporting machine 10 loads the ore MR as the load thereon by the loading machine 30 in the loading area LA near the draw point DP, travels in the drift DR, and moves to the ore pass OP. The transporting machine 10 discharges the ore MR as the load to the arrived ore pass OP.

In the embodiment, the transporting machine 10 illustrated in FIGS. 2 and 3 includes a traveling motor and a storage battery supplying power to the motor. A space SP is connected to the outer track TR. The space SP connected to the outer track TR is provided with a storage battery exchange device EX which replaces the storage battery mounted on the transporting machine 10.

In the description below, for convenience of the description, it is assumed that the XY plane is substantially parallel to the road surface of the mine shaft R in which the transporting machine 10 travels. In fact, the road surface of the mine shaft R is uneven or is inclined upward and downward in many cases.

A mine management system 1 illustrated in FIG. 2 includes the management device 3 and the radio communication antenna 4A. The management device 3 manages, for example, the operation of the transporting machine 10 and the loading machine 30 operated in the underground mine MI. The operation management includes the allocation of the transporting machine 10 and the loading machine 30 and the collection and the management of the information (hereinafter, appropriately referred to as operation information) on the operation state of the transporting machine 10 and the loading machine 30. The operation information includes, for example, the operation time of the transporting machine 10 and the loading machine 30, the traveling distance thereof, a remaining storage battery amount, an abnormality check, an abnormality position, and a loading amount. The operation information is mainly used for the operation evaluation, the preventive maintenance, and the abnormality diagnosis of the transporting machine 10 and the loading machine 30. Thus, the operation information is useful in that the productivity of the mine M is improved or the operation of the mine is improved.

The management device 3 includes a communication device as will be described later. The radio communication device 4 including the antenna 4A is connected to the communication device. The management device 3 exchanges information with the transporting machine 10 and the loading machine 30 operated in the underground mine MI via, for example, the communication device, the radio communication device 4, and the antenna 4A. The management device 3 of the mine management system 1 manages the operation of the transporting machine 10 and the loading machine 30 as described above.

In the embodiment, the loading machine 30 travels by a traveling motor and excavates the ore MR while driving a raking device by a motor. As illustrated in FIG. 3, a power feeding cable 5 which supplies power from the outside of the loading machine 30 to the motors is provided in the mine shaft R of the underground mine MI. The loading machine 30 receives power from the power feeding cable 5 through, for example, a power feeding connector 6 provided in the loading area LA so as to serve as a power supply device and a power cable 7 extending from the loading machine 30. The power supply device may be provided in the drift DR or the cross cut CR. In the embodiment, the loading machine 30 may perform at least one of the traveling operation and the excavating operation by the external power. Further, the loading machine 30 may be equipped with a storage battery so as to perform at least one of the traveling operation and the excavating operation by the power supplied from the storage battery. Further, the loading machine 30 may be equipped with a storage battery so as to perform at least one of the traveling operation and the excavating operation by the power supplied from the storage battery. That is, the loading machine 30 performs at least one of the traveling operation and the excavating operation by at least one of the external power and the power supplied from the storage battery. For example, the loading machine 30 may perform the excavating operation by the external power and perform the traveling operation by the power supplied from the storage battery. Further, the loading machine 30 may perform the traveling operation by the external power when traveling inside the cross cut CR. In the embodiment, the loading machine 30 may excavate the ore MR by driving a hydraulic pump by a motor so as to generate a hydraulic pressure and driving the hydraulic motor by the hydraulic pressure. Further, the loading machine 30 may perform the excavating operation while traveling by the power supplied from the storage battery mounted therein.

The connection between the power feeding cable 5 and the power cable 7 extending from the loading machine 30 is not limited to the connector 6. For example, power may be supplied from the power feeding cable 5 to the loading machine 30 in a manner such that an electrode provided near the mine shaft R and connected to the power feeding cable 5 and an electrode connected to the power cable 7 extending from the loading machine 30 are used as a power supply device and both electrodes contact each other. In this way, even when the positioning precision of both electrodes is low, power can be supplied to the loading machine 30 while both electrodes contact each other. In the embodiment, the loading machine 30 is operated electrically, but the invention is not limited thereto. The loading machine 30 may travel or excavate the ore MR by, for example, an internal combustion engine. In this case, the loading machine 30 may travel or excavate the ore MR in a manner such that a hydraulic pump is driven by the internal combustion engine and, for example, a hydraulic motor or a hydraulic cylinder is driven by hydraulic oil ejected from the hydraulic pump.

<Excavation and Transportation of Ores MR>

Figure 4:
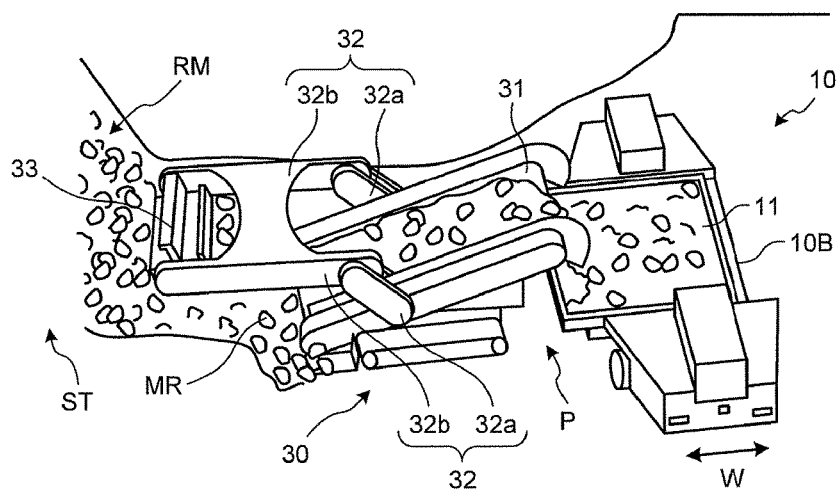
FIG. 4 is a diagram illustrating a state where ore of a rock mass are excavated by a loading machine so as to be loaded on a transporting machine.
Figure 5:
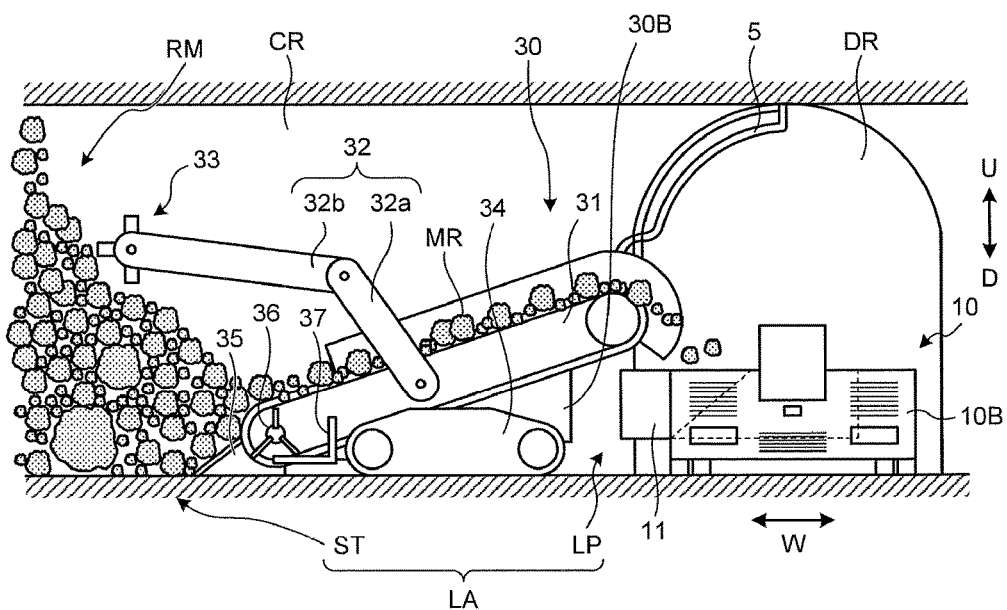
FIG. 5 is a diagram illustrating a state where ore of a rock mass are excavated by a loading machine so as to be loaded on a transporting machine.

FIGS. 4 and 5 are diagrams illustrating a state where the ore MR of the rock mass RM are excavated by the loading machine 30 so that the ore MR are loaded on the transporting machine 10. In the loading area LA, the rock mass RM of the ore MR is formed at the draw point DP. As illustrated in FIGS. 4 and 5, the loading machine 30 is provided inside the cross cut CR of the loading area LA and performs the excavating operation while the front end thereof penetrates the rock mass RM of the ore MR. The loading machine 30 loads the excavated ore MR onto the transporting machine 10 which is located at the opposite side to the rock mass RM so as to be located inside the drift DR in a standby state. The power feeding cable 5 which supplies power to the loading machine 30 is provided inside the drift DR.

As illustrated in FIGS. 4 and 5, the loading machine 30 includes a vehicle body 30B, a feeder 31 serving as a conveying device, a rotation roller 33 serving as an excavating device, a support mechanism 32 supporting the rotation roller 33, and a traveling device 34. The rotation roller 33 and the support mechanism 32 serve as a raking device that excavates the ore MR and feeds the ore to the feeder 31.

The support mechanism 32 includes a boom 32a which serves as a first member attached to the vehicle body 30B and an arm 32b which swings while being connected thereto and serves as a second member and rotatably supports the rotation roller 33. The vehicle body 30B of the loading machine 30 includes a penetration member 35 that penetrates the rock mass RM of the ore MR, a rotation body 36, and a rock guard 37. The penetration member 35 penetrates the rock mass RM when excavating the ore MR. The rotation body 36 assists the penetration while rotating when the penetration member 35 of the loading machine 30 penetrates the rock mass RM.

The transporting machine 10 includes a vehicle body 10B and a vessel 11. The vessel 11 is mounted on the vehicle body 10B. The vessel 11 loads the ore MR as a load thereon. In the embodiment, the vessel 11 moves in the width direction W of the vehicle body 10B, that is, a direction parallel to the axle as illustrated in FIGS. 4 and 5. The vessel 11 is provided at the center of the vehicle body 10B in the width direction when the transporting machine 10 travels. Further, the vessel 11 moves outward in the width direction of the vehicle body 10B when the ore MR is loaded thereon. As a result, since the transporting machine 10 can move the vessel 11 toward the downside D of the feeder 31 of the loading machine 30, it is possible to reliably drop the ore MR into the vessel 11 by decreasing the possibility that the ore MR conveyed by the feeder 31 falls to the outside of the vessel 11.

In the embodiment, as illustrated in FIGS. 4 and 5, the loading machine 30 excavates the ore MR and conveys the excavated ore MR so that the ore is loaded on the transporting machine 10. The transporting machine 10 conveys the ore MR loaded thereon to the ore pass OP illustrated in FIG. 2 and discharges the ore thereto. At this time, the loading machine 30 stays in the cross cut CR while the traveling space of the transporting machine 10 is left inside the drift DR, and the ore MR is excavated at the draw point DP. Then, the loading machine 30 conveys the excavated ore MR in a direction moving away from the draw point DP and loads the ore onto the transporting machine 10. The loading machine 30 does not move while the excavated ore MR is loaded thereon. The transporting machine 10 loads the ore MR mined at the draw point DP and travels in the drift DR so as to transport the ore to the ore pass OP illustrated in FIG. 2.

Likewise, in the embodiment, the mine management system 1 causes the loading machine 30 to perform only an operation of excavating and loading the ore MR and causes the transporting machine 10 to perform only an operation of transporting the ore MR. In this way, both functions are separated. For this reason, the loading machine 30 can be used only for the excavating work and the conveying work and the transporting machine 10 can be used only for the transporting work. That is, the loading machine 30 may not have a function of transporting the ore MR and the transporting machine 10 may not have a function of excavating and conveying the ore MR. Since the loading machine 30 can be dedicated for the function of excavating and conveying the ore and the transporting machine 10 can be dedicated for the function of transporting the ore MR, the functions can be exhibited maximally. As a result, the mine management system 1 can improve the productivity of the mine M.

<Management Device 3 of Mine Management System 1>

Figure 6:
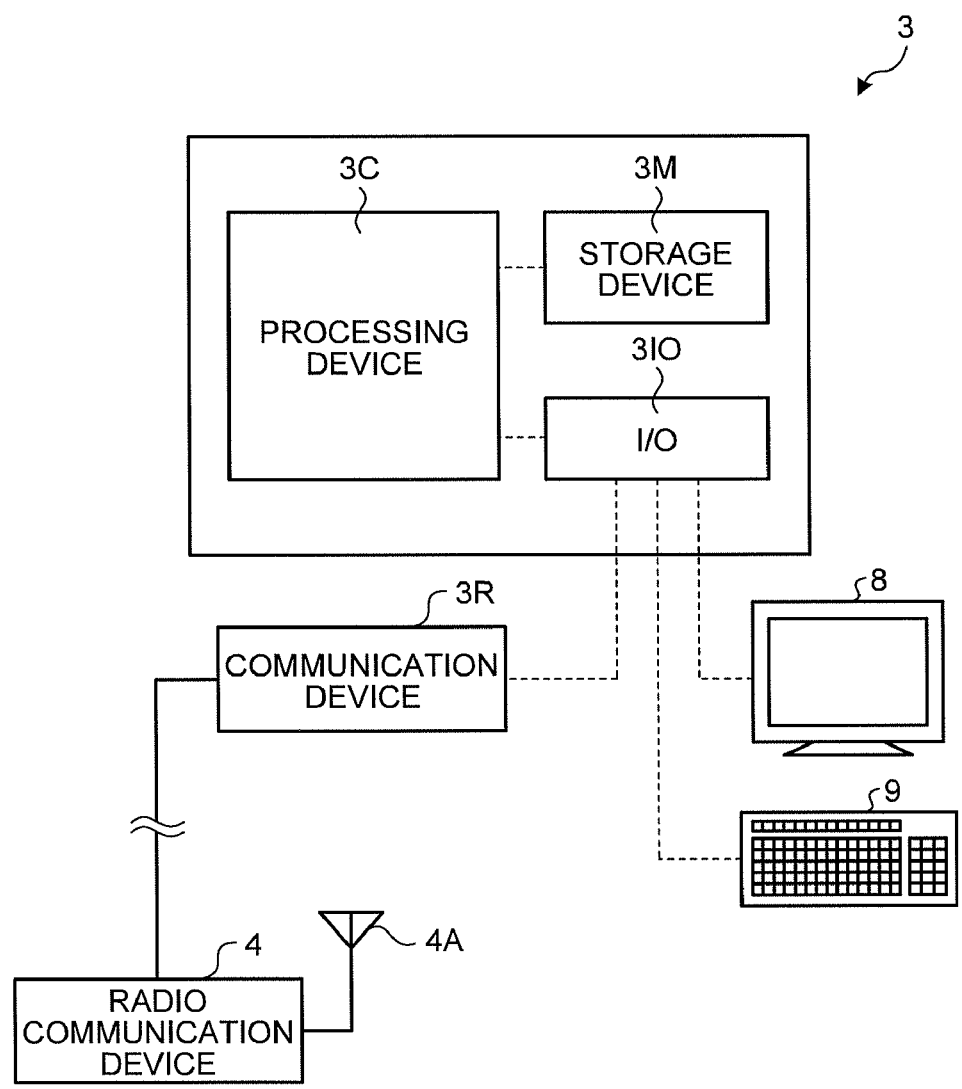
FIG. 6 is an example of a functional block diagram of a management device of a mine management system.

FIG. 6 is an example of a functional block diagram of the management device 3 of the mine management system 1. The management device 3 includes a processing device 3C, a storage device 3M, and an input and output unit (I/O) 310. Further, the management device 3 has a configuration in which a display device 8 as an output device, an input device 9, and a communication device 3R are connected to the input and output unit 310. The management device 3 is, for example, a computer. The processing device 3C is, for example, a CPU (Central Processing Unit). The storage device 3M is, for example, a RAM (Random Access Memory), a ROM (Read Only Memory), a flash memory, or a hard disk drive or a combination thereof. The input and output unit 310 is used as an input and output unit (an interface) that inputs and outputs information to and from the processing device 3C, the display device 8 connected to, the outside of the processing device 3C, the input device 9, and the communication device 3R.

The processing device 3C performs a process of the management device 3 involved with the allocation of the transporting machine 10 and the loading machine 30 and the collection of the operation information. The process involved with the allocation and the collection of the operation information is realized in a manner such that the processing device 3C reads out a corresponding computer program from the storage device 3M and executes the corresponding computer program.

The storage device 3M stores various computer programs for performing various processes by the processing device 3C. In the embodiment, the computer program stored in the storage device 3M corresponds to, for example, a computer program for allocating the transporting machine 10 and the loading machine 30, a computer program for collecting the operation information of the transporting machine 10 and the loading machine 30, and a computer program used for various kinds of analysis based on the operation information.

The display device 8 is, for example, a liquid crystal display and displays information necessary for the allocation of the transporting machine 10 and the loading machine 30 or the collection of the operation information. The input device 9 is, for example, a keyboard, a touch panel, or a mouse and is used to input information necessary when the transporting machine 10 and the loading machine 30 are allocated or the operation information is collected. The communication device 3R is connected to the radio communication device 4 including the antenna 4A. As described above, the radio communication device 4 and the antenna 4A are provided in the underground mine MI. The communication device 3R and the radio communication device 4 are connected to each other by a wire. The communication device 3R can communicate with the transporting machine 10 and the loading machine 30 of the underground mine MI by, for example, a wireless LAN (Local Aria Network). Next, the transporting machine 10 will be described in more detail.

<Transporting Machine 10>

Figure 7:
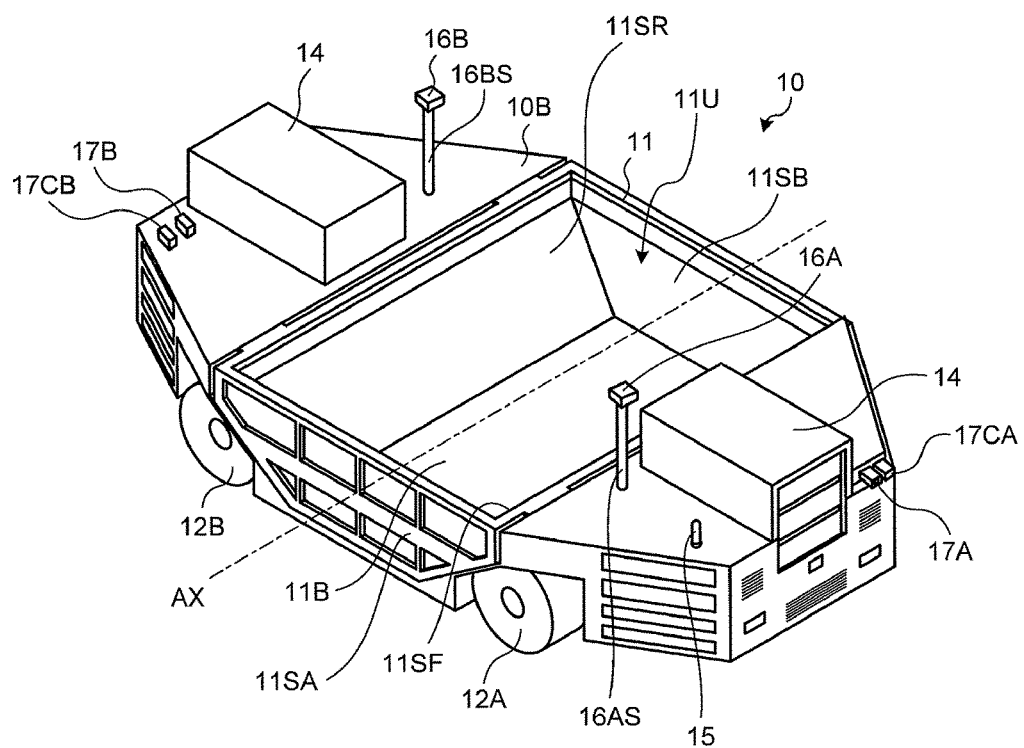
FIG. 7 is a perspective view of a transporting machine according to the embodiment.
Figure 8:
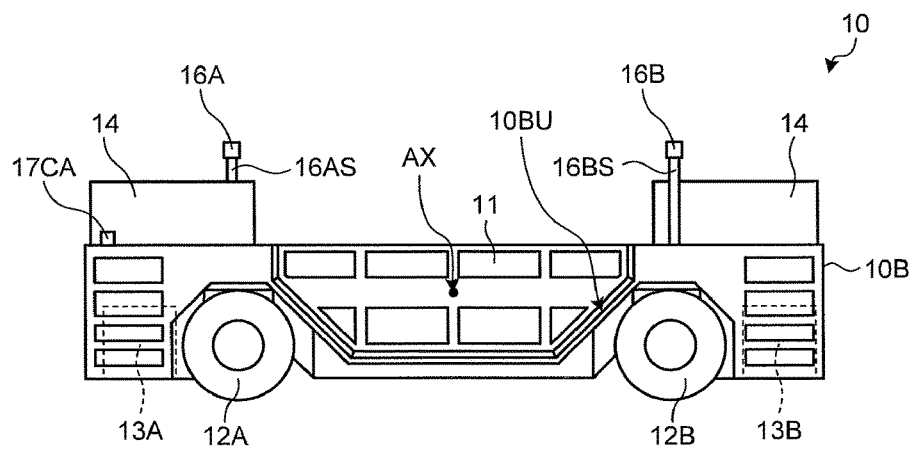
FIG. 8 is a side view of the transporting machine according to the embodiment.

FIG. 7 is a perspective view of the transporting machine 10 according to the embodiment. FIG. 8 is a side view of the transporting machine 10 according to the embodiment. The transporting machine 10 includes the vehicle body 10B, the vessel 11, and vehicle wheels 12A and 12B. Further, the transporting machine 10 includes a storage battery 14 as a condenser, an antenna 15, image capturing devices 16A and 16B, and non-contact sensors 17A and 17B. The vehicle wheels 12A and 12B are respectively provided at the front and rear sides of the vehicle body 10B. In the embodiment, the vehicle wheels 12A and 12B are driven by motors 13A and 13B mounted inside the vehicle body 10B illustrated in FIG. 8. Likewise, the transporting machine 10 has a configuration in which all vehicle wheels 12A and 12B serve as drive wheels. Further, in the embodiment, the vehicle wheels 12A and 12B are respectively steering wheels. In the embodiment, the vehicle wheels 12A and 12B are, for example, solid tires. With such a configuration, since the vehicle wheels 12A and 12B have small diameters, the height of the transporting machine 10 is suppressed. The transporting machine 10 can travel in any one of a direction from the vehicle wheel 12A to the vehicle wheel 12B and a direction from the vehicle wheel 12B to the vehicle wheel 12A. The vehicle wheels 12A and 12B may not be solid tires and may be, for example, pneumatic tires or the like. Further, only one of the vehicle wheels 12A and 123 may be the drive wheel.

The vessel 11 is mounted at the upside of the vehicle body 10B and is supported by the vehicle body 10B. The vehicle body 10B is equipped with the storage battery 14 which supplies power to the motors 13A and 13B. In the embodiment, the outer shape of the storage battery 14 is a rectangular parallelopiped shape. The storage battery 14 is mounted on each of the front and rear sides of the vehicle body 10B. With such a configuration, since the mass of the transporting machine 10 is substantially uniform in the front and rear direction, the transporting machine can travel stably. The storage battery 14 is mounted on the vehicle body 10B in an attachable and detachable manner. By the power supplied from the storage battery 14, the motors 13A and 13B and the electronic devices of the transporting machine 10 are operated. In the embodiment, the transporting machine 10 is operated electrically, but an internal combustion engine may be a power source.

The vehicle body 10B is equipped with the antenna 15, the image capturing devices 16A and 16B, and the non-contact sensors 17A and 17B. The antenna 15 communicates with the management device 3 according to a radio communication via the antenna 4A and the communication device 3R illustrated in FIG. 6. The image capturing devices 16A and 16B capture the image of the load loaded on the vessel 11. In the embodiment, the state (the packing style) of the ore MR illustrated in FIGS. 3 and 4 is captured as an image. The image capturing devices 16A and 16B may be, for example, cameras using visible rays or IR cameras using infrared rays. The image capturing devices 16A and 16B are respectively attached to front ends of support pillars 16AS and 16BS attached to the upper surface of the vehicle body 10B. With such a structure, since the image capturing devices 16A and 16B can capture the image of the entire vessel 11 from the upside, the state of the ore MR loaded on the vessel 11 can be reliably captured as an image.

The non-contact sensors 17A and 17B are respectively attached to the front and rear sides of the vehicle body 10B. The non-contact sensors 17A and 17B detect an object existing in the periphery of the transporting machine 10, that is, an object existing in the advancing direction in a non-contact state. As the non-contact sensors 17A and 17B, for example, radar devices are used. The non-contact sensors 17A and 17B can detect the distance and the orientation with respect to the object by emitting radio waves or ultrasonic waves and receiving radio waves reflected from the object. The non-contact sensors 17A and 17B are not limited to the radar devices. Each of the non-contact sensors 17A and 17B may include at least one of, for example, a laser scanner and a three-dimensional distance sensor.

The transporting machine 10 includes periphery monitoring cameras 17CA and 17CB which are respectively provided at the front and rear sides of the vehicle body 10B so as to serve as the image capturing devices. The periphery monitoring cameras 17CA and 17CB detect the object existing in the periphery of the vehicle body 10B by capturing the periphery, that is, the front side of the vehicle body 10B.

The vehicle body 10B includes a concave portion 10BU which is formed between the front and rear parts thereof. The concave portion 10BU is disposed between the vehicle wheel 12A and the vehicle wheel 12B. The vessel 11 is a member that loads the ore MR as the load thereon by the loading machine 30. At least a part of the vessel 11 is disposed in the concave portion 10BU.

In the embodiment, a part of the vehicle body 10B disposed at one side of the central portion AX of the vehicle body 10B in the front and rear direction of the vehicle body 10B is symmetrical (in the front and rear direction) to a part of the vehicle body 10B disposed at the other side thereof. Further, a part of the vessel 11 disposed at one side of the central portion AX of the vehicle body 10B in the front and rear direction of the vehicle body 10B is symmetrical (in the front and rear direction) to a part of the vessel 11 disposed at the other side thereof. Further, the vehicle body 10B and the vessel 11 is symmetrical (in the left and right direction) with respect to the axis in the front and rear direction of the vehicle body 10B in the top view.

The vessel 11 includes a bottom surface 11B and four side surfaces 11SF, 11SR, 11SA, and 11SB connected to the bottom surface 11B. The side surfaces 11SA and 11SB are formed uprightly from the bottom surface 11B. The side surfaces 11SF and 11SR are respectively inclined toward the vehicle wheels 12A and 12B with respect to the bottom surface 11B. A concave portion 11U is formed by the bottom surface 11B and four side surfaces 11SF, 11SR, 11SA, and 11SB. The ore MR as the load is loaded on the concave portion 11U. The concave portion 10BU of the vehicle body 10B has a shape following the outer shape of the vessel 11. Next, the support structure of the vessel 11 will be described.

Figure 9:
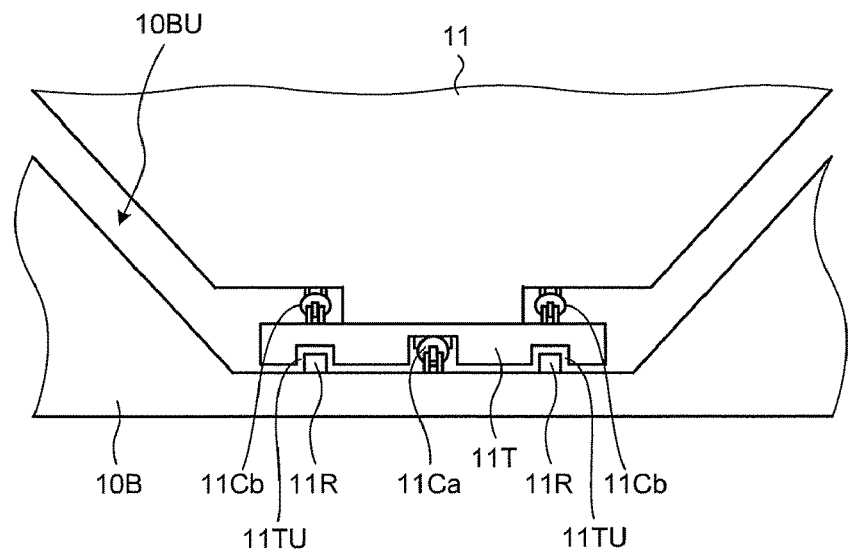
FIG. 9 is a diagram illustrating a vessel support structure of the transporting machine according to the embodiment.
Figure 10:
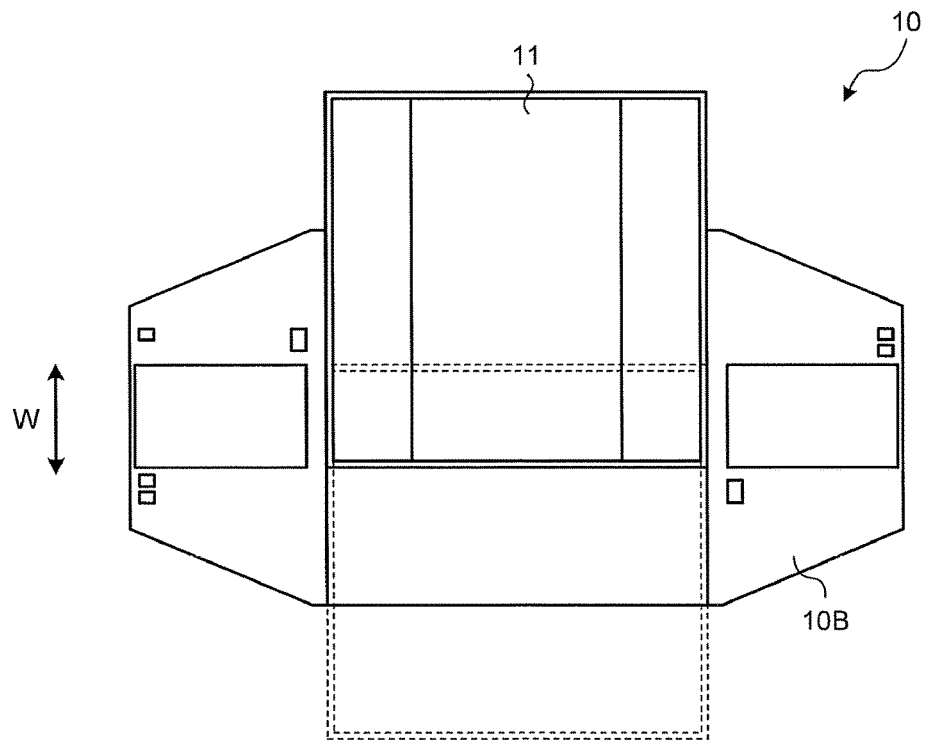
FIG. 10 is a top view of the transporting machine according to the embodiment.
Figure 11:
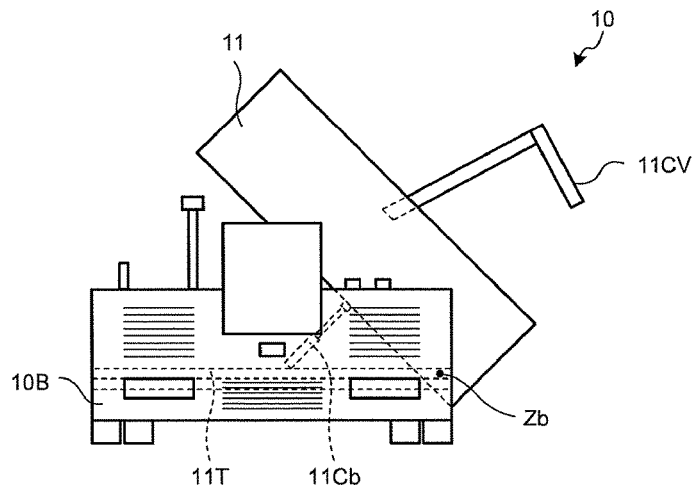
FIG. 11 is a diagram illustrating a state where a vessel of the transporting machine according to the embodiment is inclined.

FIG. 9 is a diagram illustrating the support structure of the vessel 11 of the transporting machine 10 according to the embodiment. FIG. 10 is a top view of the transporting machine 10 according to the embodiment. FIG. 11 is a diagram illustrating a state where the vessel of the transporting machine 10 according to the embodiment is inclined. The vessel 11 is placed on the upper surface of a table 11T through a hydraulic cylinder (a hoist cylinder) 11Cb serving as an actuator elevating the vessel 11.

The table 11T is supported by the vehicle body 10B through a pair of support bodies 11R and 11R provided on the upper surface of the concave portion 10BU of the vehicle body 10B. The support body 11R is a bar-shaped member that extends in the width direction of the vehicle body 10B. The support bodies 11R and 11R are respectively fitted to a pair of grooves 11TU and 11TU provided in a part facing the vehicle body 10B in the table 11T. The grooves 11TU and 11TU are provided in the extension direction of the support body 11R, that is, the width direction of the vehicle body 10B. With such a structure, the table 11T moves along the support bodies 11R and 11R. That is, the table 11T can move in the width direction of the vehicle body 10B of the transporting machine 10.

A hydraulic cylinder (a sliding cylinder) 11Ca as an actuator moving the table 11T in the width direction of the vehicle body 10B is attached between the table 11T and the vehicle body 10B. When the hydraulic cylinder 11Ca moves in a telescopic manner, the table 11T moves toward both sides of the vehicle body 10B in the width direction. Since the vessel 11 is attached to the table 11T, the vessel 11 also can move toward both sides in the width direction W of the vehicle body 10B along with the table 11T as illustrated in FIG. 10.

When the ore MR is loaded from the loading machine 30 onto the vessel 11, the vessel 11 moves toward the loading machine 30 as illustrated in FIG. 5. With such a configuration, the transporting machine 10 can reliably load the ore MR onto the vessel 11. Further, when the ore MR is not uniformly loaded so as to be biased toward one side of the vessel 11, the transporting machine 10 can suppress the non-uniform loading of the ore MR by moving the vessel 11 in a reciprocating manner in the width direction of the vehicle body 10B so as to disperse the ore MR in the entire vessel 11.

The vessel 11 is elevated by the telescopic movement of the hydraulic cylinder 11Cb. FIG. 11 illustrates a state where the hydraulic cylinder 11Cb is lengthened so that the vessel 11 is inclined. As illustrated in FIG. 11, the vessel 11 swings about one axis Zb in the width direction W of the vehicle body 10B. The axis Zb is inclined in the table 11T and is parallel to the front and rear direction of the vehicle body 10B. When the hydraulic cylinder 11Cb is lengthened, the vessel 11 protrudes from the concave portion 10BU of the vehicle body 10B while the opposite side to the axis Zb increases in height. As a result, the vessel 11 is inclined and a cover 11CV near the axis Zb is opened so that the ore MR is discharged from the axis Zb side. When the hydraulic cylinder 11Cb is shortened, the vessel 11 enters the concave portion 10BU of the vehicle body 10B. The cover 11CV is synchronized with the elevating operation of the vessel 11 by a link mechanism (not illustrated).

In the embodiment, the vessel 11 only swings about the axis Zb existing at one side in the width direction W of the vehicle body 10B, but the invention is not limited thereto. For example, the vessel 11 may swing about another axis existing at the other side and parallel to the front and rear direction of the vehicle body 10B in addition to the axis Zb at one side of the vehicle body 10B. In this way, the transporting machine 10 can discharge the ore MR from both sides in the width direction W of the vehicle body 10B.

Figure 12:
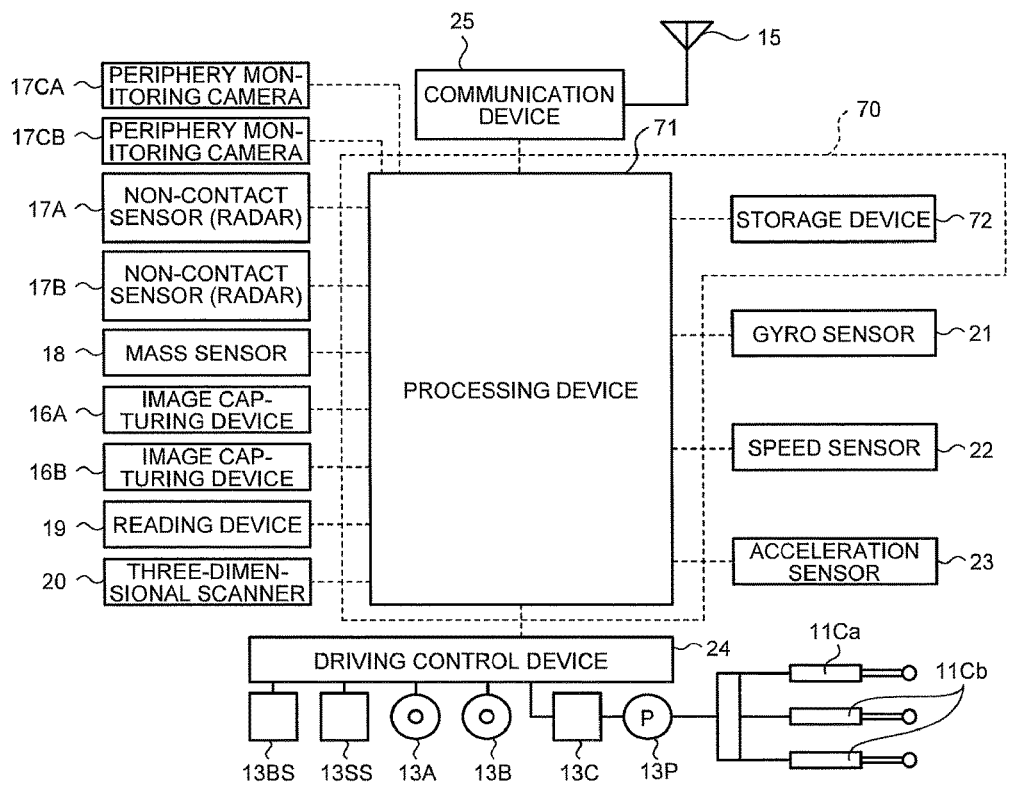
FIG. 12 is an example of a block diagram illustrating a control device of the transporting machine.

FIG. 12 is an example of a block diagram illustrating a control device 70 of the transporting machine 10. The control device 70 of the transporting machine 10 controls the traveling operation of the transporting machine 10 and the elevation and the movement in the width direction of the vessel 11. The control device 70 includes a processing device 71 and a storage device 72. The image capturing devices 16A and 16B, the non-contact sensors 17A and 17B, the periphery monitoring cameras 17CA and 17CB, a mass sensor 18, a reading device 19, a three-dimensional scanner 20, a gyro sensor 21, a speed sensor 22, an acceleration sensor 23, a driving control device 24, a communication device 25, and the storage device 72 are connected to the processing device 71.

Each of the image capturing devices 16A and 16B and the periphery monitoring cameras 17CA and 17CB includes an imaging element such as CCD or CMOS and can detect the outer shape of an object by obtaining an optical image of the object. In the embodiment, at least one of the image capturing devices 16A and 16B and the periphery monitoring cameras 17CA and 17CB includes a stereo camera and can obtain the three-dimensional outer shape data of the object.

The image capturing devices 16A and 16B and the periphery monitoring cameras 17CA and 17CB output an image capturing result to the processing device 71. The processing device 71 obtains the detection result of the image capturing devices 16A and 16B and obtains information on the state of the ore MR of the vessel 11 based on the detection result. In the embodiment, the outer shape of the ore MR loaded on the vessel 11 may be detected by at least one of the laser scanner and the three-dimensional distance sensor.

The non-contact sensors 17A and 17B are connected to the processing device 71 and output a detection result to the processing device 71. The non-contact sensors 17A and 17B output the obtained result to the processing device 71. The mass sensor 18 detects the mass of the vessel 11 and the mass of the ore MR loaded on the vessel 11. Since the mass of the vessel 11 is given, the mass of the ore MR loaded on the vessel 11 can be obtained when the mass of the vessel 11 is subtracted from the detection result of the mass sensor 18. The mass sensor 18 is connected to the processing device 71 and output a detection result to the processing device 71. The processing device 71 obtains information on whether the ore MR is loaded on the vessel 11 and the mass of the ore MR loaded on the vessel 11 based on the detection result of the mass sensor 18. The mass sensor 18 may be, for example, a strain gauge type load cell provided between the vessel 11 and the table 11T or a pressure sensor detecting the hydraulic pressure of the hydraulic cylinder 11Cb.

The reading device 19 detects identification information (original information) of a mark provided in the drift DR. The mark is disposed at a plurality of positions along the drift DR. The mark may be an identifier (a code) like a barcode and a two-dimensional code or may be an identifier (a tag) like an IC tag and an RFID. The reading device 19 is connected to the processing device 71 and outputs a detection result to the processing device 71.

The three-dimensional scanner 20 is attached to the outside, for example, the front and rear sides of the vehicle body 10B of the transporting machine 10, obtains spatial physical shape data around the transporting machine 10, and outputs the spatial physical shape data. The gyro sensor 21 detects the orientation (the orientation change amount) of the transporting machine 10 and outputs a detection result to the processing device 71. The speed sensor 22 detects the traveling speed of the transporting machine 10 and outputs a detection result to the processing device 71. The acceleration sensor 23 detects the acceleration of the transporting machine 10 and outputs a detection result to the processing device 71. The driving control device 24 is, for example, a microcomputer. The driving control device 24 controls the operation of the traveling motors 13A and 13B, a braking system 13BS, a steering system 13SS, and a motor 13C driving a hydraulic pump 13P based on the instruction from the processing device 71. The hydraulic pump 13P is a device which supplies hydraulic oil to the hydraulic cylinders 11Ca and =b. In the embodiment, the transporting machine 10 travels by the traveling motors 13A and 13B, but the invention is not limited thereto. For example, the transporting machine 10 may travel by a hydraulic motor driven by the hydraulic oil ejected from the hydraulic pump 13P. The braking system 13BS and the steering system 13SS may be operated by electrical power or a hydraulic pressure.

In the embodiment, the information on the position (the absolute position) where the mark is disposed in the drift DR is given information measured in advance. The information on the absolute position of the mark is stored in the storage device 72. The processing device 71 can obtain the absolute position of the transporting machine 10 in the drift DR based on the storage information of the storage device 72 and the detection result of the mark (the identification information of the mark) detected by the reading device 19 provided in the transporting machine 10.

The three-dimensional scanner 20 includes a scan type electronic distance meter capable of outputting the spatial physical shape data. The three-dimensional scanner 20 includes, for example, at least one of a laser scanner and a three-dimensional distance sensor and can obtain and output two-dimensional or three-dimensional space data. The three-dimensional scanner 20 detects at least one of the loading machine 30 and the wall surface of the drift DR. In the embodiment, the three-dimensional scanner 20 can obtain at least one of the shape data of the loading machine 30, the wall surface shape data of the drift DR, and the load shape data of the vessel 11. Further, the three-dimensional scanner 20 can detect at least one of the relative position (the relative distance and the orientation) with respect to the loading machine 30 and the relative position with respect to the wall surface of the drift DR. The three-dimensional scanner 20 outputs the detected information to the processing device 71.

In the embodiment, the information on the wall surface of the drift DR is obtained in advance and is stored in the storage device 72. That is, the information on the wall surface of the drift DR is given information measured in advance. The information on the wall surface of the drift DR includes information on the shapes of a plurality of parts of the wall surface and information on the absolute positions of the parts of the wall surface. The storage device 72 store a relation of the shapes of the plurality of parts of the wall surface with respect to the absolute positions of the parts of the wall surface having the shape. The processing device 71 can obtain the absolute position and the orientation of the transporting machine 10 of the drift DR based on the storage information of the storage device 72 and the detection result (the wall surface shape data) of the wall surface of the drift DR detected by the three-dimensional scanner 20 provided in the transporting machine 10.

The processing device 71 controls the transporting machine 10 traveling in the drift DR so that the transporting machine 10 travels along the determined course (the target course) in the underground mine MI based on the current position (the absolute position) of the transporting machine 10 derived by at least one of the reading device 19 and the three-dimensional scanner 20.

The processing device 71 is, for example, a microcomputer including a CPU. The processing device 71 controls the traveling motors 13A and 13B, the braking system 13BS, and the steering system 13SS of the vehicle wheels 12A and 12B through the driving control device 24 based on the detection result of the non-contact sensors 17A and 17B, the reading device 19, and the three-dimensional scanner 20. Then, the processing device 71 causes the transporting machine 10 to travel along the target course at a predetermined traveling speed and a predetermined acceleration.

The storage device 72 includes at least one of a RAM, a ROM, a flash memory, and a hard disk drive and is connected to the processing device 71. The storage device 72 stores a computer program and various kinds of information necessary when the processing device 71 causes the transporting machine 10 to travel autonomously. The communication device 25 is connected to the processing device 71 and communicates with at least one of the communication device and the management device 3 mounted on the loading machine 30 according to a data communication.

In the embodiment, the transporting machine 10 is an unmanned vehicle and can travel autonomously. The communication device 25 can receive information (including an instruction signal) transmitted from at least one of the management device 3 and the loading machine 30. Further, the communication device 25 can transmit the information detected by the image capturing devices 16A and 16B, the periphery monitoring cameras 17CA and 17CB, the speed sensor 22, and the acceleration sensor 23 to at least one of the management device 3 and the loading machine 30. The transporting machine 10 transmits the peripheral information of the transporting machine 10 obtained by at least one of the periphery monitoring cameras 17CA and 17CB and the non-contact sensors 17A and 17B to the management device 3. Accordingly, an operator can remotely operate the transporting machine 10 based on the peripheral information. Likewise, the transporting machine 10 travels autonomously and travels even by the operation of the operator. Further, the vessel 11 can be slid and elevated.

For example, the management device 3 which obtains the information detected by the speed sensor 22 and the acceleration sensor 23 stores the information as the operation information of the transporting machine 10 in, for example, the storage device 3M. Further, when the management device 3 obtains the information captured by the periphery monitoring cameras 17CA and 17CB, the operator can operate the transporting machine 10 while seeing the peripheral image of the transporting machine 10 captured by the periphery monitoring cameras 17CA and 17CB. Further, the loading machine 30 which obtains the information on the mass of the ore MR of the vessel 11 detected by the mass sensor 18 can control the amount of the ore MR loaded on the vessel 11 based on the information. Next, the loading machine 30 will be described.

<Loading Machine 30>

Figure 13:
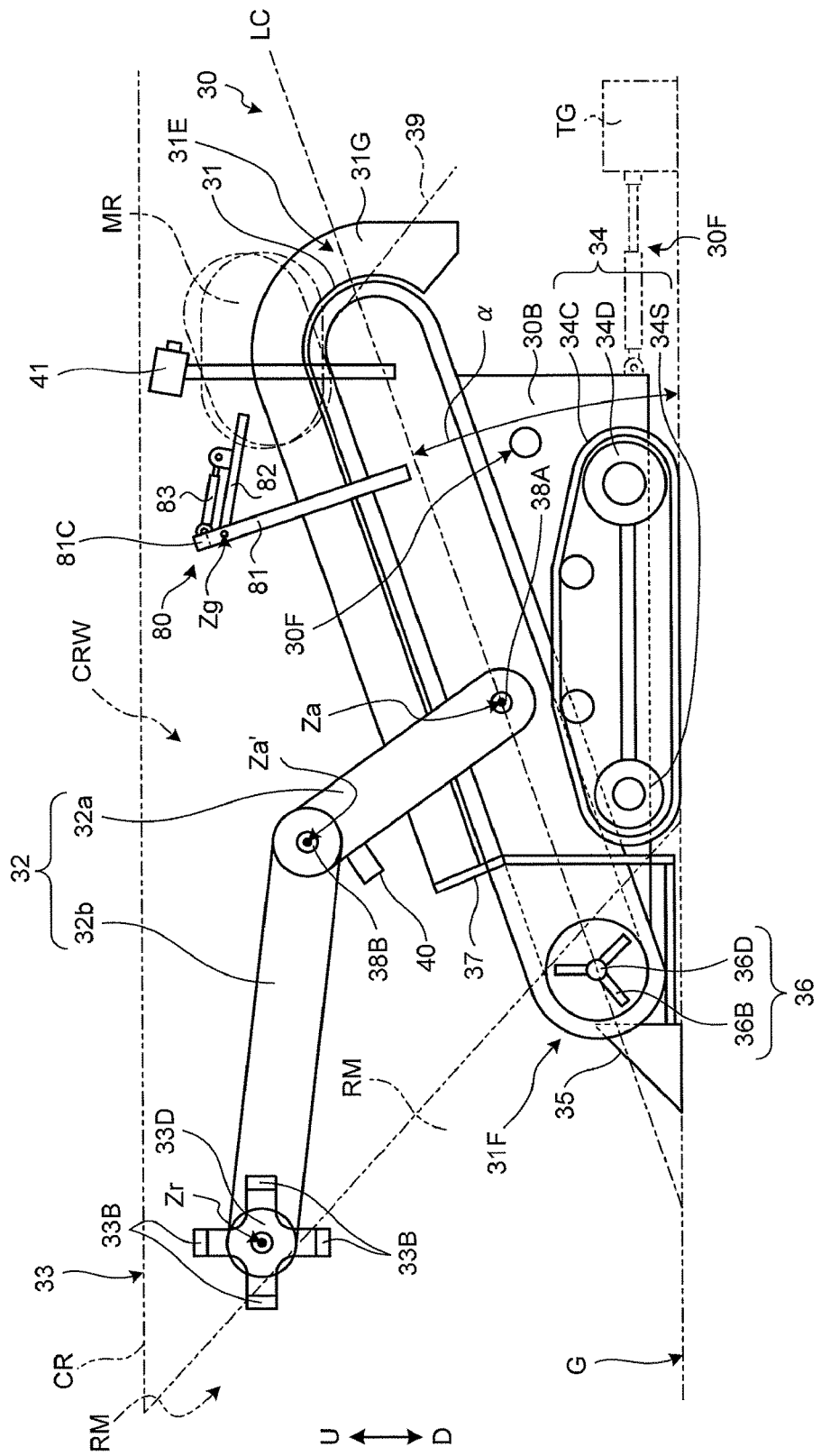
FIG. 13 is a side view of a loading machine according to the embodiment.
Figure 14:
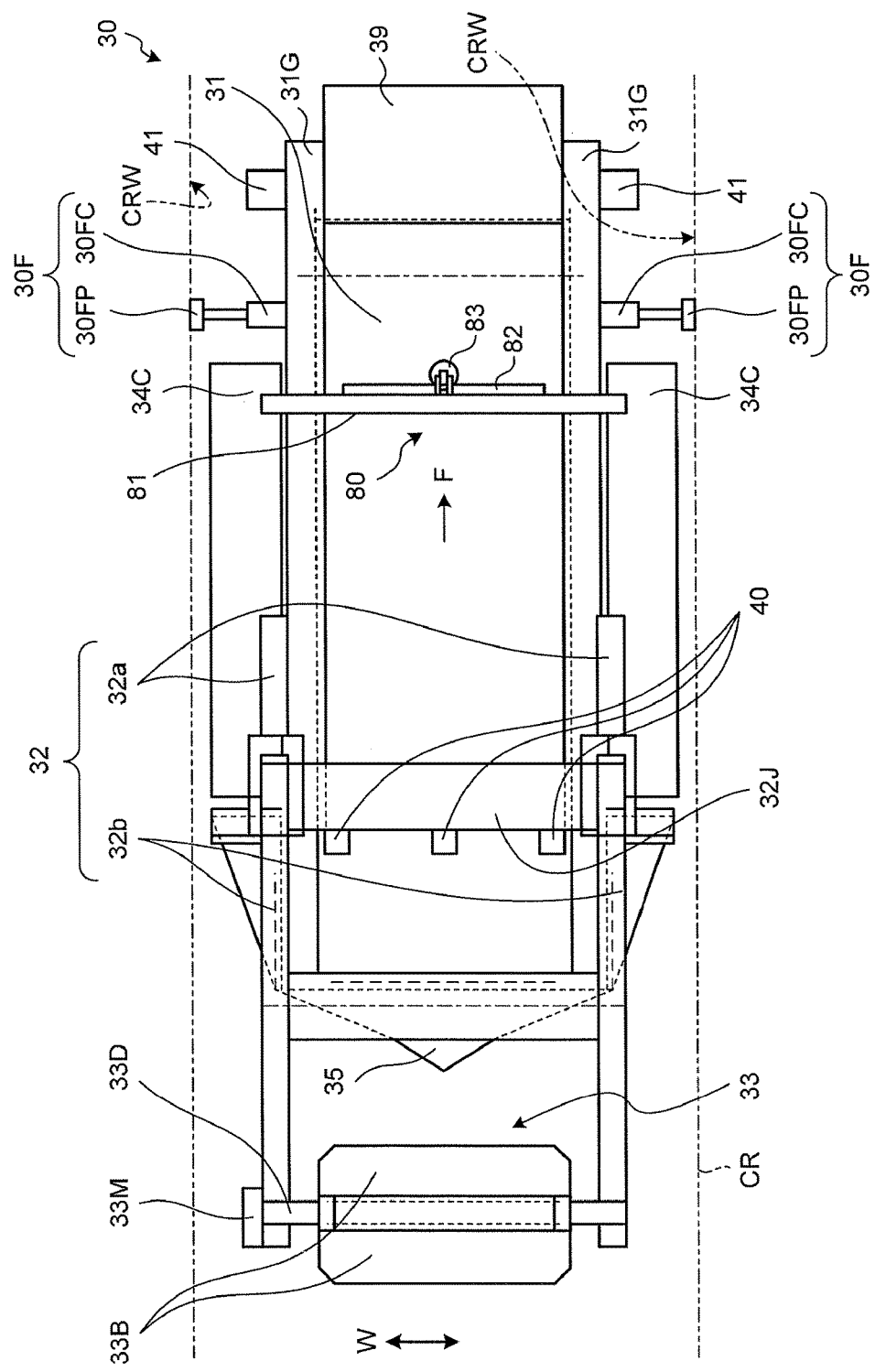
FIG. 14 is a top view of the loading machine according to the embodiment.
Figure 15:
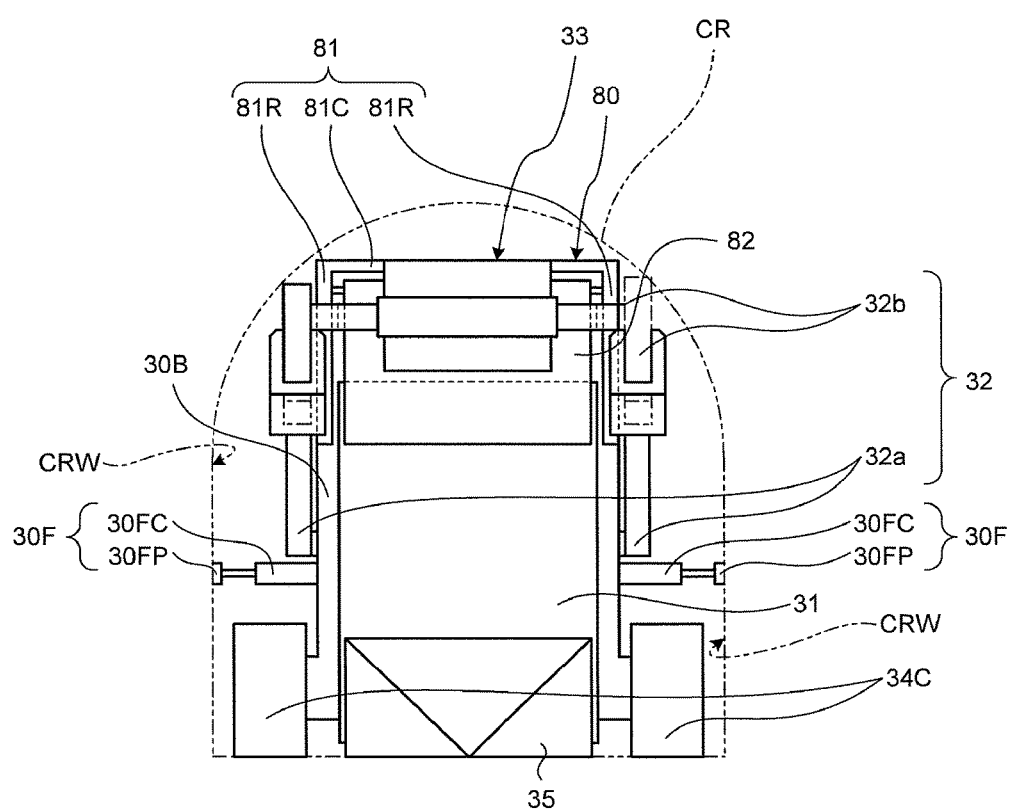
FIG. 15 is a front view of the loading machine according to the embodiment.

FIG. 13 is a side view of the loading machine 30 according to the embodiment. FIG. 14 is a top view of the loading machine 30 according to the embodiment. FIG. 15 is a front view of the loading machine 30 according to the embodiment. FIG. 13 illustrates a state where the loading machine 30 excavates the ore MR of the rock mass RM and conveys the excavated ore MR. The loading machine 30 excavates the rock mass RM of the ore MR inside the cross cut CR and loads the excavated ore MR onto the vessel 11 of the transporting machine 10 illustrated in FIGS. 7 and 8. The feeder 31, the support mechanism 32, the traveling device 34, the penetration member 35, the rotation body 36, and the rock guard 37 are attached to the vehicle body 30B of the loading machine 30. The attachment side of the penetration member 35 is the front side of the loading machine 30, and the opposite side to the attachment side of the penetration member 35 is the rear side of the loading machine 30. Further, the loading machine 30 may not include the rotation body 36 and the rock guard 37.

The feeder 31 loads the ore MR from the rock mass RM and conveys the ore in a direction moving away from the rock mass RM of the draw point DP so as to discharge the ore. That is, the feeder 31 conveys the ore MR loaded at the front side of the loading machine 30 backward so as to discharge the ore backward. The feeder 31 conveys the ore MR from a loading side 31F toward a discharging side 31E, for example, by using a conveyor belt as an endless conveyor, winding the conveyor belt on a pair of rollers, and rotating the conveyor belt. The loading side 31F is near the rock mass RM, and the discharging side 31E is opposite to the loading side 31F. As illustrated in FIG. 14, the feeder 31 has a configuration in which a pair of guides 31G and 31G is provided at both sides in the width direction W. The pair of guides 31G and 31G is used to suppress the ore MR from being dropped from the feeder 31 in a conveying state. The width direction W is a direction orthogonal to a conveying direction F in which the feeder 31 conveys the ore MR and is a direction parallel to the rotation axes of the pair of rollers of the feeder 31. The width direction W of the feeder 31 is also the width direction of the vehicle body 30B. The feeder 31 includes a guide 39 which is provided at the discharging side 31E so as to guide the ore MR into the vessel 11 of the transporting machine 10. The feeder 31 swings about the axis of the front side of the vehicle body 30B, that is, the loading side 31F of the feeder 31. The feeder 31 can change an angle α with respect to a ground surface G. The angle α is an angle formed between the ground surface G and a line LC connecting the rotation axes of the pair of rollers of the feeder 31.

The ore MR are loaded onto the feeder 31 by the rotation roller 33. The rotation roller 33 feeds the ore MR toward the feeder 31 while rotating at the loading side 31F of the feeder 31, that is, the front side of the feeder 31. For this reason, the rotation roller 33 is provided at the loading side 31F of the feeder 31 by the support mechanism 32 including the boom 32a and the arm 32b for the operation of excavating the ore. The rotation roller 33 includes a rotation member 33D rotating about a predetermined axis Zr and a contact member 33B provided in the outer periphery of the rotation member 33D so as to excavate the ore MR in a contact state. In the embodiment, the contact member 33B is provided as a plurality of plate-shaped members that protrudes outward in the radial direction from the rotation member 33D and is provided at a predetermined interval along the circumferential direction of the rotation member 33D. The plane parallel to the plate surface of the contact member 33B is not orthogonal to the axis Zr. In the embodiment, the plane parallel to the plate surface of the contact member 33B is parallel to the axis Zr. The contact member 33B may be bent so that the front end, that is, the end opposite to the rotation member 33D is bitten into the rock mass RM as an excavating target.

When the rotation roller 33 rotates, the contact member 33B moves away from the feeder 31 at the position of the upside U and moves close to the feeder 31 at the position of the downside D. By this movement, the contact members 33B excavate the ore MR from the rock mass RM and feed the ore to the feeder 31. Since the contact members 33B rotate along with the rotation member 33D, the ore MR can be continuously excavated and fed to the feeder 31.

The support mechanism 32 which rotatably supports the rotation roller 33 includes the boom 32a attached to the vehicle body 30B and the arm 32b connected to the boom 32a. The boom 32a is attached to the vehicle body 30B of the loading machine 30 through, for example, a shaft 38A and swings about the shaft 38A with respect to the vehicle body 30B. The arm 32b is connected to the end opposite to the vehicle body 30B of the boom 32a through, for example, a shaft 38B and swings about the shaft 38B with respect to the boom 32a. The arm 32b rotatably supports the rotation roller 33 by the end opposite to the end connected to the boom 32a. For example, the boom 32a and the arm 32b may swing while being driven by a hydraulic cylinder as an actuator or may swing while being driven by a motor or a hydraulic motor.

The boom 32a swings about the first axis Za with respect to the vehicle body 30B, and the arm 32b swings about the axis Za' parallel to the first axis Za. The first axis Za is the axis of the shaft 38A connecting the boom 32a and the vehicle body 30B to each other, and the axis Za' parallel to the first axis Za is the axis of the shaft 38B connecting the boom 32a and the arm 32b to each other. In the embodiment, the arm 32b may further swing about the axis parallel to the second axis orthogonal to the first axis Za. In this way, since the movement range of the rotation roller 33 increases, the degree of freedom of the excavating work is improved.

The boom 32a corresponds to a pair of bar-shaped members (first bar-shaped members) provided at both sides of the vehicle body 30B in the width direction W, that is, both sides of the feeder 31 in the width direction W in the embodiment. The arm 32b corresponds to a pair of bar-shaped members (second bar-shaped members) respectively connected to the booms 32a. As illustrated in FIG. 14, the pair of arms 32b supports the rotation roller 33 therebetween. In the embodiment, the pair of booms 32a is connected to each other by a beam 32J. With such a structure, since the rigidity of the support mechanism 32 is improved, the support mechanism 32 can reliably press the rotation roller 33 against the rock mass RM when the ore MR is excavated. Accordingly, it is possible to suppress degradation in efficiency of excavating the ore MR. Further, the pair of arms 32b may be connected to each other by a bar-shaped member or a plate-shaped member. In this way, it is more desirable in that the rigidity of the support mechanism 32 is further improved.

In the support mechanism 32, the boom 32a swings about the vehicle body 30B and the arm 32b swings about the boom 32a, so that the rotation roller 33 moves. Since the support mechanism 32 moves the rotation roller 33, the relative positional relation among the rotation roller 33, the feeder 31, and the vehicle body 30B can be changed. Further, in the support mechanism 32, different positions of the rock mass RM can be excavated by the movement of the rotation roller 33 or the ore MR can be raked from the rock mass RM to the feeder 31 by the movement of the rotation roller 33 from the rock mass RM toward the feeder 31. Further, for example, when an object exists at the front side of the traveling loading machine 30 so that the traveling operation is disturbed, the support mechanism 32 rakes the object toward the feeder 31 by the rotation roller 33 so as to feed the object to the feeder 31. Accordingly, the object at the front side in the traveling direction of the loading machine 30 can be removed.

In the embodiment, the rotation roller 33 is rotated by a motor 33M attached to the front end of the arm 32b as illustrated in FIG. 14. A device for driving the rotation roller 33 is not limited to the motor 33M and may be, for example, a hydraulic motor. Further, the attachment position of the motor 33M is not limited to the front end of the arm 32b.

The vehicle body 30B is equipped with the traveling device 34 causing the vehicle body to travel. The traveling device 34 includes a pair of crawlers 34C which is provided at both sides of the vehicle body 30B in the width direction, a pair of drive wheels 34D which is provided at both sides of the vehicle body 30B in the width direction, and a pair of driven wheels 34S which is provided at both sides of the vehicle body 30B in the width direction. The crawlers 34C are wound around the drive wheels 34D and the driven wheels 34S. Each drive wheel 34D is driven separately and independently. In the embodiment, the loading machine 30 includes a traveling motor provided in each drive wheel 34D. With such a structure, the pair of crawlers 34C and 34C is separately and independently driven.

The penetration member 35 is attached to the vehicle body 30B. The penetration member 35 is disposed at the loading side 31F of the feeder 31 of the vehicle body 30B. The penetration member 35 is a pyramid-shaped member and has a quadrangular pyramid shape in the embodiment. The shape of the penetration member 35 is not limited to the quadrangular pyramid shape and may be, for example, a triangular pyramid shape. The penetration member 35 is attached to the vehicle body 30B so that the apex of the pyramid is located at the front side of the vehicle body 30B. With such a configuration, when the loading machine 30 penetrates the rock mass RM, the penetration member 35 penetrates the rock mass RM from the apex thereof.

During the excavating operation of the loading machine 30, the penetration member 35 penetrates the rock mass RM from the apex of the pyramid so that the rock mass RM is broken. When the penetration member 35 penetrates the rock mass RM, the traveling device 34 causes the penetration member 35 to penetrate the rock mass RM while the vehicle body 30B equipped with the feeder 31 and the penetration member 35 is caused to travel forward and the feeder 31 is operated. At this time, the upper conveyor belt of the feeder 31 moves from the loading side 31F toward the discharging side 31E. Since the loading machine 30 operates the feeder 31 in this way during the penetration operation, the driving force of the feeder 31 can be used for the penetration, and hence the rock mass RM can be more deeply penetrated.

The pair of rotation bodies 36 is provided at both sides of the vehicle body 30B in the width direction, that is, both sides of the feeder 31 in a direction orthogonal to the conveying direction. The pair of rotation bodies 36 is disposed at the front side of the traveling device 34 so as to be located at the loading side 31F of the feeder 31. The rotation bodies 36 have a structure in which a plurality of blades 36B is provided at a predetermined interval around a drum 36D rotating about a predetermined axis. The rotation body 36 is driven by, for example, a motor. The rotation body 36 may be driven by a motor driving the feeder 31. In this case, the driving of the feeder 31 and the driving of the rotation body 36 may be switched by a clutch or the like. For example, when the clutch is engaged, the feeder 31 and the rotation body 36 rotate at the same time. Meanwhile, when the clutch is disengaged, only the feeder 31 rotates.

When the penetration member 35 penetrates the rock mass RM, the rotation body 36 rotates in a direction in which the vehicle body 30B of the loading machine 30 is pressed against the ground surface G. Specifically, the rotation body 36 rotates so that the blade 36B near the rock mass RM is directed from the downside D to the upside U and the blade 36B near the traveling device 34 is directed from the upside U to the downside D. With such a configuration, since the rotation body 36 presses the front side of the vehicle body 30B toward the downside D when the blade 36B near the rock mass RM contacts the rock mass RM, the crawler 34C of the traveling device 34 is more strongly pressed against the ground surface G. As a result, since a friction force between the crawler 34C and the ground surface G increases, the traveling device 34 can cause the penetration member 35 to easily penetrate the rock mass RM. When the penetration of the loading machine 30 into the rock mass RM is ended and the excavating operation is started by the rotation roller 33 so that the excavated ore is loaded onto the feeder 31, the rotation of the rotation body 36 is stopped.

The rock guard 37 is provided between the rotation body 36 and the crawler 34C of the traveling device 34. In the embodiment, the rock guard 37 is attached to the vehicle body 30B. For example, the rock guard 37 is used to protect the traveling device 34 from the ore MR flying from the rotation roller 33 in the excavating state or to protect the traveling device 34 from the rock existing inside the mine shaft when the loading machine 30 travels. Due to the rock guard 37, degradation in durability of the traveling device 34 is suppressed.

In the embodiment, the vehicle body 30B includes a fixing device 30F which extends outward in the width direction of the vehicle body 30B and is pressed against the wall surface CRW of the cross cut CR connected to the draw point DP. In the embodiment, the fixing device 30F is provided at each of both sides of the vehicle body 30B in the width direction so that the fixing devices face each other, but the number and the installation positions of the fixing devices 30F are not limited thereto. For example, the fixing device 30F may be provided at the upside of the vehicle body 30B. In the embodiment, the fixing device 30F includes, for example, a hydraulic cylinder 30FC and a pressing member 30FP provided at the front end of the piston of the hydraulic cylinder 30FC. When the loading machine 30 excavates and conveys the ore MR, the fixing device 30F fixes the loading machine 30 into the cross cut CR. Specifically, the fixing device 30F lengthens the hydraulic cylinder 30FC so that the pressing member 30FP is pressed against the wall surface CRW, so that the vehicle body 30B of the loading machine 30 is fixed into the cross cut CR through the fixing device. With such a configuration, a reaction force which is generated when the loading machine 30 excavates the rock mass RM can be received by the cross cut CR through the fixing device 30F. As a result, since the posture of the loading machine 30 is stabilized, the rock mass RM can be stably excavated. A configuration may be employed in which a hydraulic cylinder is provided between the fixing device 30F and the vehicle body 30B, the fixing device 30F is fixed to the wall surface CRW of the cross cut CR, and the penetration of the vehicle body is caused by the driving force of the hydraulic cylinder.

When the fixing device 30F is provided at both sides of the vehicle body 30B in the width direction or the upside thereof, the fixing operation of the fixing device 30F is released during the penetration of the loading machine 30. In the embodiment, the hydraulic cylinder 30FC is shortened so that the pressing member 30FP does not press the wall surface CRW. During the excavating operation of the loading machine 30, the fixing device 30F is operated so as to fix the loading machine 30 into the cross cut CR. When the loading machine 30 further penetrates the rock mass RM or is separated from the rock mass RM during the excavating operation, the fixing operation of the fixing device 30F is released and the traveling device 34 moves the loading machine 30.

As illustrated in FIG. 13, the fixing device 30F may be provided at the rear side of the vehicle body 30B, that is, the discharging side 31E of the feeder 31. Then, the reaction force may be received through the fixing device 30F between the vehicle body 30B and a reaction force receiving portion TG protruding from the ground surface G inside the cross cut CR. During the excavating operation, the reaction force of the loading machine 30 in the front and rear direction is large. However, in such a structure, the reaction force can be more effectively received during the excavating operation. Further, the loading machine 30 can adjust the position of the loading machine 30 during the excavating operation by lengthening the fixing device 30F. In addition, the loading machine 30 may not include the fixing device 30F.

In the embodiment, the loading machine 30 includes a switching mechanism 80 which is provided between a part (the loading side 31F) loading the ore MR thereon in the feeder 31 and a part (the discharging side 31E) discharging the ore MR from the feeder 31 so as to discharge or not to discharge the ore MR. The switching mechanism 80 includes a support body 81, a cover 82, and a hydraulic cylinder 83 serving as an actuator opening and closing the cover 82. As illustrated in FIG. 15, the support body 81 is a door-shaped member including two leg portions 81R of which one ends are attached to both sides of the vehicle body 30B in the width direction, that is, both sides of the feeder 31 in the width direction and a connection portion 81C which connects the other ends of two leg portions 81R. The ore MR passes through a part surrounded by two leg portions 81R and the connection portion 81C.

The cover 82 is a plate-shaped member and is provided in the portion surrounded by two leg portions 81R and the connection portion 81C. The cover 82 rotates about a predetermined axis Zg existing near the connection portion 81C of the support body 81. The hydraulic cylinder 83 is provided between the cover 82 and the connection portion 81C of the support body 81. When the hydraulic cylinder 83 moves in a telescopic manner, the cover 82 opens or closes the portion surrounded by two leg portions 81R and the connection portion 81C. When the cover 82 is opened, the ore MR passes through the portion surrounded by two leg portions 81R and the connection portion 810. When the cover 82 is closed, the ore MR does not pass through the portion surrounded by two leg portions 81R and the connection portion 81C. With such a configuration, the loading machine 30 can adjust the amount of the ore MR discharged from the feeder 31.

In the embodiment, the loading machine 30 includes an information collecting device 40. The information collecting device 40 is attached to the loading side 31F, that is, the front side of the vehicle body 30B. More specifically, a part collecting information by the information collecting device 40 is attached toward the loading side 31F, that is, the front side of the vehicle body 30B. The information collecting device 40 is a device that obtains and outputs three-dimensional space data. The information collecting device 40 obtains ore information as the information on the state of the ore MR of the rock mass RM. The ore information corresponds to the three-dimensional space data of the rock mass RM.

The information collecting device 40 is, for example, a camera, a stereo camera, a laser scanner, or a three-dimensional distance sensor. A part collecting information by the information collecting device 40 is a lens in the case of the camera or the stereo camera or a light receiving portion in the case of the laser scanner and the three-dimensional distance sensor. In the embodiment, the stereo camera is used as the information collecting device 40. In the embodiment, the loading machine 30 attaches three information collecting devices 40 to the beam 32J of the support mechanism 32. That is, the information collecting devices 40 are provided at a plurality of positions of the vehicle body 30B in the width direction. With such a configuration, the loading machine 30 can obtain image capturing target ore information by the other information collecting device 40 even when the image capturing target of one information collecting device 40 is hidden by the arm 32b.

In the embodiment, the control device of the loading machine 30 controls the operation of the loading machine 30 by using the ore information collected by the information collecting device 40. For example, the control device controls at least one of the feeder 31, the rotation roller 33, the support mechanism 32, and the traveling device 34 based on the ore information obtained by the information collecting device 40. With such a configuration, since the loading machine 30 can be operated flexibly in response to the state of the rock mass RM and the ore MR, for example, the production efficiency of the mine M is improved.

In the embodiment, the loading machine 30 includes an information collecting device 41 which is provided at the discharging side 31E, that is, the rear side of the vehicle body 30B. More specifically, a part collecting information by the information collecting device 41 is attached toward the discharging side 31E, that is, the rear side of the vehicle body 30B. The information collecting device 41 is a device that obtains and outputs three-dimensional space data similarly to the information collecting device 40. The information collecting device 41 obtains load information as the information on the state of the ore MR loaded on the vessel 11 of the transporting machine 10 illustrated in FIGS. 4 and 5. The load information corresponds to the three-dimensional space data of the ore MR.

Similarly to the information collecting device 40, the information collecting device 41 is, for example, a camera, a stereo camera, a laser scanner, or a three-dimensional distance sensor. A part collecting information by the information collecting device 41 is a lens in the case of the camera or the stereo camera or a light receiving portion in the case of the laser scanner and the three-dimensional distance sensor. In the embodiment, the stereo camera is used as the information collecting device 41. In the embodiment, the loading machine 30 includes two information collecting devices 41 attached to both sides of the feeder 31 in the width direction. That is, the information collecting devices 41 are provided at a plurality of positions of the vehicle body 30B in the width direction. With such a configuration, the loading machine 30 can obtain the image capturing target ore information by the other information collecting device 41 even when the image capturing target of one information collecting device 41 is hidden by the shade of the mine shaft.

In the embodiment, the control device of the loading machine 30 controls at least one of the loading machine 30 and the transporting machine 10 by using the load information collected by the information collecting device 41. For example, the control device is used to control the operation of the rotation roller 33, the feeder 31, or the switching mechanism 80 or to control the movement of the vessel 11 or the position of the vessel 11 of the transporting machine 10 based on the load information obtained by the information collecting device 41. With such a configuration, since the loading machine 30 can adjust the position of the vessel 11 or change the conveying amount of the ore MR in response to the state of the ore MR loaded on the vessel 11 of the transporting machine 10, for example, the production efficiency of the mine M is improved.

Figure 16:
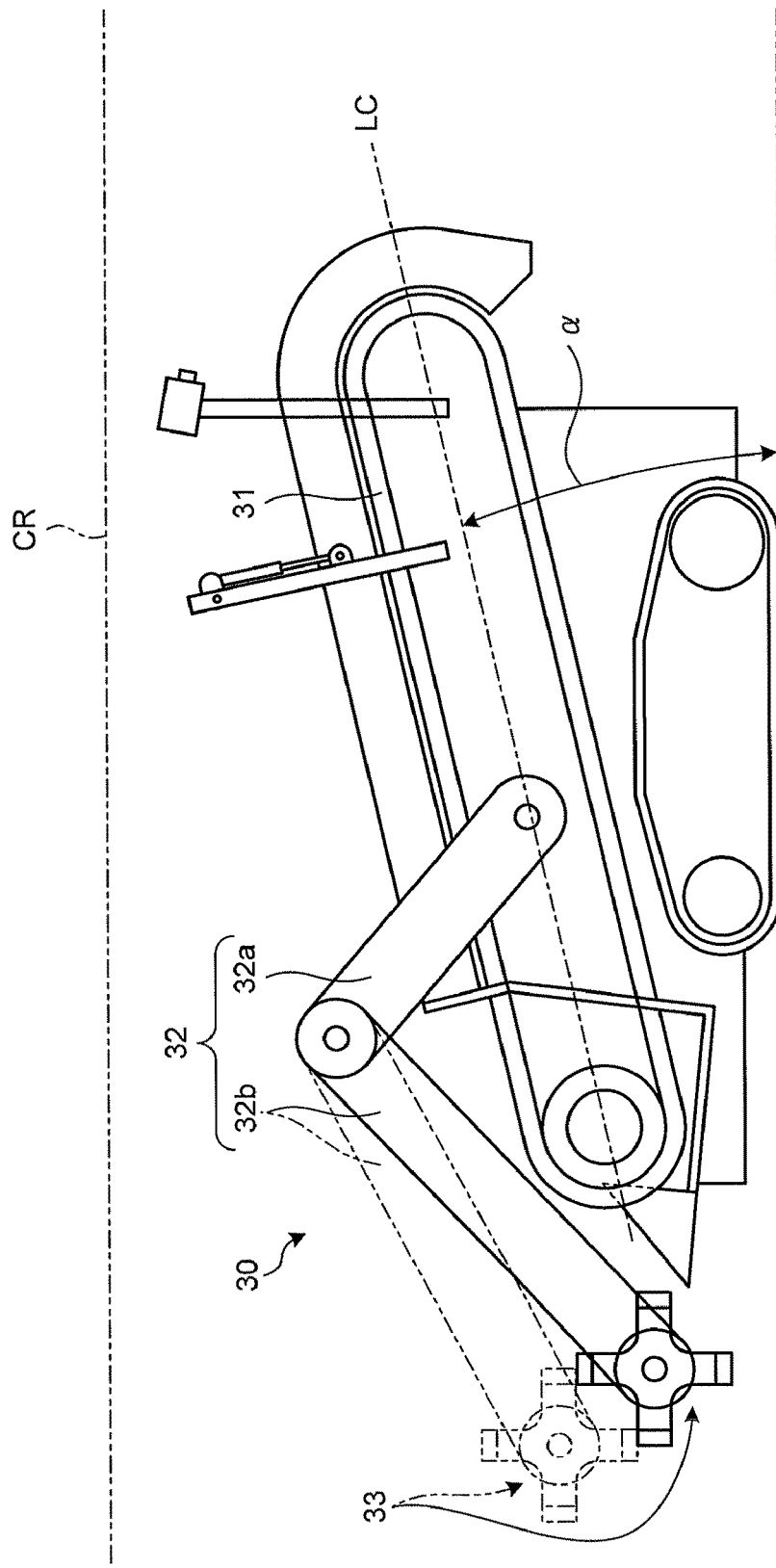
FIG. 16 is a diagram illustrating a posture obtained when the loading machine according to the embodiment travels.

FIG. 16 is a diagram illustrating a posture obtained when the loading machine 30 according to the embodiment travels. When the loading machine 30 travels, the angle α of the feeder 31 with respect to the ground surface G decreases compared with the case (see FIG. 13) in which the loading machine 30 excavates and conveys the ore MR. That is, the line LC connecting the rotation axes of the pair of rollers of the feeder 31 is substantially parallel to the ground surface G. In this way, since the loading side 31F of the feeder 31 disposed at the front side of the loading machine 30, that is, the advancing side is separated from the ground surface, it is possible to reduce the possibility of the interference between the feeder 31 and the ground surface G when the loading machine 30 travels.

As illustrated in FIG. 16, the support mechanism 32 is folded when the loading machine 30 travels. Then, the rotation roller 33 moves to a position closer to the feeder 31 compared with the case where the loading machine 30 excavates and conveys the ore MR (see FIG. 13). For this reason, the balance of mass of the loading machine 30 in the front and rear direction is improved in that the rotation roller 33 existing at a position separated from the center in the front and rear direction of the vehicle body 30B moves closer to the center. As a result, the loading machine 30 can stably travel.

Figure 17:
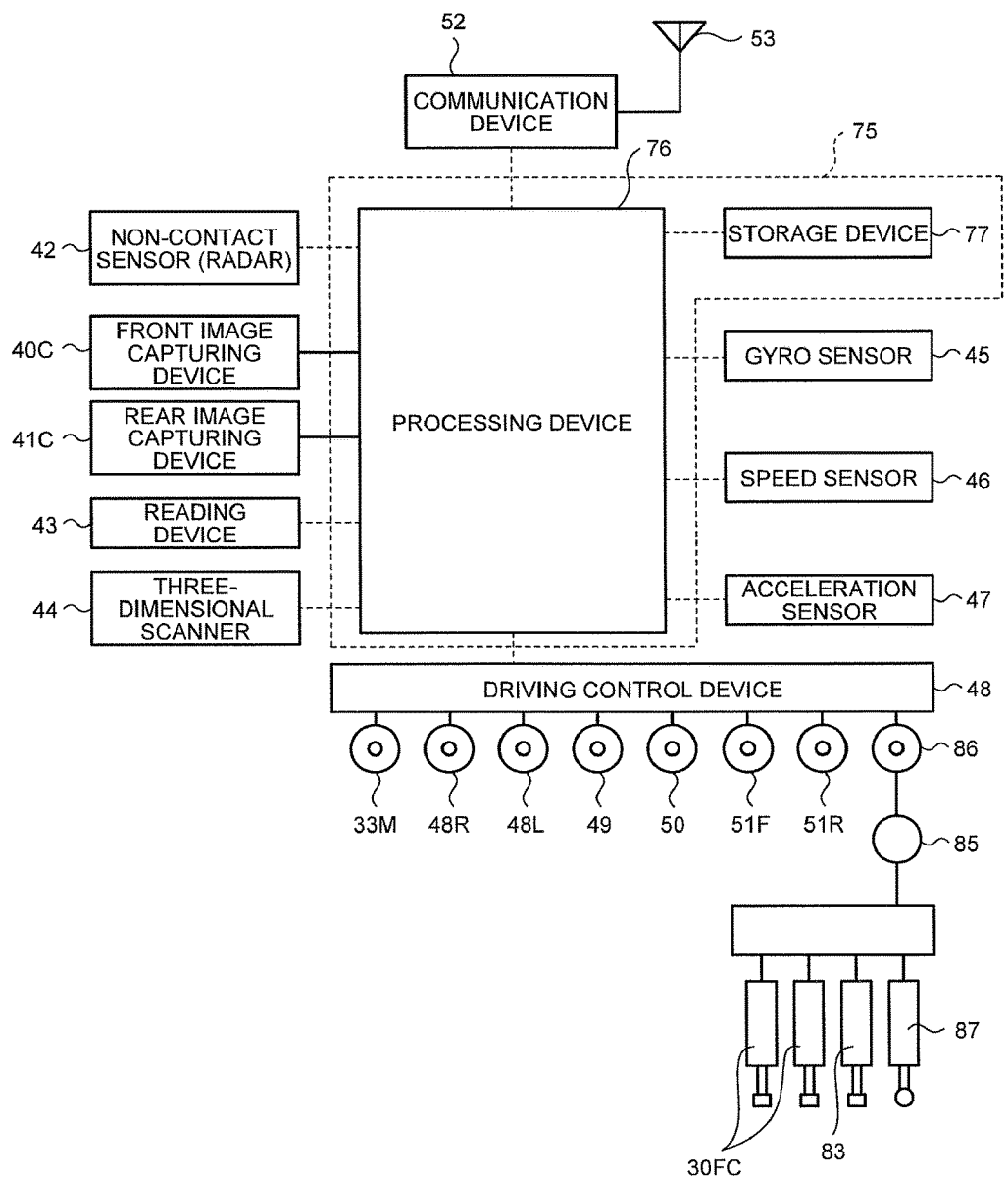
FIG. 17 is an example of a block diagram illustrating a control device of the loading machine according to the embodiment.

FIG. 17 is an example of a block diagram illustrating a control device 75 of the loading machine 30 according to the embodiment. The control device 75 of the loading machine 30 controls the feeder 31, the support mechanism 32, the rotation roller 33, the traveling device 34, the rotation body 36, and the switching mechanism 80. The control device 70 includes a processing device 76 and a storage device 77. A front image capturing device 40C corresponding to the information collecting device 40, a rear image capturing device 41C corresponding to the information collecting device 41, a non-contact sensor 42, a reading device 43, a three-dimensional scanner 44, a gyro sensor 45, a speed sensor 46, an acceleration sensor 47, a driving control device 48, a communication device 52, and the storage device 77 are connected to the processing device 76. The non-contact sensor 42, the reading device 43, and the three-dimensional scanner 44 are attached to the outside of the vehicle body 30B of the loading machine 30.

Each of the front image capturing device 40C and the rear image capturing device 41C includes an imaging element such as a CCD or a CMOS and can detect the outer shape of an object by obtaining an optical image of the object. In the embodiment, each of the front image capturing device 40C and the rear image capturing device 41C includes a stereo camera and can obtain three-dimensional outer shape data of an object. The front image capturing device 40C and the rear image capturing device 41C output the image capturing result to the processing device 76. The processing device 76 obtains the detection result of the front image capturing device 40C and obtains the ore information based on the detection result. Further, the processing device 76 obtains the detection result of the rear image capturing device 41C and obtains the load information based on the detection result. In the embodiment, the outer shape of the ore MR of the rock mass RM and the outer shape of the ore MR loaded on the vessel 11 may be detected by at least one of a laser scanner and a three-dimensional distance sensor.

The non-contact sensor 42 detects an object existing around the loading machine 30. The non-contact sensor 42 is connected to the processing device 76 and outputs the detection result to the processing device 76. The non-contact sensor 42 outputs the obtained result to the processing device 76. The reading device 43 detects the identification information (the original information) of the mark provided in the drift DR or the cross cut CR. The mark is disposed at a plurality of positions along the drift DR or the cross cut CR. The reading device 43 is connected to the processing device 76 and outputs a detection result to the processing device 76. The mark may be an identifier (a code) like a barcode and a two-dimensional code or may be an identifier (a tag) like an IC tag and an RFID.

In the embodiment, the information on the position (the absolute position) in which the mark is disposed in the drift DR or the cross cut CR is given information measured in advance. The information on the absolute position of the mark is stored in the storage device 77. The processing device 76 can obtain the absolute position of the loading machine 30 in the drift DR or the cross cut CR based on the storage information of the storage device 77 and the detection result of the mark (the identification information of the mark) detected by the reading device 43 provided in the loading machine 30.

The three-dimensional scanner 44 obtains and outputs the spatial physical shape data. The gyro sensor 45 detects the orientation (the orientation change amount) of the loading machine 30 and outputs a detection result to the processing device 76. The speed sensor 46 detects the traveling speed of the loading machine 30 and outputs a detection result to the processing device 76. The acceleration sensor 47 detects the acceleration of the loading machine 30 and outputs a detection result to the processing device 76. The driving control device 48 is, for example, a microcomputer. Based on an instruction from the processing device 76, the driving control device 48 controls the operation of the motor 33M driving the rotation roller 33 illustrated in FIG. 13, motors 48L and 48R of the traveling device 34, a motor 49 swinging the boom 32a of the support mechanism 32, a motor 50 swinging the arm 32b, a motor 51F driving the feeder 31, a motor 51R rotating the rotation body 36, and a motor 86 driving a hydraulic pump 85. The hydraulic pump 85 is a device which supplies hydraulic oil to the hydraulic cylinder 83 of the switching mechanism 80, a hydraulic cylinder 87 serving as an actuator changing the posture of the feeder 31, and the hydraulic cylinder 30FC of the fixing device 30F. The boom 32a and the arm 32b may be swung by the hydraulic cylinder. In this case, hydraulic oil is supplied from the hydraulic pump 85 to a boom cylinder swinging the boom 32a and an arm cylinder swinging the arm 32b. The motor 48L drives one crawler 34C illustrated in FIG. 14 and the motor 48R drives the other crawler 34C. The motor 48L drives one crawler 34C illustrated in FIG. 14 and the motor 48R drives the other crawler 34C.

In the embodiment, the loading machine 30 travels by the motors 48L and 48R of the traveling device 34, but the invention is not limited thereto. For example, the loading machine 30 may travel by a hydraulic motor driven by the hydraulic oil ejected from the hydraulic pump 85. Further, the boom 32a and the arm 32b of the support mechanism 32, the rotation roller 33, the rotation body 36, and the feeder 31 may be driven by a hydraulic cylinder or a hydraulic motor driven by the hydraulic oil ejected from the hydraulic pump 85.

The three-dimensional scanner 44 includes a scan type electronic distance meter capable of outputting spatial physical shape data. The three-dimensional scanner 44 includes, for example, at least one of a laser range finder, a laser scanner, and a three-dimensional scanner and can obtain and output three-dimensional space data. The three-dimensional scanner 44 detects at least one of the transporting machine 10 and the wall surfaces of the drift DR and the cross cut CR. In the embodiment, the three-dimensional scanner 44 can obtain at least one of the shape data of the transporting machine 10, the wall surface shape data of the drift DR or the cross cut CR, and the load shape data of the vessel 11 of the transporting machine 10. Further, the three-dimensional scanner 44 can detect at least one of the relative position (the relative distance and the orientation) with respect to the transporting machine 10 and the relative position with respect to the wall surface of the drift DR or the cross cut CR. The three-dimensional scanner 44 outputs the detected information to the processing device 76.

In the embodiment, the information on the wall surfaces of the drift DR and the cross cut CR is obtained in advance and is stored in the storage device 77. That is, the information on the wall surface of the drift DR is given information measured in advance. The information on the wall surface of the drift DR includes information on the shapes of a plurality of parts of the wall surface and information on the absolute positions of the parts of the wall surface. The storage device 77 store a relation of the shapes of the plurality of parts of the wall surface and the absolute positions of the parts of the wall surface having the shape. The processing device 76 can obtain the absolute position and the orientation of the loading machine 30 in the drift DR based on the storage information of the storage device 77 and the detection result (the wall surface shape data) of the wall surface in the drift DR detected by the three-dimensional scanner 20 provided in the loading machine 30.

The processing device 76 controls the loading machine 30 traveling in the drift DR or the cross cut CR so that the loading machine 30 travels along the determined course (the target course) of the underground mine MI based on the current position (the absolute position) of the loading machine 30 derived by at least one of the reading device 43 and the three-dimensional scanner 44. At this time, the processing device 76 controls the loading machine 30 so that the loading machine is disposed at the designated draw point DP.

The processing device 76 is, for example, a microcomputer including a CPU. The processing device 76 controls the motors 48L and 48R of the traveling device 34 through the driving control device 48 based on the detection result of the front image capturing device 40C, the rear image capturing device 41C, the non-contact sensor 42, and the reading device 43. Then, the processing device 76 causes the loading machine 30 to travel along the target course at a predetermined traveling speed and a predetermined acceleration.

The storage device 77 includes at least one of a RAM, a ROM, a flash memory, and a hard disk drive and is connected to the processing device 76. The storage device 77 store a computer program and various kinds of information necessary when the processing device 76 causes the loading machine 30 to travel autonomously. The communication device 52 is connected to the processing device 76 and communicates with at least one of the communication device and the management device 3 mounted on the transporting machine 10 according to a data communication.

In the embodiment, the loading machine 30 is an unmanned vehicle and can travel autonomously. The communication device 52 can receive information (including an instruction signal) transmitted from at least one of the management device 3 and the transporting machine 10 through an antenna 53. Further, the communication device 52 can transmit the information detected by the front image capturing device 40C, the rear image capturing device 41C, the non-contact sensor 42, the reading device 43, the three-dimensional scanner 44, the gyro sensor 45, the speed sensor 46, and the acceleration sensor 47 to at least one of the management device 3 and the transporting machine 10 through the antenna 53. The loading machine 30 is not limited to the unmanned vehicle which can travel autonomously. For example, the management device 3 may obtain an image captured by the front image capturing device 40C and may display the image on the display device 8 illustrated in FIG. 6. Then, the operator may control the excavating operation, the loading operation, and the traveling operation of the loading machine 30 while seeing the displayed image through the remote operation. Further, the management device 3 may obtain an image captured by the rear image capturing device 41C and display the image on the display device 8 illustrated in FIG. 6. Then, the operator may control the excavating operation and the loading operation of the loading machine 30 and the operation of the vessel 11 of the transporting machine 10 while seeing the displayed image through the remote operation.

For example, the management device 3 which obtains the information detected by the speed sensor 46 and the acceleration sensor 47 stores the information as the operation information of the loading machine 30 in, for example, the storage device 3M. Further, when the management device 3 obtains the information captured by the front image capturing device 40C or the rear image capturing device 41C, the operator can operate the loading machine 30 while seeing the peripheral image of the loading machine 30 captured by the front image capturing device 40C or the rear image capturing device 41C. Further, the transporting machine 10 which obtains the image on the state of the ore MR of the vessel 11 detected by the rear image capturing device 41C can control the position of the vessel 11 or the amount of the ore MR loaded on the vessel 11 based on the information. In the embodiment, the loading machine 30 is operated electrically, but an internal combustion engine may be used as a power source. Next, the storage battery treatment device EX provided in the space SP illustrated in FIG. 2 will be described.

Figure 18:
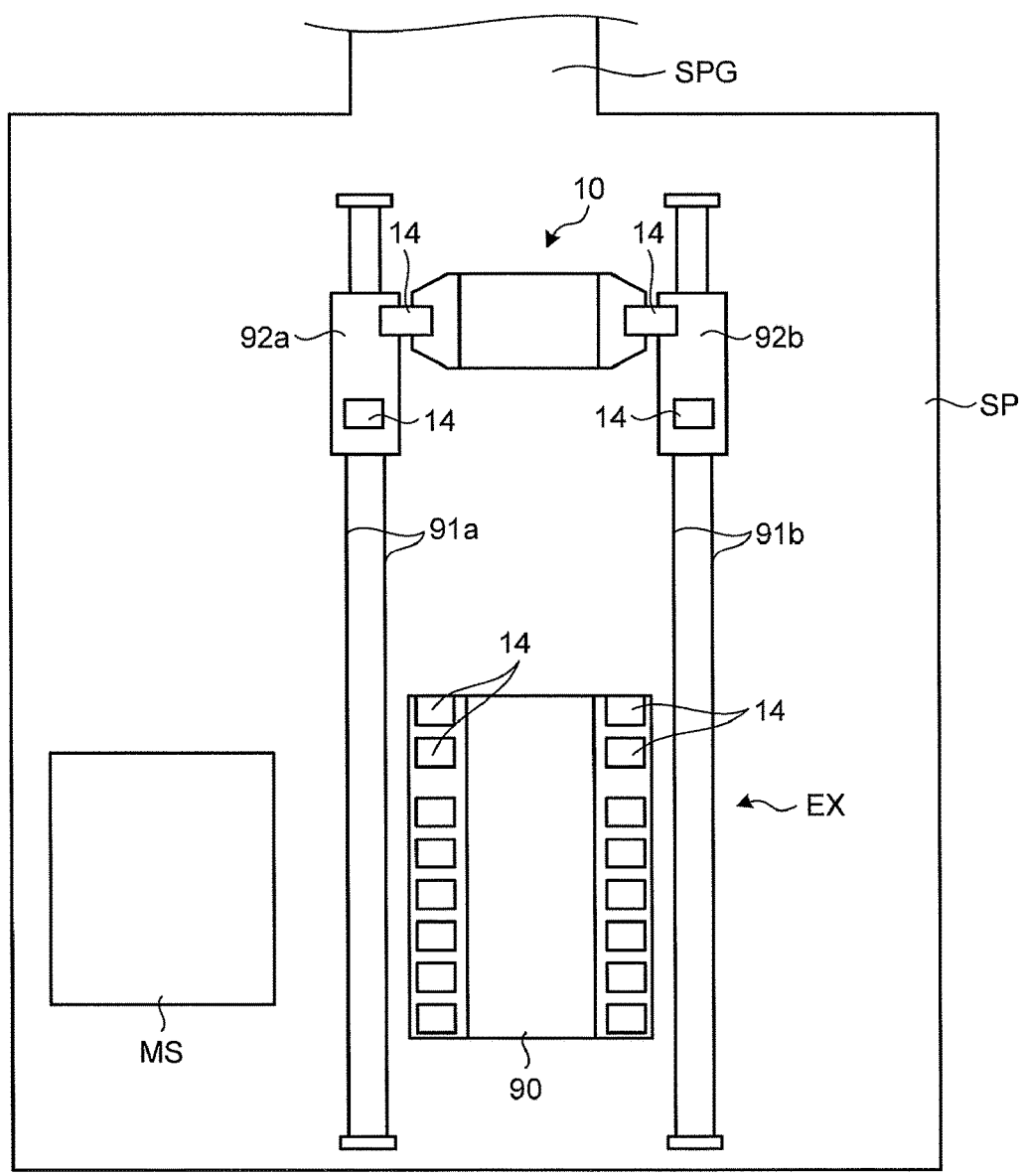
FIG. 18 is a diagram illustrating an example of a storage battery treatment device EX of a mine mining system according to the embodiment.

FIG. 18 is a diagram illustrating an example of the storage battery exchange device EX of the mine management system 1 according to the embodiment. The storage battery exchange device EX is provided inside the space SP. In the embodiment, the space SP is provided with a maintenance space MS used to repair the transporting machine 10 and the loading machine 30. The storage battery exchange device EX includes a storage battery holder 90, a pair of guides 91a and 91b provided at both sides of the storage battery holder, and exchange support bases 92a and 92b respectively guided by the guides 91a and 91b. The storage battery holder 90 holds the exchange storage batteries 14. The storage battery holder 90 serves as a charger that charges the discharged storage battery 14. The guide 91a is provided at one side of the storage battery holder 90 and the guide 91b is provided at the other side of the storage battery holder 90. The guides 91a are two rails which extend from the storage battery holder 90 toward a gateway SPG of the space SP. The guide 91b is also similar to the guide 91a. The support base 92a is attached to the guide 91a and moves along the guide 91a. Then, the support base 92b is attached to the guide 91b and moves along the guide 91b.

The transporting machine 10 which enters the space SP in order to replace the storage battery 14 is stopped between the guide 91a and the guide 91b. At this time, the transporting machine 10 is stopped so that one storage battery 14 faces the guide 91a and the other storage battery 14 faces the guide 91b. The support base 92a and the support base 92b receive the charged storage battery 14 from the storage battery holder 90 and move toward the transporting machine 10. When the support base 92a and the support base 92b move to a position facing the transporting machine 10, the discharged storage battery 14 mounted on the transporting machine 10 is moved from the transporting machine 10 toward the upside thereof. Next, the support base 92a and the support base 92b respectively move to a position where the charged storage battery 14 faces the transporting machine 10. Subsequently, the support base 92a and the support base 92b load the charged storage battery 14 onto the transporting machine 10. The support base 92a and the support base 92b return to the position of the storage battery holder 90 so that the storage battery 14 collected from the transporting machine 10 is moved to the storage battery holder 90. The storage battery holder 90 charges the storage battery. In this way, the storage battery 14 of the transporting machine 10 is replaced.

The storage battery 14 of the transporting machine 10 does not need to be attachable or detachable. In this case, the storage battery treatment device EX may charge the storage battery 14 of the transporting machine 10.

In the embodiment, since the transporting machine 10 travels by the storage battery 14, the discharged storage battery 14 is exchanged with the charged storage battery 14 by the storage battery exchange device EX inside the space SP. As described above, the loading machine 30 receives power from the power feeding cable 5 illustrated in FIG. 3 and the like so that the rotation roller 33 and the feeder 31 are operated. Since the loading machine 30 moves in the underground mine, for example, in order to move to a different draw point DP, the loading machine is separated from the power feeding cable 5 in this case. For this reason, the loading machine 30 includes a storage battery for driving the traveling motors 48L and 48R illustrated in FIG. 17. The storage battery is charged by the power supplied from the power feeding cable 5 when the loading machine 30 excavates and loads the ore MR at the draw point DP. The storage battery of the loading machine 30 is replaced in, for example, the maintenance space MS inside the space SP, for example, when the performance is degraded from the allowable value due to the use.

<Traveling Course of Transporting Machine 10>

Figure 19:
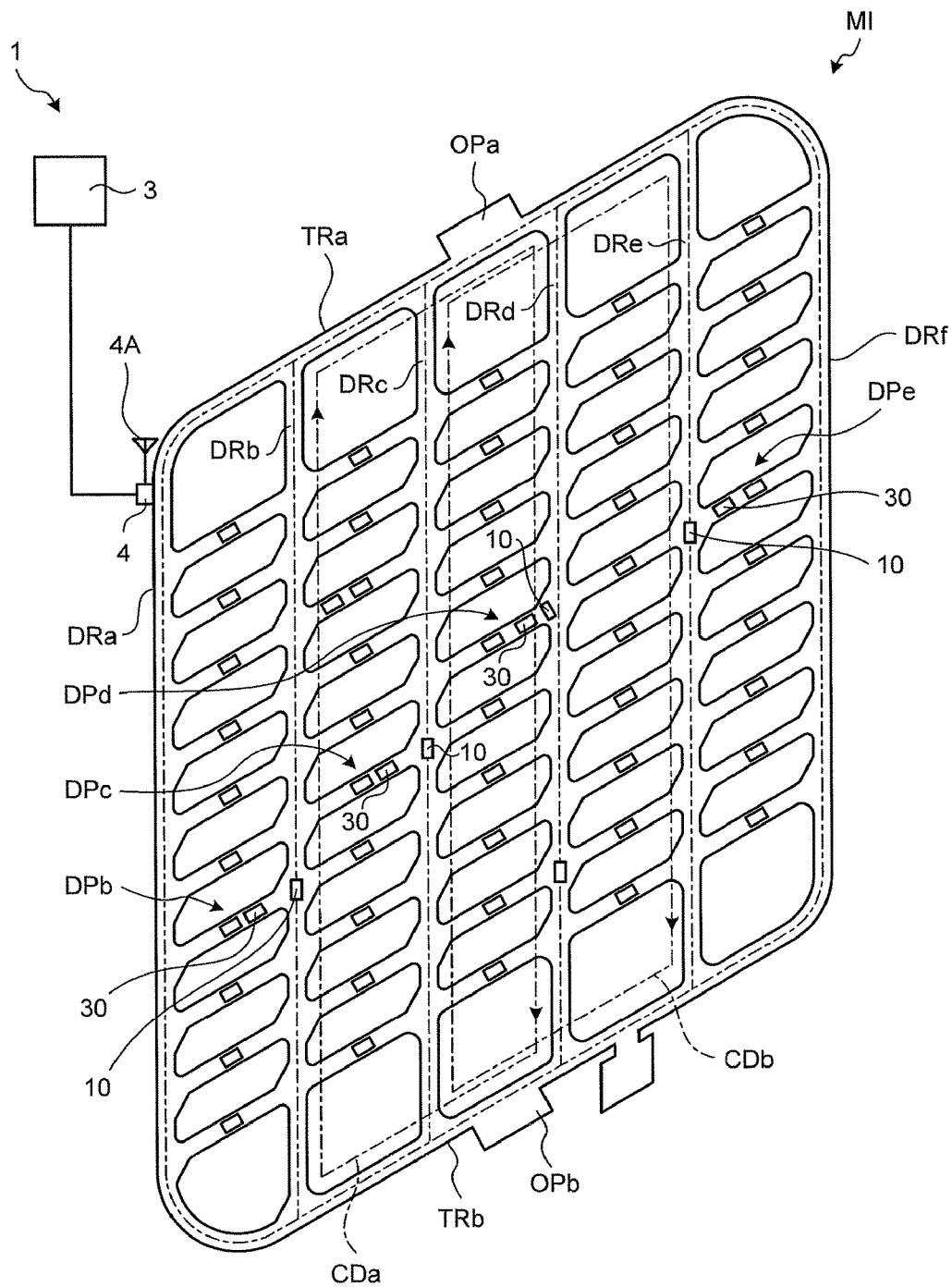
FIG. 19 is a diagram illustrating a direction in which the transporting machine travels in a drift of an underground mine in the mine mining system according to the embodiment.

FIG. 19 is a diagram illustrating a direction in which the transporting machine 10 travels in the drift DR of the underground mine MI in the mine management system 1 according to the embodiment. In the description below, the signs a, b, and the like are given to the sign DR, the sign TR, the sign DP, or the sign OP when the drifts DR, the outer tracks TR, the draw points DP, or the ore passes OP provided in the underground mine MI are distinguished from one another. The signs a, b, and the like are not given when the drifts DR, the outer tracks TR, the draw points DP, and the ore passes OP are not distinguished from one another.

In the mine mining system 1 illustrated in FIG. 19, six drifts DRa, DRb, DRc, DRd, DRe, and DRf and two outer tracks TRa and TRb are formed in the underground mine. In the embodiment, a circuit CD is formed by the drift DR and the outer track TR. Specifically, one circuit CD is formed by the connection of the drifts DR and the outer tracks TR. For example, a circuit CDa is formed by two drifts DRb and DRd and two outer tracks TRa and TRb. Further, a circuit CDb is formed by two drifts DRc and DRe and two outer tracks TRa and TRb. Likewise, in the embodiment, one circuit CD is formed by two drifts DR and two outer tracks TR. In this case, one circuit CD is formed by two drifts DR and two outer tracks TR, but two drifts DR of one circuit CD have different traveling directions.

It is desirable to dispose one transporting machine 10 in one drift DR to the maximum. Even when two or more transporting machines 10 are disposed in the same drift, two or more transporting machines 10 are useless.

When the transporting machine 10 loads the ore MR mined at the draw point DP and discharges the ore to the ore pass OP, it is desirable to form the circuit CD in which the transporting machine 10 travels so that the circuit includes at least one of the ore pass OPa and the ore pass OPb. The circuit CD in which the transporting machine 10 travels toward the storage battery exchange device EX provided in the space SP so as to replace the storage battery 14 illustrated in FIGS. 7 and 8 without loading the ore MR thereon may not include the ore pass OPa and the ore pass OPb. The management device 3 can arbitrarily create the circuit CD every transporting machine 10. For example, the management device 3 may create the circuit CD in response to the state of the transporting machine 10. As an example, when the capacity of the storage battery 14 of the transporting machine 10 is lower than a predetermined threshold value and the ore MR is not loaded on the vessel 11 of the transporting machine 10, the management device 3 can create the shortest circuit CD from the current position to the space SP by the replacement of the storage battery 14 of the transporting machine 10 at the storage battery exchange device EX.

The transporting machine 10 traveling in the drift DR travels in the circuit CD in the same direction. In the embodiment, the transporting machine travels in the circuit CD in the clockwise direction. At this time, the transporting machine 10 loads the ore MR from the loading machine 30 at the draw point DP. Then, the transporting machine 10 discharges the loaded ore MR at the ore pass OPa or the ore pass OPb. For example, the transporting machine 10 traveling in the circuit CDa loads the ore MR from the loading machine 30 at a draw point DPb connected to the drift DRb. Subsequently, the transporting machine 10 travels in the drift DRb and the outer track TRa and discharges the ore MR to the ore pass OPa adjacent to the outer track TRa. The transporting machine 10 which discharges the ore MR therefrom travels in the drift DRd and loads the ore MR thereon from the loading machine 30 at the draw point DPd connected to the drift DRd. Subsequently, the transporting machine 10 travels in the drift DRd and the outer track TRb and discharges the ore MR to the ore pass OPb adjacent to the outer track TRb.

The transporting machine 10 traveling in the circuit CDb loads the ore MR thereon from the loading machine 30 at a draw point DPc connected to the drift DRc. Subsequently, the transporting machine 10 travels in the drift DRc and the outer track TRa and discharges the ore MR to the ore pass OPa adjacent to the outer track TRa. The transporting machine 10 which discharges the ore MR therefrom travels in the drift DRe and loads the ore MR from the loading machine 30 at a draw point DPe connected to the drift DRe. Subsequently, the transporting machine 10 travels in the drift DRe and the outer track TRb and discharges the ore MR to the ore pass OPb adjacent to the outer track TRb.

Likewise, when the transporting machine 10 travels in the circuit CD in one direction, it is possible to suppress the crossing of the transporting machine 10 to the minimum compared with the case where the transporting machine moves in a reciprocating manner between the draw point DP and the ore pass OP. Further, when the circuit CD includes both the ore pass OPa and the ore pass OPb, it is possible to perform the operation of loading and discharging the ore MR two times while the transporting machine 10 travels in the circuit CD by one round and hence to increase the conveying amount of the ore MR. As a result, since the mine management system 1 improves the cycle time, the productivity of the mine can be improved. Further, since the transporting machine 10 travels in one direction in the circuit CD, it is possible to suppress the crossing of the transporting machine 10. For this reason, the number of positions necessary for the crossing can be decreased. Further, the position necessary for the crossing may not be provided if the crossing is not needed. As a result, since there is no need to thoughtlessly increase the width of the mine shaft, it is possible to suppress the effort, the time, and the cost necessary for the excavating operation in the mine shaft.

In the embodiment, the traveling direction of the transporting machine 10 or the like in each drift DR is determined as one direction (one-way traffic) in every drift DR. That is, the traveling operation in only one direction is allowed in each drift DR. When the transporting machine 10 or the like travels in the circuit CD in the clockwise direction, for example, the traveling direction of the drift DRb belonging to the circuit CDa is a direction directed from the ore pass OPb toward the ore pass OPa. In this case, the transporting machine 10 cannot travel in the drift DRb so as to be directed from the ore pass OPa toward the ore pass OPb.

When the transporting machine 10 or the like travels in the circuit CD in one direction, the management device 3 creates the circuit CD so that the transporting machine 10 does not cross another transporting machine or the loading machine 30 in each drift DR. For example, when the management device 3 creates a new circuit CD, the new circuit CD is included in the existing circuit CD. As a result, it is not possible to create the new circuit CD so that the transporting machine travels reversely in the drift DR in which the traveling direction is determined as one direction. When the new circuit CD is created by using the drift DR included in the existing circuit CD, the management device 3 causes the traveling direction of the new circuit CD to match the traveling direction of the drift DR included in the existing circuit CD. With such a configuration, it is possible to reduce or avoid the crossing of the transporting machine 10 in the circuit CD.

In the mine management system 1, six drifts DR are connected to the outer track TRa provided with the ore pass OPa and six drifts DR are also connected to the outer track TRb provided with the ore pass OPb. In the extension direction of the outer track TRa, the same number of (in the embodiment, three) drifts DR are connected to the outer track TRa in any direction with respect to the ore pass OPa. Similarly, in the extension direction of the outer track TRb, the same number of (in the embodiment, three) drifts DR are connected to the outer track TRb in any direction with respect to the ore pass OPb. In the mine management system 1 including the drift DR and the outer track TR, the circuit CD is provided as the following nine patterns so as to include both the ore pass OPa and the ore pass OPb.

(1) Pattern 1: drift DRa, outer track TRa, drift DRf, outer track TRb (2) Pattern 2: drift DRa, outer track TRa, drift DRe, outer track TRb (3) Pattern 3: drift DRa, outer track TRa, drift DRd, outer track TRb (4) Pattern 4: drift DRb, outer track TRa, drift DRf, outer track TRb (5) Pattern 5: drift DRb, outer track TRa, drift DRe, outer track TRb (6) Pattern 6: drift DRb, outer track TRa, drift DRd, outer track TRb (7) Pattern 7: drift DRc, outer track TRa, drift DRf, outer track TRb (8) Pattern 8: drift DRc, outer track TRa, drift DRe, outer track TRb (9) Pattern 9: drift DRc, outer track TRa, drift DRd, outer track TRb In the mine management system 1, since the transporting machine 10 travels in the circuit CD in one direction (for example, the clockwise direction), it is possible to suppress the crossing of the transporting machine 10 to the minimum and to perform the operation of loading and discharging the ore MR two times while the transporting machine 10 travels in the circuit CD by one round. In the embodiment, the position and the number of the ore passes OP provided in each outer track TR are not limited. When the drifts DR are connected to the pair of outer tracks TR and each outer track TR is provided with one ore pass OP, it is desirable in that the circuit CD has many patterns if the same number of drifts DR are connected in the extension direction of the outer track TR with respect to the ore pass OP. Next, the allocation process of the transporting machine 10 in the mine management system will be described.

<Allocation Process of Transporting Machine 10>

In the mine management system 1, the management device 3 illustrated in FIG. 6 allocates the transporting machine 10. The allocation process of the transporting machine 10 is used to determine the draw point DP toward which the transporting machine 10 not loading a load, that is, the ore MR thereon is directed so as to load the ore MR. In the embodiment, the management device 3 determines the draw point DP toward which the transporting machine 10 is directed so that the operability of the loading machine 30 becomes maximal or the operability of the transporting machine 10 becomes maximal. First, a process (hereinafter, referred to as a first allocation process) will be described which determines the draw point DP toward which the transporting machine 10 is directed so that the operability of the loading machine 30 becomes maximal. The first allocation process is performed by the management device 3 illustrated in FIG. 6.

(First Allocation Process)

Figure 20:
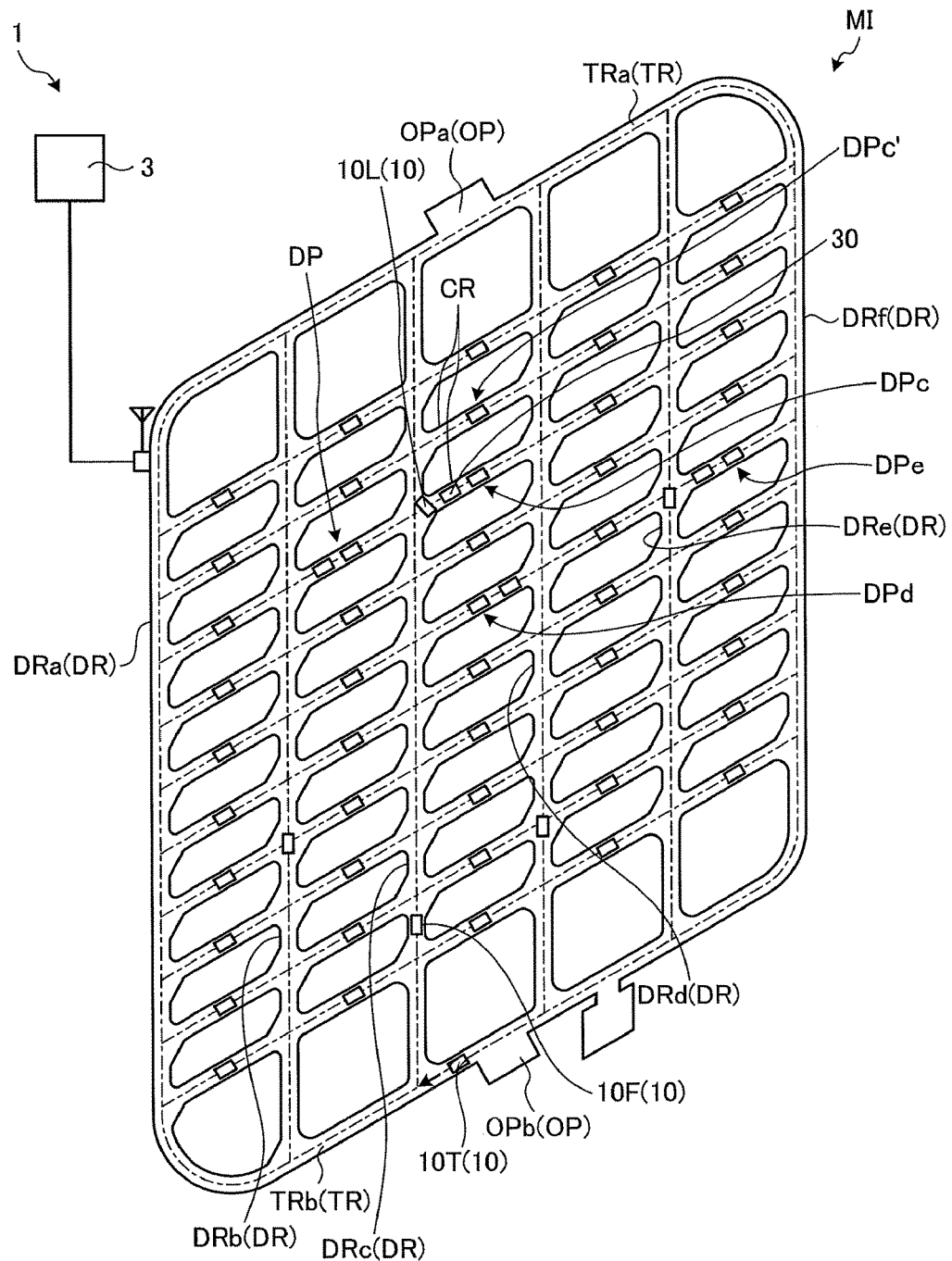
FIG. 20 is a diagram illustrating a process performed when a draw point DP toward which the transporting machine is directed is determined.

FIG. 20 is a diagram illustrating a process performed when the draw point DP toward which the transporting machine 10 is directed is determined. In FIG. 20, the target transporting machine 10 of which the draw point DP is determined is set as a transporting machine 10T. The transporting machine 10 disposed between the transporting machine 10T and the candidate draw point DP toward which the transporting machine 10T is directed is set as a transporting machine 10F. The transporting machine 10 in the middle of loading the ore MR thereon by the loading machine 30 at the candidate draw point DP toward which the transporting machine 10T is directed is set as a transporting machine 10L. As described above, the transporting machine 10 travels in the clockwise direction in the circuit formed by two drifts DR and two outer tracks TR. In the embodiment, it is assumed that the vehicle speed Vm of the transporting machine 10 is constant and one loading machine 30 is disposed at one draw point DP to the maximum. With such a configuration, it is possible to comparatively simply perform a process when determining the draw point DP toward which the transporting machine 10 is directed so as to load the ore MR thereon.

In the management device 3, the draw point DP where the empty time Tf in which the loading machine 30 disposed at the draw point DP does not load the ore MR on the transporting machine 10 becomes maximal at the time of performing the first allocation process is determined as the draw point DP toward which the transporting machine 10T is directed. The empty time Tf corresponds to, for example, the time in which the feeder 31 of the loading machine 30 is stopped. The empty time Tf is a value obtained by subtracting the sum of the larger value of the time Tl necessary for loading the ore MR at the current time point by the loading machine 30 provided at the candidate draw point DP and the arrival time Tr of the other transporting machine 10F directed toward the candidate draw point DP and the predicted loading time Tlg necessary for loading the ore MR on the other transporting machine 10F from the movement time Ts in which the target transporting machine 10T determining the draw point DP moves to the candidate draw point DP. That is, the empty time Tf can be obtained by the equation (2).

$$Tf = Ts - (\max(Tl, Tr) + Tlg) \tag{2}$$

For example, when arching occurs at the candidate draw point DP where the transporting machine 10 is allocated or a large mass of the ore MR appears, the management device 3 moves the loading machine 30 performing the excavating operation at the candidate draw point DP to the other draw point DP. When the loading machine 30 disposed at the candidate draw point DP is supposed to move, the movement time Tm of the loading machine 30 is further added to the sum of the larger value of the time Tl necessary for loading the ore MR on the loading machine 30 provided at the candidate draw point DP at the current time point and the arrival time Tr of the other transporting machine 10F directed toward the candidate draw point DP and the predicted loading time Tlg necessary for loading the ore MR on the other transporting machine 10F and is subtracted from the movement time Ts. In this case, the empty time Tf can be obtained by the equation (3). The movement time Tm indicates a time in which the loading machine 30 moves from the candidate draw point DP to the other draw point DP.

$$Tf = Ts - (\max(Tl, Tr) + Tlg + Tm) \tag{3}$$

There is a case in which the empty time Tf of the loading machine 30 has a negative value when the movement time Ts of the transporting machine 10 is short. In this case, the empty time Tf of the loading machine 30 becomes the standby time of the transporting machine 10. For example, when the empty time Tf of the loading machine 30 becomes −20 seconds, the standby time of the transporting machine 10 becomes 20 seconds. Even when the empty time Tf of the loading machine 30 has a negative value, the transporting machine 10 is allocated to the draw point DP having the longest empty time Tf. For example, when there are the draw points DP in which the empty time Tf of the loading machine 30 are −20 seconds and −30 seconds, the transporting machine 10 is allocated to the draw point DP in which the empty time Tf of the loading machine 30 is −20 seconds.

The management device 3 determines the draw point DP toward which the transporting machine 10T is directed when the transporting machine 10T leaves the ore pass OP. With such a configuration, since a uniform standard can be used when the empty time Tf of each transporting machine 10 is obtained, the management device 3 can accurately predict the empty time Tf for each transporting machine 10.

In the example illustrated in FIG. 20, the candidate of the draw point DP toward which the target transporting machine 10T determining the draw point DP is directed is set as the draw point DPc of the drift DRc. Further, in the example illustrated in FIG. 20, it is assumed that the target transporting machine 10T is at the timing in which the target transporting machine leaves the ore pass OPb after the ore MR is discharged at the ore pass OPb provided in the outer track TRb. The movement time Ts is a value Lsc/Vm obtained by dividing the distance Lsc from the current position of the transporting machine 10T, that is, the position of the ore pass OPb to the draw point DPc by the movement speed, that is, the vehicle speed Vm of the transporting machine 10. The movement time Ts is the shortest time obtained without considering a decrease in the vehicle speed Vm on the ground that the transporting machine 10T is stopped halfway or the other transporting machine 10F exists at the front side.

In the example illustrated in FIG. 20, the loading machine 30 provided at the candidate draw point DPc loads the ore MR on the transporting machine 10L. At the current time point, that is, the timing in which the management device 3 determines the draw point DP toward which the target transporting machine 10T is directed, the time Tl necessary for loading the ore MR by the loading machine 30 provided at the candidate draw point DPc is a value Ma/Mp obtained by dividing the remaining loading amount Ma in the transporting machine 10L by the loading capacity Mp of the loading machine 30. The remaining loading amount Ma is a value obtained by subtracting the current loading amount Mn from the target loading amount Mt. The target loading amount Mt is set so as not to exceed the limit loading amount of the transporting machine 10L based on the production plan of the mine M. The target loading amount Mt of the transporting machine 10L is a constant value normally.

The current loading amount Mn can be obtained from, for example, the detection value of the mass sensor 18 (see FIG. 12) of the transporting machine 10L. The loading capacity Mp of the loading machine 30 indicates the amount (ton/time) of the ore MR which can be loaded on the transporting machine 10L per unit time by the loading machine 30. From the specific weight of the ore MR and the volume of the ore MR predicted from the image capturing result of the front image capturing device 40C illustrated in FIG. 17, the loading capacity Mp may be obtained by obtaining the amount of the ore MR conveyed by the feeder 31 of the loading machine 30.

The management device 3 obtains the time Tl necessary for loading the ore MR by obtaining, for example, the information on the volume of the ore MR conveyed by the feeder 31 or the information on the current loading amount Mn from the transporting machine 10L or the loading machine 30 through the radio communication device 4 provided in the underground mine MI and the communication device 3R illustrated in FIG. 6. When the loading machine 30 provided at the candidate draw point DPc does not load the ore MR thereon, the time Tl necessary for loading the ore MR is zero, for example, when operation of loading the ore MR on the transporting machine 10L ends or some time is left until the next transporting machine 10 (the transporting machine 10F in the example illustrated in FIG. 20) arrives at the candidate draw point DPc.

The arrival time Tr of the other transporting machine 10F directed toward the candidate draw point DP is a value Lsf/Vm obtained by dividing the distance Lsf between the candidate draw point DP and the position of the other transporting machine 10F inside the drift DRc by the movement speed, that is, the vehicle speed Vm of the transporting machine 10F at the current time point, that is, the timing in which the management device 3 determines the draw point DP toward which the target transporting machine 10T is directed. The arrival time Tr is the shortest time obtained without considering the halfway stop of the transporting machine 10F, or the like. The other transporting machine 10F is the transporting machine 10 existing in the course between the target transporting machine 10T and the candidate draw point DPc.

The predicted loading time Tlg necessary for loading the ore MR on the other transporting machine 10F is a time necessary for loading the ore MR on the transporting vehicle 10F directed toward the candidate draw point DPc based on the current time point, that is, the timing in which the management device 3 determines the draw point DP toward which the target transporting machine 10T is directed. When there is one other transporting machine 10F, a value Mt/Mp obtained by dividing the target loading amount Mt of the other transporting machine 10F by the loading capacity Mp of the loading machine 30 is the predicted loading time Tlg. The target loading amount Mt and the loading capacity Mp are the above-described values. When n number of the other transporting machines 10F exist, the predicted loading time Tlg is obtained by n×Mt/Mp. "n" is an integer equal to or larger than 1.

The movement time Tm of the loading machine 30 is the movement time from the draw point DP in which the loading machine 30 excavates and loads the ore MR to the next draw point DP in which the loading machine excavates and loads the ore. For example, when the loading machine 30 which performs the excavating operation and the loading operation at the draw point DPc moves to the adjacent draw point DPc', the time taken for the loading machine 30 moving from the draw point DPc to the draw point DPc' becomes the movement time Tm of the loading machine 30. The loading machine 30 excavates and conveys the ore MR inside the cross cut CR. For this reason, in order that the loading machine 30 moves between the draw point DP and the draw point DP', the loading machine is retracted from the cross cut CR of the draw point DP to the drift DRc, changes the direction in the drift DRc, travels in the drift DRc, changes the direction at the position connected to the cross cut CR of the draw point DP' inside the drift DRc, and enters the cross cut CR of the draw point DP'.

When the loading machine is retracted from the cross cut CR of the draw point DP to the drift DRc, moves in the drift DRc, and enters the cross cut CR of the draw point DP', the loading machine 30 travels at the constant vehicle speed Vc. For the change of the direction inside the drift DRc, the time necessary for the change of the direction by the angle formed between the loading machine 30 and the cross cut CR or the drift DRc is obtained in advance. In the embodiment, the distance from the cross cut CR of the draw point DP to the drift DRc, the movement distance of the drift DRc, and the distance from the cross cut CR to the draw point DP' are stored as the position information of the underground mine MI of the mine M in the storage device 3M of the management device 3 illustrated in FIG. 6. Thus, the management device 3 can obtain the time necessary for the movement of each distance by reading the above-described distance from the storage device 3M and dividing the distance by the vehicle speed Vc of the loading machine 30. The management device 3 can obtain the movement time Tm from the draw point DP in which the ore MR is excavated and loaded to the next draw point DP in which the ore is excavated and loaded by adding the time obtained in this way to the time necessary for the change of the direction of the loading machine 30 inside the drift DRc.

The management device 3 can obtain the empty time Tf by obtaining the movement time Ts, the time Tl necessary for loading the ore MR, the arrival time Tr, and the predicted loading time Tlg and giving the values to the equation (2). When the movement of the loading machine 30 is predicted, the management device 3 can obtain the empty time Tf by obtaining the movement time Tm of the loading machine 30 in addition to the movement time Ts, the time Tl necessary for loading the ore MR, the arrival time Tr, and the predicted loading time Tlg and giving these values to the equation (3). By this method, the empty time Tf can be correctly predicted.

When there are the draw points DP in the underground mine MI, the management device 3 obtains the empty time Tf for each draw point DP and directs the transporting machine 10 toward the draw point DP having the longest empty time Tf obtained. As a result, since the management system 1 for the mine M can improve the operability of the loading machine 30 to the maximum, the productivity of the mine can be improved. Next, a process (hereinafter, referred to as a second allocation process) will be described which determines the draw point DP toward which the transporting machine 10 is directed so that the operability of the transporting machine 10 becomes maximal.

(Second Allocation Process)

The second allocation process is performed by the management device 3 illustrated in FIG. 6 similarly to the first allocation process. When the second allocation process is performed, the management device 3 predicts the loading start time Tls necessary until the transporting machine 10T leaves the ore pass OP and starts the operation of loading the ore MR at the draw point DP toward which the transporting machine 10T is directed and determines the draw point DP where the predicted loading start time Tls becomes minimal as the draw point DP toward which the transporting machine 10T is directed. The loading start time Tls corresponds to, for example, the time taken until the transporting machine 10T leaves the ore pass OP and arrives at the draw point DP so as to start the operation of the feeder 31 of the loading machine 30 provided at the draw point DP.

The loading start time Tls is a larger value among the movement time Ts in which the target transporting machine 10T determining the draw point DP moves to the candidate draw point DP and a value obtained by adding a larger value of the time Tl necessary for loading the ore MR by the loading machine 30 provided at the candidate draw point DP at the current time point and the arrival time Tr of the other transporting machine 10F directed toward the candidate draw point DP to the predicted loading time Tlg necessary for loading the ore MR on the other transporting machine 10F. That is, the loading start time Tls can be obtained by the equation (4).

$$Tls=\max(Ts,(\max(Tl,Tr)+Tlg)) \quad (4)$$

Similarly to the first allocation process, when the loading machine 30 disposed at the candidate draw point DP is supposed to move, the movement time Tm of the loading machine 30 is further added to the sum of a larger value of the time Tl necessary for loading the ore MR by the loading machine 30 provided at the candidate draw point DP at the current time point and the arrival time Tr of the other transporting machine 10F directed toward the candidate draw point DP and the predicted loading time Tlg necessary for loading the ore MR on the other transporting machine 10F. Then, a larger value among the movement time Ts and the obtained value is set as the loading start time Tls. In this case, the loading start time Tls can be obtained by the equation (5).

$$Tls=\max(Ts,(\max(Tl,Tr)+Tlg+Tm)) \quad (5)$$

The management device 3 can obtain the loading start time Tls by obtaining the movement time Ts, the time Tl necessary for loading the ore MR, the arrival time Tr, and the predicted loading time Tlg and giving the values to the equation (4). When the loading machine 30 is supposed to move, the management device 3 can obtain the loading start time Tls by obtaining the movement time Tm of the loading machine 30 in addition to the movement time Ts, the time Tl necessary for loading the ore MR, the arrival time Tr, and the predicted loading time Tlg and giving the values to the equation (5). By this method, the loading start time Tls can be correctly predicted.

When there are the draw points DP in the underground mine MI, the management device 3 obtains the loading start time Tls for each route directed each draw point DP at each draw point DP and directs the transporting machine 10 to the draw point DP having the shortest loading start time Tls obtained. As a result, since the mine management system 1 can maximize the operability of the transporting machine 10, the productivity of the mine can be improved.

In the embodiment, the management device 3 determines the draw point DP toward which the transporting machine 10 is directed by using any one of the first allocation process and the second allocation process, but the invention is not limited thereto. For example, the management device 3 may determine the draw point DP toward which the transporting machine 10 is directed by switching the first allocation process and the second allocation process in accordance with the mining state of the mine. As an example, when the number of the loading machines 30 operated in the mine is relatively small, the operability of the loading machine 30 is high, but there is a tendency that the operability of the transporting machine 10 decreases. In such a case, the management device 3 determines the draw point DP toward which the transporting machine 10 is directed by using the second allocation process. In this way, the management device 3 can suppress degradation in the productivity of the mine by suppressing degradation in the operability of the transporting machine 10. Further, when the number of the transporting machines 10 operated in the mine is relatively small, the operability of the transporting machine 10 is high, but there is a tendency that the operability of the loading machine 30 decreases. In such a case, the management device 3 determines the draw point DP toward which the transporting machine 10 is directed by using the first allocation process. In this way, the management device 3 can suppress degradation in the productivity of the mine M by suppressing degradation in the operability of the loading machine 30.

<Allocation Process Example>

Figure 21:
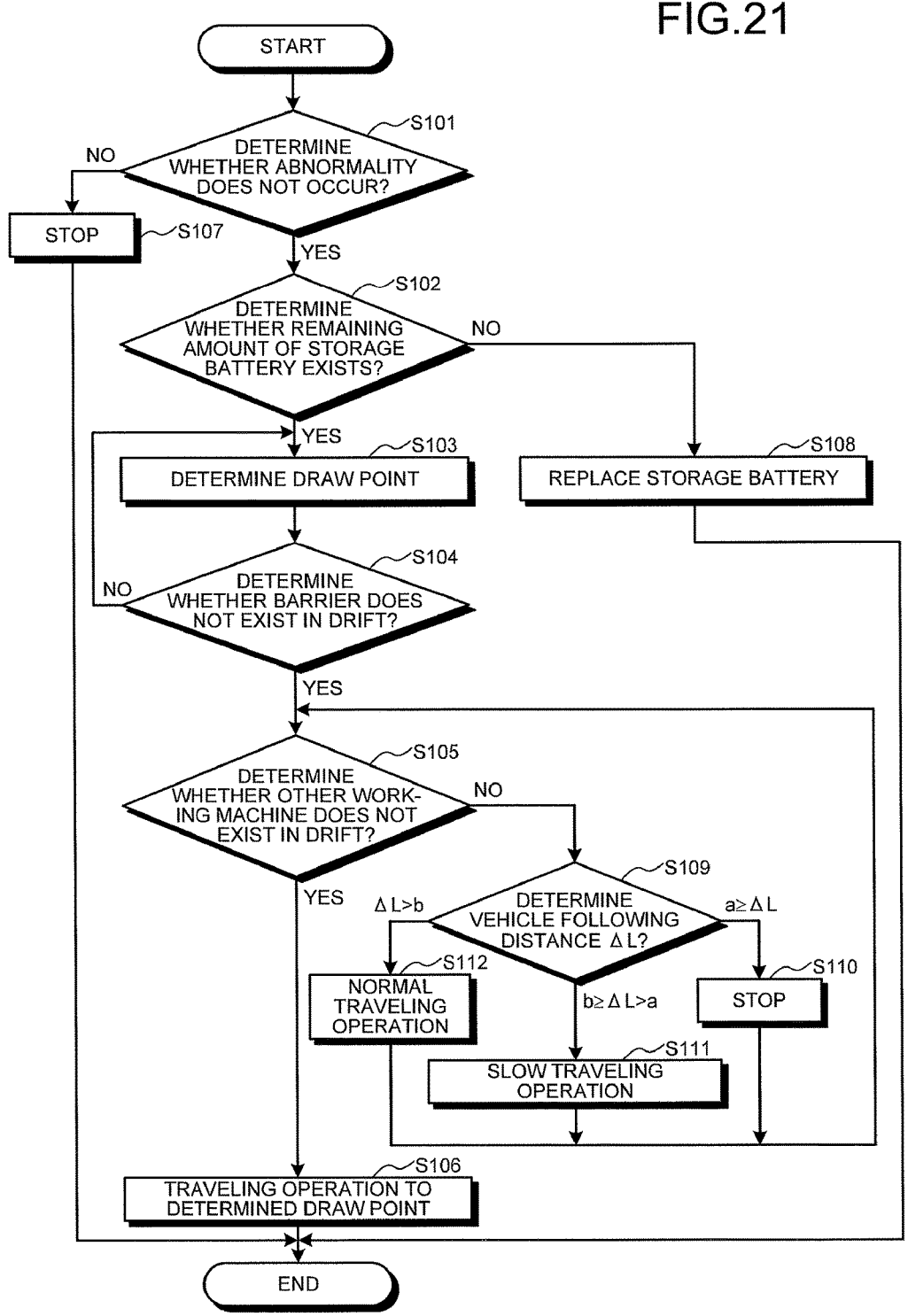
FIG. 21 is a flowchart illustrating an allocation procedure example of the transporting machine according to the embodiment.

FIG. 21 is a flowchart illustrating an allocation procedure example of the transporting machine 10 according to the embodiment. When the draw point DP toward which the target transporting machine 10T is directed is determined based on the allocation process and the transporting machine 10T is directed toward the draw point DP, the management device 3 determines in step S101 whether abnormality occurs in the transporting machine 10T. In this case, the management device 3 obtains the operation information of the transporting machine 10T through the communication device 25 and the antenna 15 illustrated in FIG. 12 and the antenna 4A, the radio communication device 4, and the communication device 3R illustrated in FIG. 6. The management device 3 determines whether abnormality occurs in the transporting machine 10T based on the obtained operation information.

When abnormality does not occur in the transporting machine 10T (step S101, Yes), the management device 3 determines in step S102 whether the remaining amount of the storage battery 14 mounted on the transporting machine 10T is equal to or larger than a predetermined value. The predetermined value can be set as, for example, the amount of power necessary for the transporting machine 10T moving from the current ore pass OP to the next draw point DP, loading the ore MR thereon, discharging the ore MR at the ore pass OP, and moving freely to the storage battery exchange device EX illustrated in FIG. 18. The remaining amount of the storage battery 14 can be obtained from the operation information.

When the remaining amount of the storage battery 14 is equal to or larger than the predetermined value (step S102, Yes), the management device 3 determines the draw point DP toward which the transporting machine 10T is directed by the first allocation process or the second allocation process in step S103. When the draw point DP is determined, the routine proceeds to step S104, and the management device 3 determines whether rock or other broken working machine, that is, a barrier like the transporting machine 10 and the loading machine 30 exists in the course, that is, the drift DR and the outer track TR in which the transporting machine 10T is directed toward the determined draw point DP. For example, the management device 3 determines whether there is a broken working machine from the operation information of the transporting machine 10 and the loading machine 30 operated in the underground mine MI or determines whether rock exists inside the mine shaft from the detection result of the periphery monitoring cameras 17CA and 17CB and the non-contact sensors 17A and 17B of the transporting machine 10 traveling in the underground mine MI.

When a barrier does not exist in the course in which the transporting machine 10T is directed toward the determined draw point DP (step S104, Yes), the management device 3 determines in step S105 whether the other working machines, that is, the transporting machine 10 and the loading machine 30 exist in the course, that is, the drift DR and the outer track TR in which the transporting machine 10T is directed toward the determined draw point DP. This determination can be made in a manner such that the management device 3 extracts the position information from the operation information of the transporting machine 10 and the loading machine 30 operated in the underground mine MI and compares the position information. The working machine as a determination target in step S105 is not a broken working machine, but a normal working machine. When the other working machine does not exist in the course in which the transporting machine 10T is directed toward the determined draw point DP (step S105, Yes), the management device 3 gives an instruction to the transporting machine 10T so that the transporting machine moves to the determined draw point DP. The transporting machine 10T which receives the instruction travels to the determined draw point DP in step S106.

When abnormality occurs in the transporting machine 10T in step S101 (step S101, No), the management device 3 gives an instruction to the transporting machine 10T so that the transporting machine is stopped on the spot or the transporting machine moves to the maintenance space MS illustrated in FIG. 18 in step S107 in response to the abnormality degree. In this case, for example, when the transporting machine 10T is freely movable, the management device 3 gives an instruction to the transporting machine so that the transporting machine moves to the maintenance space MS. Meanwhile, when the transporting machine is not freely movable, the management device gives an instruction to the transporting machine so that the transporting machine is stopped on the spot. The transporting machine 10T which receives the instruction is operated according to the instruction.

When the remaining amount of the storage battery 14 is smaller than the predetermined value in step S102 (step S102, No), the management device 3 gives an instruction to the transporting machine 10T so that the transporting machine moves to the storage battery exchange device EX illustrated in FIG. 18 so as to replace the storage battery 14 in step S108. The transporting machine 10T which receives the instruction moves to the storage battery exchange device EX so as to replace the storage battery 14 therein. When a barrier exists in the course in which the transporting machine 10T is directed toward the determined draw point DP (step S104, No), the management device 3 returns a routine to step S103 and determines the draw point DP toward which the transporting machine 10T is directed by the first allocation process or the second allocation process. In this case, the management device 3 determines the draw point DP toward which the transporting machine 10T is directed by excluding the determined draw point DP toward which the transporting machine 10T is directed at the current time point. When the draw point DP toward which the transporting machine 10T is directed cannot be determined in step S103, the management device 3 prepares a working machine for removing the barrier inside the mine shaft. After the barrier inside the mine shaft is removed, the draw point DP toward which the transporting machine 10T is directed is determined again by the first allocation process or the second allocation process.

When the other working machine exists in the course in which the transporting machine 10T is directed toward the determined draw point DP (step S105, No), the management device 3 controls the traveling speed of the transporting machine 10T in response to the value of the distance (the vehicle following distance) $\Delta L$ between the transporting machine 10T and the other working machine. For this reason, the vehicle following distance $\Delta L$ is determined in step S109. When the vehicle following distance $\Delta L$ is equal to or smaller than the predetermined first threshold value a, the management device 3 gives an instruction to the transporting machine 10T so that the transporting machine is stopped on the spot in step S110. By the instruction, the transporting machine 10T is stopped on the spot. In this way, it is possible to prevent the transporting machine 10T from moving excessively close to the other working machine.

When the vehicle following distance $\Delta L$ is larger than a predetermined first threshold value a and is equal to or smaller than a predetermined second threshold value b (b>a), the management device 3 gives an instruction to the transporting machine 10T so that the transporting machine travels slow in step S111. By the instruction, the transporting machine 10T travels slow. In the case of $b \geq \Delta L > a$, since the distance with respect to the other working machine is ensured to a certain degree, an increase in cycle time can be suppressed due to the slow travel of the transporting machine 10T. When the vehicle following distance $\Delta L$ is larger than the predetermined second threshold value b (b>a), the management device 3 gives an instruction to the transporting machine 10T so that the transporting machine travels normally in step S112. By the instruction, the transporting machine 10T travels at a normal speed. In the case of $\Delta L > b$, since the distance with respect to the other working machine is sufficiently ensured, an increase in cycle time can be further suppressed by the normal travel of the transporting machine 10T. In the embodiment, the transporting machine 10T is allocated to the draw point DP in this way. Next, a process (hereinafter, referred to as a discharge allocation process) will be described which determines the ore pass OP toward which the transporting machine 10 loading the ore MR as the load thereon is directed when the mine M has a plurality of ore passes OP.

<Discharge Allocation Process>

Figure 22:
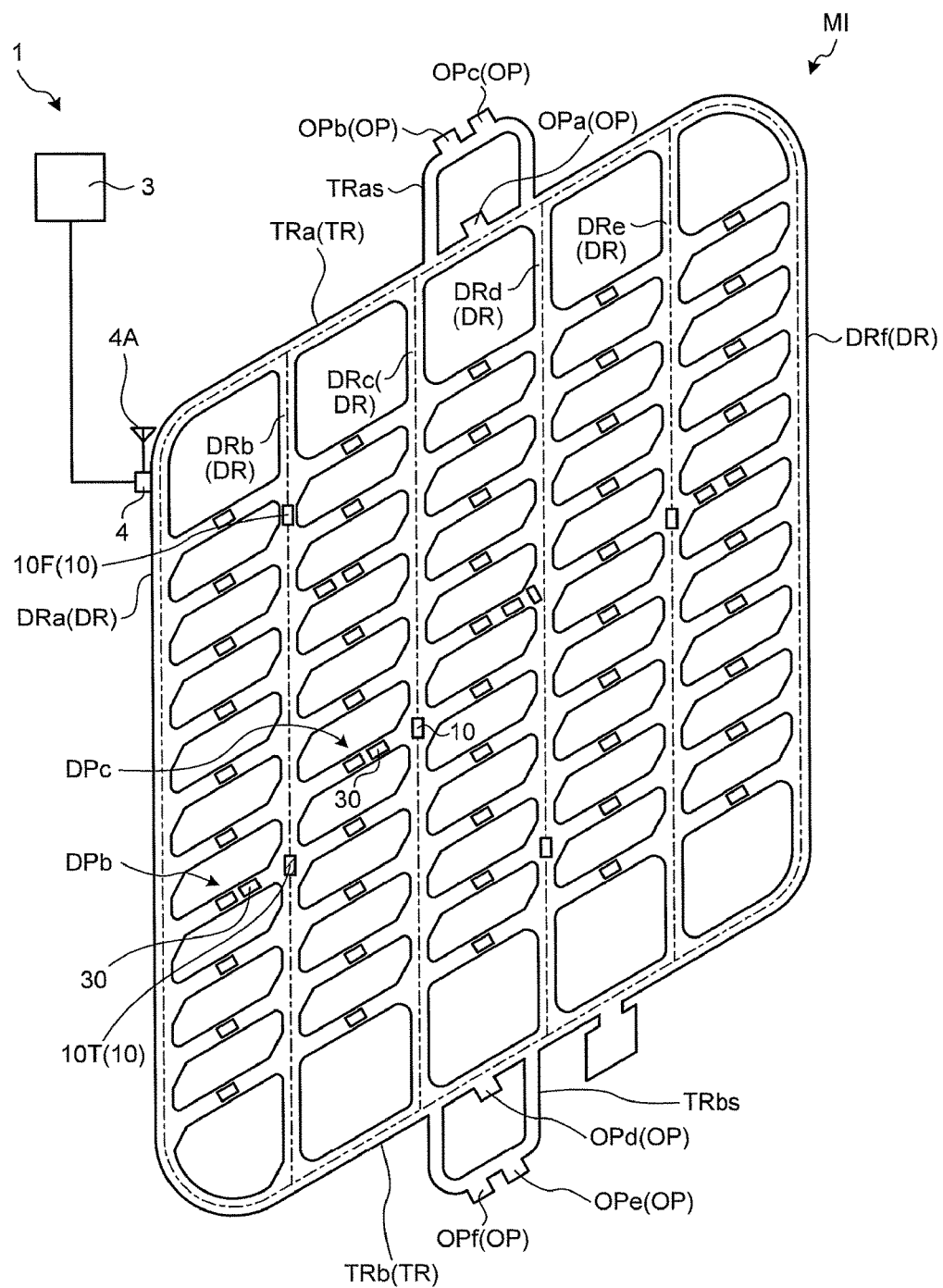
FIG. 22 is a diagram illustrating a process performed when an ore pass toward which the transporting machine loading ore MR as a load is directed is determined.

FIG. 22 is a diagram illustrating a process performed when the ore pass OP toward which the transporting machine 10 loading the ore MR as the load is directed is determined. In the underground mine MI of the mine illustrated in FIG. 22, the ore passes OPa, DPb, and DPc are provided near the outer track TRa and the ore passes OPd, DPe, and DPf are provided near the outer track TRb. When these are not distinguished, the ore pass OP is used. The outer track TRa is provided with the bypass track TRas. The outer track TRa is provided with the ore pass OPa and the bypass track TRas is provided with the ore passes OPb and DPc. Similarly, the outer track TRb is provided with the bypass track TRbs. The outer track TRb is provided with the ore pass OPd and the bypass track TRbs is provided with the ore passes OPe and DPf. In the description below, an example will be described in which the transporting machine 10 directed toward the outer track TRa discharges the ore MR to any one of the ore passes OPa, DPb, and DPc near the outer track TRa, but the same applies to a case where the transporting machine 10 directed toward the outer track TRb discharges the ore MR to any one of the ore passes OPd, DPe, and DPf near the outer track TRb.

The transporting machine 10 which loads the ore MR thereon at the draw point DP discharges the ore MR at the ore pass OP. In the embodiment, when the ore pass OP toward which the transporting machine 10 loading the ore MR thereon is directed is determined among the ore passes OP, the management device 3 sets the ore pass OP in which the time (also referred to as the discharge start time) taken until the transporting machine 10 discharges the ore MR is the shortest among the ore passes OP as the ore pass OP toward which the transporting machine 10 is directed. A process of determining the ore pass OP toward which the transporting machine 10 loading the ore MR thereon is directed among the ore passes OP is referred to as a discharge allocation process.

In FIG. 22, the target transporting machine 10 which determines the ore pass OP is set as the transporting machine 10T. The other transporting machine 10 supposed to discharge the ore MR at the candidate ore pass OP is set as the transporting machine 10F. As described above, it is assumed that the transporting machine 10 travels in the circuit formed by two drifts DR and two outer tracks TR in the clockwise direction. In the embodiment, the vehicle speed Vm of the transporting machine 10 is constant. With such a configuration, a process performed when determining the ore pass OP toward which the transporting machine 10 is directed so as to discharge the ore MR is comparatively simple.

When the discharge allocation process is performed, the management device 3 obtains the discharge start time Tad for each ore pass OP as the sum of the movement time Tds in which the target transporting machine 10T determining the ore pass OP moves to the candidate ore pass OP and the discharge time Tdd as the time necessary for discharging the ore MR by the other transporting machine 10F supposed to discharge the ore MR at the candidate ore pass OP after the time in which the target transporting machine 10T reaches the ore pass OP. Then, the management device 3 sets the ore pass OP having the shortest discharge start time Tad as the ore pass OP toward which the transporting machine 10T is directed. The discharge time Tdd becomes zero when the other transporting machine 10F supposed to discharge the ore MR at the candidate ore pass OP does not exist. When the number of the other transporting machines 10F supposed to discharge the ore at the candidate ore pass OP is "n", the time Tdu×n necessary for discharging the ore by one transporting machine 10F becomes the discharge time Tdd. "n" is an integer equal to or larger than 0. The discharge start time Tad can be obtained by the equation (6).

$$Tad = Tds + Tdd = Tds + Tdu \times n \qquad (6)$$

The management device 3 determines the ore pass OP toward which the transporting machine 10T is directed when the ore MR is completely loaded on the transporting machine 10T. With such a configuration, since a uniform standard can be used when the discharge start time Tad for each transporting machine 10 is obtained, the management device 3 can accurately predict the discharge start time Tad for each transporting machine 10.

In the example illustrated in FIG. 22, the candidate of the ore pass OP toward which the target transporting machine 10T determining the ore pass OP is directed is set as, for example, the ore pass OPa of the outer track TRa. Further, in the example illustrated in FIG. 22, it is assumed that the ore MR is completely loaded on the target transporting machine 10T at the draw point DPb of the drift DRb. The movement time Tds is a value Lsd/Vm obtained by dividing the distance Lsd from the current position of the transporting machine 10T, that is, the position of the drift DRb corresponding to the draw point DPb to the ore pass OPa by the movement speed, that is, the vehicle speed Vm of the transporting machine 10. The movement time Tds is the shortest time obtained without considering a decrease in the vehicle speed Vm on the ground that the transporting machine 10T is stopped halfway or the other transporting machine 10F exists at the front side.

The management device 3 can obtain the discharge start time Tad by obtaining the movement time Tds and the discharge time Tdd and giving the values to the equation (6). When the ore passes OP exist in the underground mine MI, the management device 3 obtains the discharge start time Tad for each ore pass OP and directs the transporting machine 10 toward the ore pass OP having the shortest discharge start time Tad obtained. For this reason, the mine management system 1 can minimize the standby time necessary for discharging the ore MR at the ore pass OP by the transporting machine 10. As a result, since the management device 3 can suppress an increase in the cycle time of the transporting machine 10, that is, the time taken until the ore MR is loaded again after the ore MR is loaded and discharged, the productivity of the mine can be improved.

In the embodiment, when the ore passes OP are provided in the traveling direction of the target transporting machine 10T and any ore pass OP is empty, the management device 3 sets the ore pass OP at the advancing direction side as the ore pass OP toward which the target transporting machine 10T is directed. For example, in the example illustrated in FIG. 22, the bypass track TRas of the outer track TRa is provided with two ore passes OPb and DPc in the traveling direction of the target transporting machine 10T. When any one of the ore passes OPb and DPc is empty, the management device 3 sets the ore pass OPc at the advancing direction side, that is, the ore pass OPc separated from the transporting machine 10T as the ore pass OP toward which the target transporting machine 10T is directed. With such a configuration, since the transporting machine 10T can set the ore pass OPb at the rear side thereof in the traveling direction to an empty state, the management device 3 can allocate the empty ore pass OPb to the other transporting machine 10. As a result, the management device 3 can improve the productivity of the mine by suppressing an increase in the cycle time of the transporting machine 10.

<Allocation Process Example>

Figure 23:
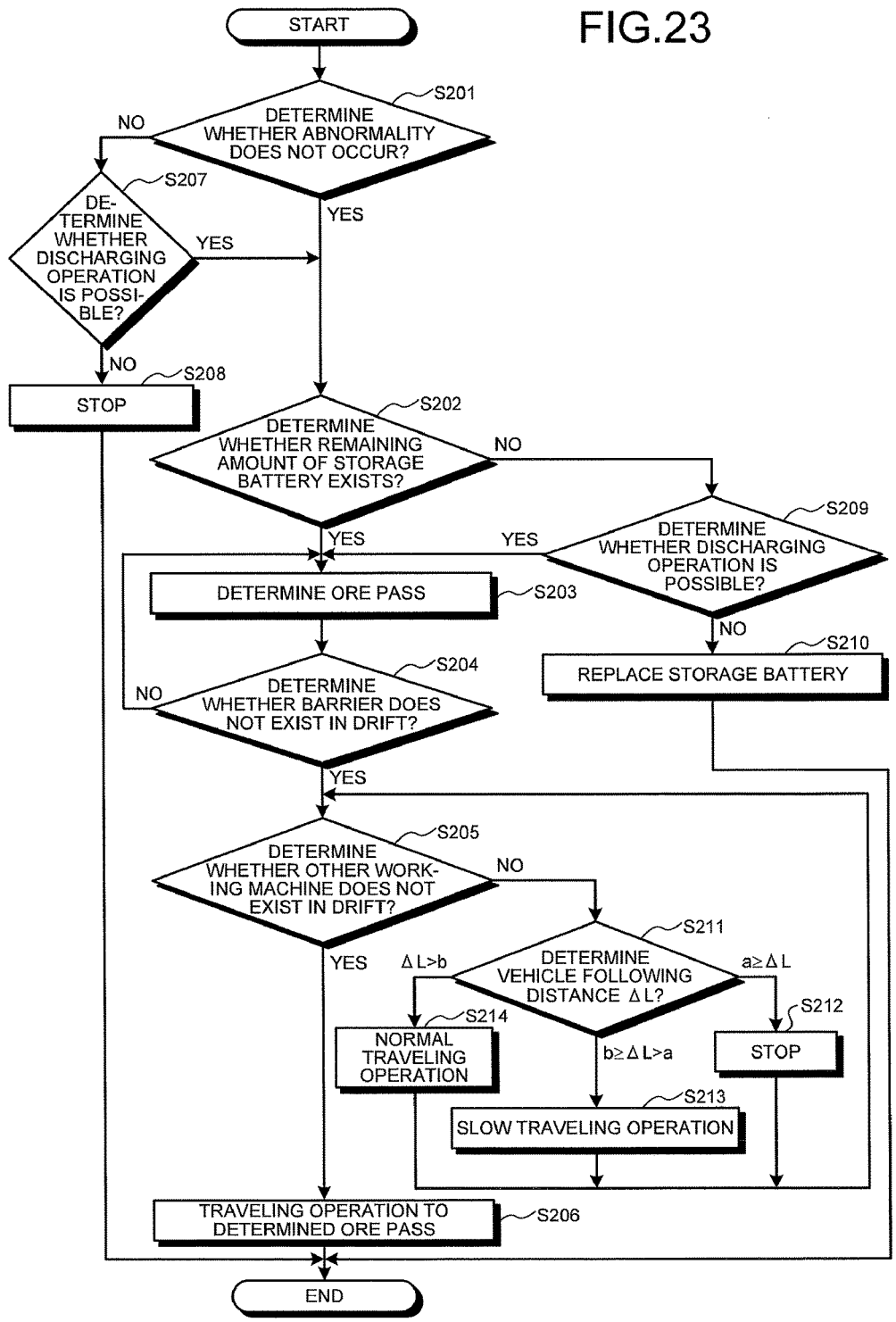
FIG. 23 is a flowchart illustrating an allocation procedure example of the transporting machine according to the embodiment in an ore pass.

FIG. 23 is a flowchart illustrating an allocation procedure example of the transporting machine 10 according to the embodiment toward the ore pass OP. When the ore pass OP toward which the target transporting machine 10T is directed is determined based on the allocation process and the transporting machine 10T is directed toward the ore pass OP, the management device 3 performs the processes in step S201 and step S202. Since step S201 and step S202 are similar to step S101 and step S102 of the allocation process of the transporting machine 10, the description thereof will be omitted.

When the remaining amount of the storage battery 14 is equal to or larger than a predetermined value (step S202, Yes), the management device 3 determines the ore pass OP toward which the transporting machine 10T is directed by the discharge allocation process in step S203. When the ore pass OP is determined, the routine proceeds to step S204 and the management device 3 determines whether rock or other broken working machine, that is, a barrier like the transporting machine 10 and the loading machine 30 exists in the course, that is, the drift DR and the outer track TR in which the transporting machine 10T is directed toward the determined ore pass OP. This determination method is as described above.

When a barrier does not exist in the course in which the transporting machine 10T is directed toward the determined ore pass OP (step S204, Yes), the management device 3 determines in step S205 whether the other working machines, that is, the transporting machine 10 and the loading machine 30 exist in the course, that is, the drift DR and the outer track TR in which the transporting machine 10T is directed toward the determined ore pass OP. This determination method is as described above. When the other working machine does not exist in the course in which the transporting machine 10T is directed toward the determined ore pass OP (step S205, Yes), the management device 3 gives an instruction to the transporting machine 10T so that the transporting machine moves to the determined ore pass OP. The transporting machine 10T which receives the instruction travels to the determined ore pass OP in step S206.

When abnormality occurs in the transporting machine 10T in step S201 (step S201, No), the management device 3 determines in step S207 whether the ore MR loaded on the transporting machine 10T can be discharged. For example, the management device 3 can perform the determination in step S207 by determining whether a dumping function of the vessel 11 is normal from the obtained operation information of the transporting machine 10T. When the ore MR loaded on the transporting machine 10T can be discharged (step S207, Yes), the management device 3 performs the processes of step S202 and steps subsequent thereto. When the ore MR loaded on the transporting machine 10T cannot be discharged (step S207, No), the management device 3 gives an instruction to the transporting machine 10T so that the transporting machine is stopped on the spot or the transporting machine moves to the maintenance space MS illustrated in FIG. 18 in response to the abnormality degree in step S208. In this case, for example, when the transporting machine 10T is freely movable, the management device 3 gives an instruction to the transporting machine so that the transporting machine moves to the maintenance space MS. Meanwhile, when the transporting machine is not freely movable, the management device gives an instruction to the transporting machine so that the transporting machine is stopped on the spot. The transporting machine 10T which receives the instruction is operated according to the instruction.

When the remaining amount of the storage battery 14 is smaller than a predetermined value in step S202 (step S202, No), the routine proceeds to step S209 and the management device 3 determines whether the ore MR loaded on the transporting machine 10T can be discharged. This determination method is as described above. When the ore MR loaded on the transporting machine 10T can be discharged (step S209, Yes), the management device 3 performs the processes of step S203 and steps subsequent thereto.

When the ore MR loaded on the transporting machine 10T cannot be discharged (step S209, No), the management device 3 gives an instruction to the transporting machine 10T so that the transporting machine moves to the storage battery exchange device EX illustrated in FIG. 18 in step S210. The transporting machine 10T which receives the instruction moves to the storage battery exchange device EX so as to replace the storage battery 14 therein. Since a process performed when a barrier exists in the course in which the transporting machine 10T is directed toward the determined ore pass OP (step S204, No) is similar to step S104 of the allocation process of the transporting machine 10, the description thereof will be omitted. Further, a process performed when the other working machine exists in the course in which the transporting machine 10T is directed toward the determined ore pass OP (step S205, No) includes step S211 to step S214. However, since these steps are similar to step S109 to step S112 of the allocation process of the transporting machine 10, the description thereof will be omitted. In the embodiment, the ore pass OP toward which the transporting machine 10T is directed is determined in this way. Next, a process (hereinafter, referred to as the allocation process of the loading machine 30) will be described which determines the draw point DP having the loading machine 30 disposed therein.

<Allocation Process of Loading Machine 30>

Figure 24:
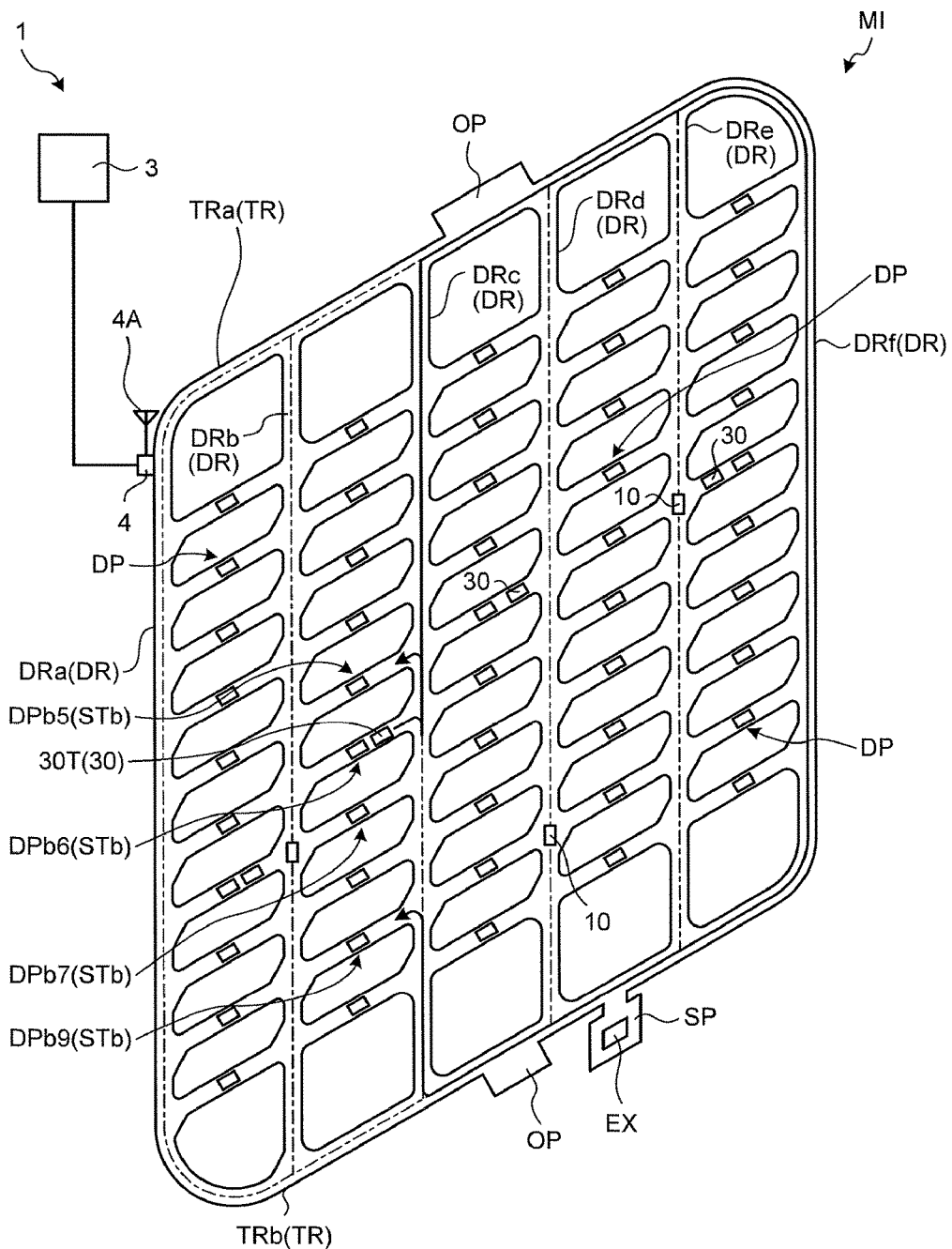
FIG. 24 is a diagram illustrating an allocation process for the loading machine.

FIG. 24 is a diagram illustrating the allocation process of the loading machine 30. The management device 3 performs the allocation process of the loading machine 30. As illustrated in FIG. 24, in the mine M that mines the ore by the block caving method illustrated in FIG. 1, the draw points DP are provided in the underground mine MI. For this reason, it is desirable to mine the ore MR from the draw points DP in a well balance. The production plan of the mine M is designed so that the ore MR is not partially mined from the specific draw point DP and the ore MR is mined from the draw points DP of the mine M in a well balance. The management device 3 mines the ore MR by moving the loading machine 30 to the draw points DP according to the production plan of the mine M. Further, as described above, there is a case in which ore clogging occurs at the draw point DP or a large mass of the ore MR appears at the draw point DP for which the loading machine 30 cannot perform the excavating operation or the conveying operation. Even in such a case, the management device 3 moves the loading machine 30 to the draw point DP where ore clogging or a large mass of the ore MR does not appear. For this reason, the management device 3 performs the allocation process of the loading machine 30.

The draw point DP near the drift DRb connected to the drift DRc illustrated in FIG. 24 is referred to as the draw point DPb. In the embodiment, ten draw points DPb are connected to one side of one drift DRc of the underground mine MI. For convenience of the description, ten draw points DPb are distinguished by the numbers 1 to 10 in a direction from the outer track TRa toward the outer track TRb. The target loading machine 30 moving to the other draw point DP in the underground mine MI is referred to as the loading machine 30T.

(First Allocation Process)

In the embodiment, the management device 3 determines the draw point DP having the loading machine 30 disposed therein based on a difference between the production plan and the actual production amount (the mining amount) of the mine M when performing the allocation process of the loading machine 30. In the first allocation process, the management device 3 sets the priority order of the draw point DP having the loading machine 30 disposed therein so that the actual production amount of the draw point DP is smaller than the production amount of the draw point DP determined by the production plan of the mine M and a difference between the production amount according to the production plan of the mine M and the actual production amount is relatively large. Then, the management device 3 determines the draw point DP having the loading machine 30 disposed therein according to the priority order. In this case, it is assumed that one loading machine 30 is disposed in one drift DR to the maximum. With such a configuration, it is possible to relatively simplify a process performed when determining the draw point DP having the loading machine 30 disposed therein.

In the example illustrated in FIG. 24, the loading machine 30T excavates and conveys the ore MR at the draw point DPb6 and loads the ore MR on the transporting machine 10. For example, a case will be supposed in which the management device 3 moves the loading machine 30T to any one of the draw points DPb1, STb2, . . . STb10 connected to the drift DRc except for STb6. The actual production amounts (the actual production amounts) of the draw points DPb1, STb2, . . . STb10 are set as RV1, RV2, . . . RV10, and the production amounts (the target production amounts) determined according to the production plan of the mine M are set as RVp1, RVp2, . . . RVp10. The actual production amounts of the draw points DPb1, STb2, . . . STb10 are obtained in a manner such that the management device 3 obtains the excavating amount of the loading machine 30 operated at each of the draw points DPb1, STb2, . . . STb10 and performs a statistic process thereon. The target production amounts RVp1, RVp2, . . . RVp10 are determined in advance by the production plan and are stored in, for example, the storage device 3M of the management device 3 illustrated in FIG. 6.

When the draw point DPb where the loading machine 30T is disposed is determined, the management device 3 first obtains differences (production amount differences) ΔRV1, ΔRV2, . . . ΔRV10 among the actual production amount RV1, RV2, . . . RV10 of the draw points DPb1, STb2, . . . STb10 and the target production amounts RVp1, RVp2, . . . RVp10. Next, the management device 3 extracts the draw point DPb in which the actual production amounts RV1, RV2, . . . RV10 are smaller than the target production amounts RVp1, RVp2, . . . RVp10. The management device 3 sets the draw point DPb in which the actual production amounts RV1, RV2, . . . RV10 are smaller than the target production amounts RVp1, RVp2, . . . RVp10 and the production amount differences ΔRV1, ΔRV2, . . . ΔRV10 are the largest as the draw point DPb where the loading machine 30T is disposed after the draw point DPb6. For example, when the actual production amount RV9 is smaller than the target production amount RVp9 and the production amount difference ΔRV9 is the largest, the draw point DPb9 is set after the draw point DPb6 so that the loading machine 30T is disposed at the draw point.

When the draw point DPb9 where the loading machine 30T is disposed is determined, the loading machine 30T moves to the determined draw point DPb9. In the embodiment, the transporting machine 10 and the loading machine 30 of the underground mine MI travel in the circuit formed by the drift DR and the outer track TR in one direction (in the embodiment, in the clockwise direction). Thus, the loading machine 30T moves from the current draw point DPb6 to the drift DRc so that the front side, that is, the loading side of the feeder 31 faces the outer track TRa. Then, the loading machine 30T passes through the drift DRb, the outer track TRa, the drift DRf, and the outer track TRb, passes through the drift DRc again, and enters the determined draw point DPb.

In the embodiment, the loading machine 30 may move in the drift DR and the outer track TR in the reverse direction as well as one direction. For example, the loading machine 30 may travel in a direction in which the distance to the destination is short inside the same drift DR and the same outer track TR regardless of the movement direction. This is because the movement efficiency of the loading machine 30 is more important in that the traveling speed of the loading vehicle 30 is slower than that of the transporting machine 10. When the loading machine 30 moves, the management device 3 performs a control so that the transporting machine 10 is not allocated to the drift DR or the transporting machine 10 waits for an instruction at the front side of the movement range of the loading machine 30. For example, when the loading machine 30T disposed at the draw point DPb6 moves to the draw point DPb7, the management device 3 temporarily prohibits the traveling of the transporting machine 10 in the drift DRc. Then, the management device 3 may shorten the movement distance of the loading machine 30T by reversely moving the loading machine 30T inside the drift DRc.

Likewise, when the loading machine 30T also travels in the drift DR and the outer track TR of the underground mine MI in one direction similarly to the transporting machine 10, it is possible to decrease the possibility of the meeting and parting with respect to the transporting machine 10 inside the drift DR. Further, in the embodiment, since the mining work is not performed at the draw point DP from the outermost drifts DRa and DRf, it is possible to decrease the possibility of the meeting and parting with respect to the transporting machine 10 inside the drift DR by moving the loading machine 30T so as to pass through the outermost drift DRf. As a result, since the loading machine 30T can promptly move to the next draw point DPb9, it is possible to promptly start the operation of excavating the ore MR by shortening the time necessary for the movement. For this reason, the mine management system 1 can suppress degradation in productivity of the mine M to the minimum.

In the first allocation process, when the actual production amount RV6 of the draw point DPb6 is smaller than the target production amount RVp6 and the production amount difference ΔRV6 is the largest, the management device 3 sets the draw point DPb where the loading machine 30T is disposed as the draw point DPb6. That is, the draw point DPb6 where the loading machine 30T is disposed is maintained as the draw point DPb6. Further, the management device 3 excludes the draw point DPb provided with at least one of a large mass of the ore MR and ore clogging from the target having the loading machine 30 disposed therein. With such a configuration, the loading machine 30 can prevent an accident in which the ore MR cannot be excavated at the draw point DPb as the movement target.

For example, in the above-described example, the loading machine 30T is disposed at the draw point DPb9 based on the target production amount RVp and the actual production amount RV, but it is assumed that a large mass or the like occurs at the draw point DPb9. In this case, the management device 3 determines the draw point DPb of the next priority order, that is, the draw point DPb in which the actual production amount RV of the draw point DP is smaller than the target production amount RVp and the production amount difference ΔRV is secondly large after the draw point DPb9 as area where the loading machine 30T is disposed.

The management device 3 periodically obtains the production amount differences ΔRV1, ΔRV2, ... ΔRV10 and determines the draw point DPb where the loading machine 30T is disposed. Since one loading machine 30 is disposed at one drift DR to the maximum, it is desirable that the loading machine 30 move the draw point DP inside the same drift DR so as not to interfere with the other working machine 30 disposed at the other drift DR. However, the invention is not limited thereto, and the loading machine 30 may move to the draw point DR connected to any drift DR of the underground mine MI.

The first allocation process sets the priority order of the draw point DP having the loading machine 30 disposed therein in order from the draw point DP in which the actual production amount RV of the draw point DP is smaller than the target production amount RVp and the production amount difference ΔRV is relatively large. With such a configuration, the mine management system 1 can mine the ore MR from each draw point DP in a well balance. Further, in the first allocation process, when there are the draw points DPb in which the actual production amount RV of the draw point DP is smaller than the target production amount RVp, the management device 3 may determine the draw point DRb in which the movement distance from the draw point DPb6 having the loading machine 30 disposed therein is the shortest as the next draw point DPb having the loading machine 30 disposed therein. With such a configuration, since the movement time becomes short, the loading machine 30 can start the operation of excavating the ore MR in a short time from the movement start time. For this reason, the mine management system 1 can suppress degradation in productivity of the mine M to the minimum.

(Second Allocation Process)

In the embodiment, in the second allocation process, the management device 3 determines the draw point DP having the loading machine 30 disposed therein from the draw point DP connected to the same drift DR and adjusts the production amount at the determined draw point DP based on a difference between the production amount determined by the production plan of the mine M, that is, the target production amount and the actual production amount, that is, the actual production amount. At this time, when the loading machine 30 is already disposed at a predetermined draw point DP, the management device 3 determines the other draw point DP adjacent to the predetermined draw point DP as the draw point DP having the loading machine 30 disposed therein at the next time.

In the example illustrated in FIG. 24, the loading machine 30T excavates and conveys the ore MR at the draw point DPb6 and loads the ore MR on the transporting machine 10. In the second allocation process, the management device 3 determines any one of the draw points DPb1, STb2, ... STb10 connected to the same drift DRc except for STb6 as the draw point DPb where the loading machine 30T is disposed and moves the loading machine 30T to the determined draw point DPb. In this example, the management device 3 determines the draw point DPb5 adjacent to the draw point DPb6 as an area where the loading machine 30T is disposed at the next time. When the second allocation process is performed, the management device 3 determines the draw point DPb where the loading machine 30T is disposed among the draw points DPb in which the actual production amounts RV1, RV2, ... RV10 at the draw points DPb1, STb2, ... STb10 connected to the same drift DRc are smaller than the target production amounts RVp1, RVp2, ... RVp10.

At the draw point DPb5, the management device 3 determines the production amount at the draw point DPb5 so that the current production amount RV at the draw point DPb5 becomes the target production amount RVp. The management device 3 causes the loading machine 30T to perform the excavating operation at the draw point DPb5 until the determined production amount at the draw point DPb5. Likewise, since the draw point DPb5 adjacent to the draw point DPb6 where the loading machine 30T is disposed currently is set as the draw point DPb where the loading machine 30T is disposed at the next time, the movement amount of the loading machine 30T can be decreased.

In this example, two draw points DPb5 and STb7 are adjacent to the draw point DPb6 where the loading machine 30T is currently disposed. For example, when the actual production amount RV5 of the draw point DPb5 is smaller than the target production amount RVp5 and the actual production amount RV7 of the draw point DPb7 is larger than the target production amount RVp7, the management device 3 determines the draw point DPb5 as an area where the loading machine 30T is disposed at the next time. Further, even when the actual production amounts RV5 and RV7 of the draw points DPb5 and STb7 are smaller than the target production amounts RVp5 and RVp7 and the production amount difference ΔRV5 of the draw point DPb5 is larger than the production amount difference ΔRV7 of the draw point DPb7, the management device 3 determines the draw point DPb5 as an area where the loading machine 30T is disposed at the next time.

When the actual production amounts RV5 and RV7 of the draw points DPb5 and STb7 are smaller than the target production amounts RVp5 and RVp7 and the production amount difference ΔRV7 of the draw point DPb7 is larger than the production amount difference ΔRV5 of the draw point DPb5, the management device 3 may determine the draw point DPb7 as an area where the loading machine 30T is disposed at the next time. Further, when the actual production amounts RV5 and RV7 of the draw points DPb5 and STb7 are smaller than the target production amounts RVp5 and RVp7, the management device 3 may determine an area where the movement distance from the draw point DPb6 having the loading machine 30T currently disposed therein is shorter as an area where the loading machine 30T is disposed at the next time regardless of the values of the production amount differences ΔRV5 and ΔRV7.

In the embodiment, since the loading machine 30T travels in the drift DR and the outer track TR of the underground mine MI in one direction (in the clockwise direction), the movement distance of the loading machine 30T at the draw point DPb5 is shorter than that of the draw point DPb7 in the example illustrated in FIG. 24. Thus, the management device 3 determines the draw point DPb5 in which the movement distance from the draw point DPb6 having the loading machine 30T currently disposed therein is shorter as an area where the loading machine 30T is disposed at the next time. Further, the management device 3 may temporarily allow the reverse traveling of the loading machine 30T inside the drift DRc. In this way, since the movement time of the loading machine 30T can be shortened, it is possible to promptly start the operation of excavating the ore MR. For this reason, the mine management system 1 can suppress degradation in productivity of the mine M to the minimum.

Even in the second allocation process, the management device 3 excludes the draw point DPb provided with at least one of a large mass of the ore MR and ore clogging from the target having the loading machine 30 disposed therein. With such a configuration, it is possible to avoid an accident in which the loading machine 30 cannot excavate the ore MR at the draw point DPb of the movement target.

<Exception Process>

The allocation process of the transporting machine 10 and the allocation process of the loading machine 30 are based on the condition in which the transporting machine 10 and the loading machine 30 are not abnormal, the remaining amount of the storage battery 14 is sufficient, and a barrier does not exist inside the drift DR. A process will be described which is performed in the event of an accident (hereinafter, referred to as an exception) in which the above-described conditions are not established. In the event of the exception, the management device 3 sorts the transporting machine 10 and the loading machine 30 which are influenced by the exception and the transporting machine 10 and the loading machine 30 which are not influenced by the exception and stores the management information in the storage device 3M by giving an index for distinguishing the transporting machine 10 and the loading machine 30 influenced by the exception thereto. The management device 3 determines whether there is an influence due to the exception from the operation information of the loading machine 30 obtained from the loading machine 30. The management device 3 waits for an instruction from the operator while the operation of the transporting machine 10 and the loading machine 30 not influenced by the exception is continued and the operation of the transporting machine 10 and the loading machine 30 influenced by the exception is stopped. Further, when the transporting machine 10 or the like is broken or a barrier such as rock occurs in the drift DR, the management device 3 searches for an alternative route if necessary and performs the allocation process of the transporting machine 10 and the allocation process of the loading machine 30 based on the alternative route.

When abnormality occurs in the loading machine 30, the management device 3 prohibits the passage in the drift DR having the abnormal loading machine 30 disposed therein or stops the entire mining area if the abnormal loading machine 30 is movable. Then, the management device 3 gives an instruction to the abnormal loading machine 30 so that the abnormal loading machine moves to the maintenance space MS. The loading machine 30 receiving the instruction moves to the maintenance space MS. When the course in which the abnormal loading machine 30 travels overlaps the course in which the other transporting machine 10 or the like travels, the management device 3 prohibits the passage of a working machine or the like other than the abnormal loading machine 30 at the overlapping part. The abnormality occurring in the loading machine 30 and allowing the moving operation is, for example, the abnormality of the rotation roller 33 or the feeder 31. This abnormality is different from the abnormality involved with the traveling device.

When the abnormal loading machine 30 cannot move, the management device 3 prohibits the passage in the drift DR having the abnormal loading machine 30 disposed therein or stops the entire mining area. Then, the management device 3 causes the other vehicle to transport the abnormal loading machine 30 to the maintenance space MS. The other vehicle is the transporting machine 10 or the maintenance service vehicle other than the abnormal loading machine 30 (the same applies to the description below). When the course in which the abnormal loading machine 30 travels overlaps the course in which the other transporting machine 10 or the like travels, the management device 3 prohibits the passage of a working machine or the like other than the abnormal loading machine 30 at the overlapping part. The abnormality occurring in the loading machine 30 and not allowing the moving operation is, for example, the abnormality of the traveling device 34, the abnormality of the system used for the autonomous traveling operation of the loading machine 30, or the abnormality of the system used for the remote operation of the loading machine 30 from the management device 3.

When abnormality occurs in the transporting machine 10, the management device 3 prohibits the passage of the drift DR having the abnormal transporting machine 10 disposed therein or stops the entire mining area if the abnormal transporting machine 10 is movable. Then, the management device 3 gives an instruction to the abnormal transporting machine 10 so that the abnormal transporting machine moves to the maintenance space MS. The transporting machine 10 receiving the instruction moves to the maintenance space MS. When the course in which the abnormal transporting machine 10 travels overlaps the course in which the other transporting machine 10 or the like travels, the management device 3 prohibits the passage of a working machine or the like other than the abnormal transporting machine 10 at the overlapping part. The abnormality occurring in the transporting machine 10 and allowing the moving operation is, for example, the abnormality of the case other than the traveling device similarly to the case where the temperature of the hydraulic oil is abnormal. The management device 3 determines whether there is an influence due to the exception from the operation information of the transporting machine 10 obtained from the transporting machine 10.

When the abnormal transporting machine 10 cannot move, the management device 3 prohibits the passage in the drift DR having the abnormal transporting machine 10 disposed therein or stops the entire mining area. Then, the management device 3 causes the other vehicle to transport the abnormal transporting machine 10 to the maintenance space MS. When the course in which the abnormal transporting machine 10 travels overlaps the course in which the other transporting machine 10 or the like travels, the management device 3 prohibits the passage of a working machine or the like other than the abnormal transporting machine 10 at the overlapping part. The abnormality occurring in the transporting machine 10 and not allowing the moving operation is, for example, the abnormality of the transporting device for the transporting machine 10, the abnormality of the sliding device for the vessel 11, the abnormality of the elevating device for the vessel 11, or the abnormality of the sensors used for the autonomous traveling operation of the transporting machine 10.

When rock exists due to falling rock, drop of ore MR or the like, or an abnormal working machine or the like is stopped in the drift DR, the transporting machine 10 and the loading machine 30 cannot pass through the drift DR. For this reason, the management device 3 performs the allocation process of the transporting machine 10 and the allocation process of the loading machine 30 except for the drift DR. When a person or a vehicle other than the working vehicles like the transporting machine 10 and the loading machine 30 enters the drift DR, the management device 3 stops all working vehicles in the underground mine MI. The vehicle other than the working vehicle is, for example, a service vehicle with an operator. When the transporting machines 10 contact each other or the transporting machine 10 and the loading machine 30 contact each other, the management device 3 performs the allocation process of the transporting machine 10 and the allocation process of the loading machine 30 by excluding the drift DR having a contact occurring therein for the safety. In the event of the above-described contact, the management device 3 may stop all working vehicles in the underground mine MI. The management device 3 determines the abnormality of the drift DR based on the peripheral information of the transporting machine 10 transmitted from the transporting machine 10, the peripheral information of the loading machine 30 transmitted from the loading machine 30, or the like.

A case will be described in which abnormality occurs in the draw point DP. The management device 3 determines the abnormality of the draw point DP based on the information of the draw point DP transmitted from the loading machine 30, or the like. For example, when a large mass of the ore MR appears at the draw point DP, the management device 3 changes the operation of the loading machine 30 disposed at the draw point DP where the large mass appears from the automatic driving mode to the remote operation mode by the operator if the loading machine 30 is determined such that the loading operation is difficult in the automatic driving mode and the loading operation can be performed by the operation of the operator. The operator removes or scrapes the large mass of the ore MR by the operation of the rotation roller 33 and the support mechanism 32 of the loading machine 30.

When the loading machine 30 is determined such that the loading operation cannot be performed in the automatic driving mode or by the operation of the operator in the event of the large mass of the ore MR appearing at the draw point DP, the loading machine 30 transmits the state information to the management device 3 and moves to the draw point DP different from the draw point DP having the large mass appearing therein. In this case, the management device 3 determines the draw point DP having the loading machine 30 disposed therein by the allocation process of the loading machine 30.

For example, when the large mass of the ore MR does not appear and the ore MR does not fall in the event of the ore clogging occurring at the draw point DP, the loading machine 30 transmits the state information to the management device 3 and moves to the draw point DP different from the draw point DP having the ore clogging occurring therein. When the loading machine 30 cannot enter the draw point DP due to the falling rock in the cross cut CR connected to the draw point DP, the loading machine 30 transmits the state information to the management device 3 and moves to the draw point DP different from the draw point DP having the ore clogging occurring therein. In such a case, the management device 3 determines the draw point DP in which the loading machine 30 is disposed by the allocation process of the loading machine 30.

When the ore clogging occurs in the ore pass OP or the ore pass OP is filled, the transporting machine 10 passes through the ore pass OP and moves to the other ore pass OP. Alternatively, the transporting machine 10 may stop at the front side of the ore pass OP or the management device 3 may search for the alternative route. When the transporting machine 10 cannot enter the ore pass OP due to the falling rock occurring at the front side of the ore pass OP, the transporting machine 10 waits for an instruction at the front side of the ore pass OP. In the meantime, the management device 3 searches for the alternative route. When abnormality occurs in the storage battery exchange device EX, the management device 3 stops the transporting machine 10 of which the remaining amount of the storage battery 14 is smaller than a predetermined value at the front side of the space SP provided with the storage battery exchange device EX. The management device 3 determines the abnormality of the ore pass OP based on the management information of the ore pass OP or the peripheral information of the transporting machine 10 transmitted from the transporting machine 10.

Likewise, in the embodiment, since the management device 3, the transporting machine 10, and the loading machine 30 perform the above-described processes in the event of the exception occurring during the allocation process of the transporting machine 10 and the allocation process of the loading machine 30, it is possible to suppress degradation in productivity by suppressing an increase in period in which the operation of the mine M is stopped.

As described above, in the embodiment, the mine management system 1 separates the functions of the loading machine 30 and the transporting machine 10. For this reason, since the loading machine 30 can be used only for the excavating operation and the conveying operation and the transporting machine 10 can be used only for the operation of transporting the ore MR, the ability can be exhibited to the maximum. As a result, the mine management system 1 can improve the productivity of the mine M.

Since the loading machine 30 and the transporting machine 10 are movable, the mine management system 1 can easily handle a change in the condition of the excavating site. For example, when the clogging of the ore MR called arching occurs at the draw point DP or the large mass of the ore MR appears at the draw point DP so that the feeder 31 of the loading machine 30 cannot perform the conveying operation, the loading machine 30 moves to the different draw point DP so as to continuously mine the ore MR therein. For this reason, since the mine management system 1 can suppress a time in which the ore MR cannot be mined to the minimum, the productivity of the mine M can be improved. Further, an excavating machine having a function of crushing rock is allocated to the draw point DP in which the arching or the large mass occurs, and the arching or the large mass is crushed by the excavating machine.

Since the loading machine 30 includes the rotation roller 33 and the feeder 31, it is possible to continuously excavate the ore MR and to load the ore on the transporting machine 10. For this reason, since the loading machine 30 can promptly load the excavated ore MR on the transporting machine 10, it is possible to improve the productivity of the mine M by shortening the time necessary for the loading operation.

Although there is a method of mining the ore MR by the excavating machine provided at the draw point DP, but this method limits the movement of the excavating machine since the excavating machine is fixed to the draw point DP. For this reason, when the arching occurs at the draw point DP or the large mass of the ore MR appears at the draw point DP, it is difficult to move the excavating machine having a rock crushing function close to the draw point DP. Further, there is a possibility that the excavating machine may be damaged by the blasting for crushing the large mass. Since the loading machine 30 can travel freely as described above, the mine management system 1 moves the loading machine 30 to the draw point DP different from the draw point DP in which the arching occurs so that the ore MR is continuously mined. As a result, since the mine management system 1 can suppress the time in which the ore MR cannot be mined to the minimum, the productivity of the mine M can be improved.

The mine management system 1 sets the traveling direction of the circuit formed by the drift DR and the outer track TR as one direction. With such a configuration, the transporting machine 10 can incline the vessel 11 only in one direction during the dumping operation. For example, if the ore pass OP is provided at the left side of the transporting machine 10 in the traveling direction when the traveling direction of the circuit is the clockwise direction, the vessel 11 of the transporting machine 10 may be operated so that the right side in the traveling direction increases in height during the dumping operation. As a result, since the structure of the transporting machine 10 can be simplified, the production cost and the maintenance cost of the transporting machine 10 can be decreased.

The management device 3 determines the draw point DP toward which the transporting machine 10 is directed so that the operability of the loading machine 30 becomes maximal or the operability of the transporting machine 10 becomes maximal when performing the allocation process of the transporting machine 10. For this reason, the mine management system 1 can suppress degradation in productivity of the mine M. Further, since the transporting machine 10 travels in the circuit formed in the underground mine MI in one direction in the allocation process of the transporting machine 10, the traveling direction of the transporting machine 10 is one direction, and hence the algorithm of the allocation process of the transporting machine 10 is simplified. Further, since the transporting machine 10 travels in the circuit formed in the underground mine MI in one direction, the management device 3 can allocate the transporting machines 10 without considering the meeting and parting. For this reason, the algorithm of the allocation process of the transporting machine 10 is simplified.

The management device 3 determines the draw point DP having the loading machine 30 disposed therein based on a difference between the production plan and the actual production amount of the mine M when performing the allocation process of the loading machine 30. With such a configuration, the mine management system 1 can mine the ore from the draw points DP in a well balance. At the same time, since the mine management system 1 can continuously mine the ore MR by moving the loading machine 30 from, for example, the draw point DP where the mining operation cannot be continuously performed, the productivity of the mine M can be improved by suppressing the time in which the ore MR cannot be mined to the minimum. At the same time, the mine management system 1 can mine the ore MR from the draw points DP in a well balance. The allocation process of the loading machine 30 according to the embodiment is particularly suitable for the case where the block caving method is used. In the embodiment, the allocation process of the transporting machine 10 and the allocation process of the loading machine 30 are performed by the management device 3, but these allocation processes may be performed by at least one of the control device 70 of the transporting machine 10 and the control device 75 of the loading machine 30. In this case, the information necessary for the allocation process like the operation information of the transporting machine 10, the operation information of the loading machine 30, and the production plan of the mine M is exchanged between the transporting machines 10, the transporting machine 10 and the loading machine 30 or between the transporting machine 10 or the loading machine 30 and the management device 3.

The above-described components include a component which can be easily supposed by the person skilled in the art, a component which has substantially the same configuration, and a component which is included in a so-called equivalent range. Further, the above-described components can be appropriately combined with one another. Furthermore, various omissions, substitutions, or modifications of the components can be made without departing from the spirit of the embodiment.

REFERENCE SIGNS LIST

1 MINE MANAGEMENT SYSTEM
3 MANAGEMENT DEVICE
3C PROCESSING DEVICE
3M STORAGE DEVICE
5 POWER FEEDING CABLE
10 TRANSPORTING MACHINE
10B VEHICLE BODY
11 VESSEL
12A, 12B VEHICLE WHEEL
14 STORAGE BATTERY
24 DRIVING CONTROL DEVICE
30 LOADING MACHINE
30B VEHICLE BODY
31 FEEDER
32 SUPPORT MECHANISM
33 ROTATION ROLLER
34 TRAVELING DEVICE
35 PENETRATION MEMBER
36 ROTATION BODY
40, 41 INFORMATION COLLECTING DEVICE
48 DRIVING CONTROL DEVICE
70, 75 CONTROL DEVICE
71, 76 PROCESSING DEVICE
72, 77 STORAGE DEVICE
80 SWITCHING MECHANISM
90 STORAGE BATTERY HOLDER
CR CROSS CUT (SECOND MINE SHAFT)
CD, CDa, CDb CIRCUIT
DP, DPa, DPb, DPc, DPe DRAW POINT (MINING AREA)
DR, DRa, DRb, DRc, DRd, DRe, DRf DRIFT (FIRST MINE SHAFT)
EX STORAGE BATTERY EXCHANGE DEVICE
OP, OPa, OPb ORE PASS (SOIL DISCHARGE AREA)
RM ROCK MASS
TR, TRa, TRb OUTER TRACK (THIRD MINE SHAFT)

The invention claimed is:

1. A mine management system used to mine ore from an ore body in a mine including a plurality of mining areas provided inside the ore body, a plurality of first mine shafts provided inside the ore body, and a plurality of second mine shafts connecting the mining areas and the first mine shafts respectively, the mine management system comprising:
a transporting machine configured to travel in the first mine shafts, load the ore mined in the mining areas, and transport the ore to a soil discharge area by traveling in the first mine shafts;
a loading machine configured to travel in the first mine shafts and the second mine shafts, stay in a second mine shaft of the second mine shafts with a space left inside the first mine shafts so that the transporting machine can travel therein, excavate the ore in a mining area connected to the second mine shaft, convey the ore from the mining area to a first mine shaft in an opposite direction of the mining area through the second mine shaft, and load the ore on the transporting machine in the first mine shaft;

a management device configured to exchange information with the transporting machine and the loading machine, determine a mining area toward which the transporting machine travels so that an operability of either the transporting machine or the loading machine becomes maximal among the mining areas, and manage the operation of the transporting machine and the loading machine; and the transporting machine travels in the first mine shafts, loads the ore mined in the mining areas, and transports the ore to the soil discharge area by traveling in the first mine shafts, in response to the information exchanged with the management device.

2. The mine management system according to claim 1, wherein when the management device determines the mining area toward which the transporting machine travels so that the operability of the loading machine becomes maximal, the management device obtains an empty time when the loading machine disposed in the mining area does not load the ore on the transporting machine and determines the mining area where the empty time becomes maximal as the mining area toward which the transporting machine travels.

3. The mine management system according to claim 2, further comprising:
another transporting machine configured to operate similarly to the transporting machine;
wherein the management device obtains the empty time by subtracting an additional time obtained by adding a present loading time required for loading the ore on the loading machine provided in the mining area at a present time or an arrival time of the other transporting machine traveling toward the mining area, whichever is larger, to a predicted loading time required for loading the ore on the other transporting machine, from a movement time when the transporting machine moves to the mining area.

4. The mine management system according to claim 3, wherein when the loading machine disposed in the mining area is supposed to move, the management device further adds a movement time of the loading machine to the additional time obtained by adding the present loading time required for loading the ore on the loading machine provided in the mining area at the present time or the arrival time of the other transporting machine traveling toward the mining area, whichever is larger, to the predicted loading time required for loading the ore on the other transporting machine.

5. The mine management system according to claim 3, wherein the management device determines the mining area toward which the transporting machine travels when the transporting machine leaves the soil discharge area.

6. The mine management system according to claim 1, wherein when the management device determines the mining area toward which the transporting machine is directed travels so that the operability of the transporting machine becomes maximal, the management device predicts a loading start time required until the loading machine starts to load the ore on the transporting machine in the mining area toward which the transporting machine travels after the transporting machine leaves the soil discharge area, and
the management device determines the mining area where the loading start time becomes minimal as the mining area toward which the transporting machine travels.

7. The mine management system according to claim 6, further comprising:
another transporting machine configured to operate similarly to the transporting machine;
wherein the loading start time is a movement time when the transporting machine moves to the mining area or an additional time, whichever is larger, the additional time being obtained by adding a present loading time required for loading the ore on the loading machine provided in the mining area at a present time or an arrival time of the other transporting machine traveling toward the mining area, whichever is larger, to a predicted loading time required for loading the ore on the other transporting machine.

8. The mine management system according to claim 7, wherein when the loading machine disposed in the mining area is supposed to move, the management device further adds a movement time of the loading machine to the additional time obtained by adding the present loading time required for loading the ore on the loading machine provided in the mining area at the present time or the arrival time of the other transporting machine traveling toward the mining area, whichever is larger, to the predicted loading time required for loading the ore on the other transporting machine.

9. The mine management system according to claim 7, wherein the management device determines the mining area toward which the transporting machine travels when the transporting machine leaves the soil discharge area.

10. The mine management system according to claim 1, wherein the mine includes a plurality of the soil discharge areas, and
the management device determines the soil discharge area where a discharge start time taken until the transporting machine becomes possible to discharge the ore is shortest among the soil discharge areas as the soil discharge area toward which the transporting machine travels.

11. The mine management system according to claim 10, further comprising:
another transporting machine configured to operate similarly to the transporting machine;
wherein the management device obtains the discharge start time for each soil discharge area and determines the soil discharge area where the total time is shortest among the soil discharge areas as the soil discharge area toward which the transporting machine travels, the discharge start time corresponding to a total time of a movement time when the transporting machine moves to the soil discharge area and a time required for discharging the ore by the other transporting machine supposed to discharge the ore in the soil discharge area after a time when the transporting machine arrives at the soil discharge area.

12. The mine management system according to claim 10, wherein the management device determines the soil discharge area toward which the transporting machine travels when the ore is completely loaded on the transporting machine among the soil discharge areas.

13. The mine management system according to claim 1, wherein when there are a plurality of the soil discharge areas having no transporting machine in the traveling direction of the transporting machine, the management device determines one of the soil discharge areas as the soil discharge area toward which the transporting machine travels.

14. The mine management system according to claim 13, wherein the management device determines the soil discharge area toward which the transporting machine travels when the ore is completely loaded on the transporting machine among the soil discharge areas.

15. The mine management system according to claim 1, wherein when there are a plurality of the transporting machines in the mine, the management device disposes up to a maximum of one transporting machine from the transporting machines is-disposed in each of the first mine shafts.

16. The mine management system according to claim 15, wherein the mine further includes a plurality of third mine shafts each connected to the first mine shafts, and two of the third mine shafts and two of the first mine shafts form a circuit in the mine.

17. The mine management system according to claim 16, wherein each of the transporting machines travels in the circuit in a same direction.

18. The mine management system according to claim 1, wherein the management device calculates the operability of either the transporting machine or the loading machine based on at least one of traveling time, loading time or waiting time thereof.

* * * * *